(12) United States Patent
Bowman et al.

(10) Patent No.: US 10,459,935 B2
(45) Date of Patent: Oct. 29, 2019

(54) GENERATING INTEGRATED DATA RECORDS BY CORRELATING SOURCE DATA RECORDS FROM DISPARATE DATA SOURCES

(71) Applicant: Fiserv, Inc., Brookfield, WI (US)

(72) Inventors: Mark Edward Bowman, Canton, GA (US); Vikram Gupta, Sunnyvale, CA (US); Phillip Andrew Schroder, Liburn, GA (US); Gregory David Smelker, Littleton, CO (US); Amirali Sunderji, San Jose, CA (US); Mary Elizabeth Lawson, Westerville, OH (US); Timothy Allen Ruhe, Ashburn, VA (US)

(73) Assignee: FISERV, INC., Brookfield, WI (US)

( * ) Notice: Subject to any disclaimer, the term of this patent is extended or adjusted under 35 U.S.C. 154(b) by 940 days.

(21) Appl. No.: 14/852,041

(22) Filed: Sep. 11, 2015

(65) Prior Publication Data

US 2017/0053357 A1    Feb. 23, 2017

Related U.S. Application Data

(63) Continuation of application No. 14/829,338, filed on Aug. 18, 2015.

(51) Int. Cl.
*G06F 17/30* (2006.01)
*G06F 16/2458* (2019.01)
(Continued)

(52) U.S. Cl.
CPC .......... *G06F 16/2471* (2019.01); *G06F 16/25* (2019.01); *G06F 16/951* (2019.01); *G06Q 20/22* (2013.01); *G06Q 40/12* (2013.12)

(58) Field of Classification Search
CPC ...................................................... G06F 17/30
See application file for complete search history.

(56) References Cited

U.S. PATENT DOCUMENTS

2003/0154166 A1* 8/2003 Klatt ..................... G06Q 20/04
                                                                 705/40
2008/0005106 A1    1/2008 Schumacher et al.
(Continued)

FOREIGN PATENT DOCUMENTS

CA          2819066 A1    8/2012
CA          2828751 A1    9/2012
(Continued)

OTHER PUBLICATIONS

Canadian Intellectual Property Office, Requisition by the Examiner for U.S. Pat. No. 2,926,931, dated Jan. 30, 2017, 5 pages, Canada.
(Continued)

*Primary Examiner* — Khanh B Pham
(74) *Attorney, Agent, or Firm* — Alston & Bird LLP

(57) ABSTRACT

Systems, methods and computer-readable media are disclosed for generating integrated data records by correlating source data records stored at different registry source data repositories. A set of source data records is retrieved based on execution of one or more search queries against a set of registry source data repositories. A data record matching rule is selected for execution on the set of source data records. The matching rule specifies one or more input properties, each of which specifies at least one data field designator, and optionally, a matching algorithm and an input property match threshold value. The matching rule is executed on pairwise combinations of source data records to obtain a set of matched source data records. An integrated data record is generated and populated with respective data from each of
(Continued)

one or more of the matched source data records. The integrated data record is linked to each source record.

20 Claims, 30 Drawing Sheets

(51) Int. Cl.
  *G06F 16/951* (2019.01)
  *G06Q 40/00* (2012.01)
  *G06Q 20/22* (2012.01)
  *G06F 16/25* (2019.01)

(56) References Cited

U.S. PATENT DOCUMENTS

| | | |
|---|---|---|
| 2009/0171761 A1 | 7/2009 | Noy et al. |
| 2009/0271404 A1 | 10/2009 | Bayliss |
| 2010/0005090 A1 | 1/2010 | Bayliss |
| 2013/0212103 A1 | 8/2013 | Cao et al. |
| 2013/0238623 A1 | 9/2013 | Wyllie et al. |
| 2013/0262474 A1 | 10/2013 | Curran et al. |
| 2014/0164378 A1 | 6/2014 | Levandoski et al. |
| 2014/0280073 A1 | 9/2014 | Sutton et al. |
| 2014/0280274 A1 | 9/2014 | Louis et al. |
| 2014/0330845 A1* | 11/2014 | Feldschuh ......... G06F 17/30303 707/749 |
| 2017/0053002 A1 | 2/2017 | Bowman et al. |

FOREIGN PATENT DOCUMENTS

| | | |
|---|---|---|
| CA | 2932401 A1 | 6/2015 |
| WO | WO 2009/081212 A2 | 7/2009 |
| WO | WO 2011/085360 A1 | 7/2011 |

OTHER PUBLICATIONS

European Patent Office, Extended European Search Report for Application No. 16168785.0, Dec. 21, 2016, 9 pages, Germany.
IP Australia, Examination Report No. 1 for Application No. 2016203090, dated Jan. 13, 2017, 5 pages, Australia.
CA Office Action dated Jan 15, 2018 for CA Application No. 2926931.
Communication from the Examining Division dated Jun. 25, 2018 for EP Application No. 16168785.
AU Office Action dated Aug. 22, 2018 for AU Application No. 2017221777.
Annex to the communication dated Jun. 25, 2018 for EP Application No. 16168785.

\* cited by examiner

GENERATING INTEGRATED DATA RECORDS BY CORRELATING SOURCE DATA RECORDS FROM DISPARATE DATA SOURCES

CROSS-REFERENCE TO RELATED APPLICATION(S)

This application is a continuation of U.S. application Ser. No. 14/829,338, filed Aug. 18, 2015, the content of which is incorporated by reference herein in its entirety.

BACKGROUND

Data stored in a data repository may have a particular structure and format that is specific to that repository. In addition, a data record stored in a particular data repository may include data that is not present in a corresponding data record stored in another data repository. For example, a first data record stored in a first data repository may include data for certain attributes of an entity represented by the first data record that a second data record stored in a second data repository and also representative of the entity does not. Accordingly, different data structures/formats and different informational knowledge between different data repositories may present a technical problem for combining data from different repositories and/or for determining a correspondence between data records stored in different data repositories. Some solutions to this and other technical problems are provided herein.

BRIEF DESCRIPTION OF THE DRAWINGS

The detailed description is set forth with reference to the accompanying drawings. The use of the same reference numerals generally indicates similar or identical items; however, different reference numerals may be used to indicate similar or identical items as well. Various embodiments may utilize element(s) and/or component(s) other than those illustrated in the drawings and some element(s) and/or component(s) may not be present in various embodiments. It should be appreciated that while singular terminology may be used to describe a component or element, a plural number of such components or elements may also be encompassed within the scope of the disclosure. Further, in any instance herein in which a first operation, first determination, first processing result, first data value, or the like is described as being based on a second operation, second determination, second processing result, and/or second data value, it should be appreciated that one or more additional operations, determinations, processing results, and/or data value may also constitute a partial basis for the first operation, first determination, first processing result, first data value, or the like.

DETAILED DESCRIPTION

Overview

Figure 1A:
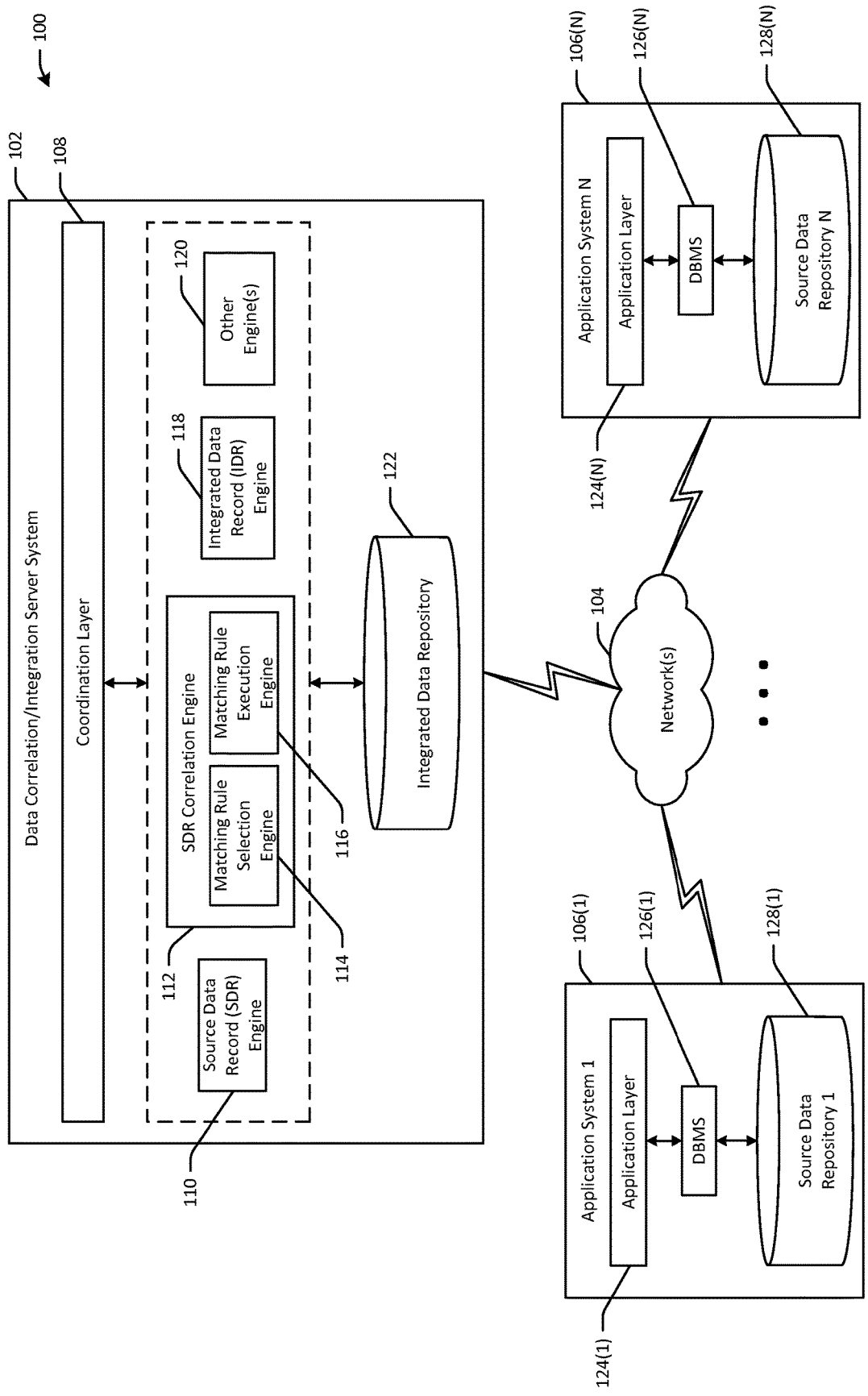
FIG. 1A is a schematic block diagram of an illustrative networked architecture that includes a data correlation/integration server system configured to correlate source data records stored in different source data repositories and generate an integrated data record from the correlated source data records in accordance with one or more example embodiments of the disclosure.

This disclosure relates to systems, methods, and computer-readable media for, among other things, correlating a set source data records stored in different source data repositories, generating and populating an integrated data record with respective data from each of one or more of the source data records, storing the integrated data record in an integrated data repository, and linking the integrated data record to each of the correlated source data records.

In example embodiments of the disclosure, a data correlation/integration server system may retrieve a set of source data records from respective source data repositories. Each source data record that is retrieved may satisfy at least one search parameter of a search query. More specifically, each source data record that is retrieved may be populated with data that matches a respective search parameter value of at least one search parameter of the search query. The data correlation/integration server system may initiate the source data record retrieval process after receiving a request containing identifying information of an entity from an application system and determining that an integrated data record corresponding to the request is not stored in the integrated data repository. The search query that the data correlation/integration server system generates may include at least a portion of the identifying information in the request. Alternatively, the data correlation/integration server system may initiate the source data record retrieval process after receiving a seed file. The seed file may contain one or more records. Each record of the seed file may include at least one search parameter value for a search query. The at least one search parameter value may be obtained from a source data record stored in a source data repository. A record of the seed file may further include other information from the source data record. Alternatively, each record of the seed file may identify a source data record stored at a source data repository and from which respective search parameter values for one or more search queries may be obtained. The data correlation/integration server system may execute the search query to retrieve source data records from a plurality of source data repositories.

After retrieving a set of source data records from source data repositories based on execution of a search query, the data correlation/integration server system may identify a data record matching rule that is eligible for execution on the set of source data records. A data record matching rule may specify one or more input properties. Each input property may be associated with one or more data field designators. Each data field designator may indicate a corresponding data field in a source data record. Each input property may also be associated with a type designator. The type designator may indicate whether populated data field(s) corresponding to data field designator(s) associated with the input property must be present in a source data record for the data record matching rule to be eligible for execution on the source data record.

After identifying a data record matching rule that is eligible for execution on a set of source data records, the data correlation/integration server system may execute the data record matching rule on pairwise combinations of the source data records. Execution of the data record matching rule on a pair of source data records may yield a final value of a cumulative match confidence value for the pair of source data records. The final value of the cumulative match confidence value may be determined from one or more input property match confidence values. Each input property match confidence value may be associated with a corresponding input property and may be determined based on execution of a matching algorithm on respective data populated in respective source data record data fields that correspond to a data field designator associated with the input property.

The data correlation/integration server system may then compare the final value of the cumulative match confidence value to a rule match threshold value associated with the data record matching rule to determine whether the pair of source data records match. If the final value of the cumulative match confidence value satisfies the rule match threshold value, the pair of source data records may be determined to match. Conversely, if the final value of the cumulative match confidence value does not satisfy the rule match threshold value, the pair of source data records may be determined to not match. It should be appreciated that a first value may satisfy a second value if the first value is greater than or equal to the second value.

After a set of matched source data records is obtained, the data correlation/integration server system may generate an integrated data record and populate the integrated data record with respective data from one or more of the matched source data records. The set of matched source data records may include source data records from multiple pairwise combinations of source data records that have been determined to match. In certain example embodiments, the integrated data record may be populated with first data populated in a first data field of a first matched source data record and second data populated in a second corresponding data field of a second matched source data record. In other example embodiments, the integrated data record may be populated with the first data or the second data but not both. The data correlation/integration server system may store the integrated data record in an integrated data repository and may link the populated integrated data record to each matched source data record stored in a corresponding source data repository. Further, in certain example embodiments, an integrated data record may be generated that corresponds to an unmatched source data record.

Example embodiments of the disclosure provide a number of technical features, technical effects, and improvements to technology. For example, in accordance with example embodiments of the disclosure, a set of source data records stored in different source data repositories may be matched to one another using a data record matching rule and an integrated data record that includes respective data from each of the source data records may be generated and linked to each source data record. In this manner, the matched source data records may be correlated to each other and represented in an integrated data repository by a single integrated data record. Thus, example embodiments of the disclosure provide a technical effect and a technological improvement to existing solutions that are unable to correlate source data records and determine that the source data records are representative of a same entity because the source data records contain different data and/or are stored in source data repositories that format data differently. In addition, various processes described herein are optimized to provide enhanced performance such as, for example, a process for selecting different pairwise combinations of source data records on which to execute a data record matching rule. Such performance enhancements represent a technical effect and technological improvement over existing solutions. It should be appreciated that the above examples of technical features, technical effects, and/or improvements to technology of example embodiments of the disclosure are merely illustrative and not exhaustive.

Illustrative Networked Architecture

FIG. 1A is a schematic block diagram of an illustrative networked architecture 100 that includes a data correlation/integration server system 102 configured to correlate source data records stored in different source data repositories and generate an integrated data record from the correlated source data records in accordance with one or more embodiments of the disclosure.

More specifically, the illustrative architecture 100 may include the data correlation/integration server system 102 and one or more application systems 106(1)-106(N). The variable 'N' may be any integer greater than or equal to one. It should be appreciated that while one or more components of the illustrative architecture 100 may be described in the singular, a plural number of any such component(s) (potentially forming part of a system that includes additional hardware, software, firmware, and/or networking components) is also encompassed by this disclosure. For example, while the reference numeral 106 may be used herein to generically refer to any given application system of the one or more application systems 106(1)-106(N), it should be appreciated that any discussion herein with respect to an application system 106 may be applicable to multiple application systems.

The data correlation/integration server system 102 and each of the application system(s) 106(1)-106(N) may be configured to communicate via one or more networks 104. The network(s) 104 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 104 may have any suitable communication range associated therewith and may include, for example, global networks (e.g., the Internet), metropolitan area networks (MANs), wide area networks (WANs), local area networks (LANs), or personal area networks (PANs). In addition, the network(s) 104 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The network(s) 104 may leverage computing platforms provided by network providers or other entities. Further, transmissions over the network(s) 104 may be non-encrypted or may be encrypted in accordance with any suitable security algorithm/protocol implemented in any of the various layers of, for example, the Open Systems Interconnection (OSI) model of network communications. Any of a variety of encryption algorithms may be used including, but not limited to, symmetric encryption algorithms, asymmetric encryption algorithms, or combinations thereof. An example of a combined symmetric/asymmetric encryption algorithm may be, for example, the Transport Layer Security (TLS) protocol, or its predecessor the Secure Sockets Layer (SSL) protocol, according to which asymmetric cryptography is utilized to authenticate devices and negotiate a symmetric session key and subsequent communications between the devices are encrypted using the symmetric session key.

The data correlation/integration server system 102 may include a coordination layer 108 that may include any combination of software, firmware, and/or hardware. The system 102 may further include one or more engines including, for example, a source data record (SDR) engine 110, an SDR correlation engine 112, an integrated data record (IDR) engine 118, and one or more other engines 120. In addition, the SDR correlation engine 112 may include one or more sub-engines such as, for example, a matching rule selection engine 114 and a matching rule execution engine 116. It should be appreciated that any of the engines of the data correlation/integration server system 102 may include one or more sub-engines. Each such engine/sub-engine may include any combination of software, firmware, and/or hardware and may be configured to execute respective functionality, potentially at the control/direction of the coordination layer 108, as will be described in more detail throughout this disclosure. In addition, the data correlation/integration server system 102 may include an integrated data repository 122 that may include one or more datastores.

The one or more application systems 106(1)-106(N) may include, for example, respective application layer(s) 124(1)-

124(N) (generically referred to herein as application layer 124), respective database management system(s) (DBMS) 126(1)-126(N) (generically referred to herein as a DBMS 126), and respective source data repository(ies) 128(1)-128(N) (generically referred to herein as source data repository 128). Each source data repository 128 may include, in certain example embodiments, one or more datastores. Datastore(s) of the integrated data repository 122 and/or any source data repository 128 may include, without limitation, databases (e.g., relational, object-oriented, etc.), file systems, flat files, or the like. Such datastore(s) may represent data in one or more data schemas. Further, one or more of the datastore(s) may be implemented as a distributed datastore in which data is stored on more than one node of a computer network. Each DBMS 126 may be loaded into one or more memory devices of one or more servers of a corresponding application system 106 and may support functionality for accessing, retrieving, storing, and/or manipulating data stored in a corresponding source data repository 128. Each DBMS 126 may use any of a variety of database models (e.g., relational model, object model, etc.) and may support any of a variety of query languages.

The application system(s) 106(1)-106(N) may include any of a variety of types of systems that may include one or more user interface (UI) components that support UI functionality as well as one or more back-end components that support back-end processing functionality. As will be described in more detail later in this disclosure, the UI component(s) of an application system may include a server-side UI application that transmits data to a client-side UI application configured to generate and present one or more UIs to a user. Alternatively, the server-side UI application may generate a UI and transmit the UI for presentation via a client-side UI application such as web browser application. The server-side UI application may form part of the application layer 124. Further, the client-side UI application may or may not form part of the application layer 124 (or the application system 106, more generally). UIs presented by a client-side UI application may provide the capability for a user to select user preferences/settings for a user profile (e.g., a registration profile); initiate application system functionality (e.g., access data stored in a source data repository, submit a request such as a funds transfer request, etc.); and so forth. More generally, the application layer 124, which may include the server-side UI application, and optionally, the client-side UI application, may present a services interface that enables other network entities to request application functionality of a corresponding application system 106 and/or information stored in a corresponding source data repository 128 of the application system 106.

An application system 106 may include, without limitation, a payment system configured to provide payment-related functionality such as receipt of a payment request and initiation of a debit and/or a credit in accordance with the payment request to cause a transfer of funds between a payor's financial account and a payee's financial account; a billing system configured to provide, for example, electronic and/or non-electronic bill presentment on behalf of billers; a core account processing system; an online banking system; an investment system; a lending system; a retail system; an internet portal system; or any other suitable application system. In certain example embodiments, an application system 106 may provide combined functionality of two or more of the aforementioned types of application systems. For example, an electronic bill presentment and payment (EBPP) system may provide functionality that enables registered entities to make payments and/or receive electronic bills. The registered entities may include, without limitation, subscribers (e.g., individual consumers or small businesses that may utilize the payment and/or electronic bill presentment functionality); managed payees (e.g., non-billing merchants, billers, etc.); electronic billers; and so forth. Other types of payment systems may include, for example, merchant payment systems, person-to-person (P2P) payment systems, retail systems, electronic wallets, and so forth.

The integrated data repository 122 may store one or more integrated data records. Each source data repository 128 may store one or more source data records. Each integrated data record may include respective information contained in each of one or more source data records. For example, a particular integrated data record may include first data contained in a first source data record which is stored in a first source data repository (e.g., source data repository 128(1)) as well as second data contained in a second source data record which is stored in a second source data repository (e.g., source data repository 128(2)). In addition, an integrated data record may include information not contained in any source data record. For example, an integrated data record may include an identifier of the integrated data record, information pertaining to one or more attributes of an entity represented by the integrated data record, and so forth.

In certain example embodiments, a first source data record stored in a first source data repository (e.g., source data repository 128(1)) may include information relating to an entity that is registered with a corresponding application system (e.g., application system 106(1)). An entity's registration profile with an application system may indicate one or more services that are offered by the application system and to which the entity is subscribed. Further, the information contained in the first source data record may include, for example, one or more identifiers of the entity such as a system-specific identifier, a first and/or last name, one or more social tokens (e.g., an email address, a phone number, a government identifier, a social networking identifier, etc.), and so forth. Such information may also include a contact identifier such as a physical address; one or more account identifiers associated with the entity; user preference information; and so forth. In certain example embodiments, a particular identifier (e.g., an email address, a phone number, etc.) may be both a social token and a contact identifier. Similarly, other types of identifiers (e.g., a financial or billing account identifier) may, in certain instances, be utilized as a social token. It should be appreciated that any information that identifies an entity may be considered a social token for that entity.

Further, a second source data record stored in a second source data repository (e.g., source data repository 128(2)) of a second application system (e.g., application system 106(2)) may also include information relating to the same entity. In certain example embodiments, despite relating to the same entity, the information contained in the second source data record may differ from the information contained in the first source data record. For example, a data field of the first source data record may not be present in the second source data record or a data field of the first source data record may be populated with first data whereas a corresponding data field in the second source data record may be unpopulated, populated with second (alternative) data, or populated with non-meaningful data. As a more specific example of this, the first source data record may include a physical address for the entity while the second source data record may not (e.g., an address field may not be present in the second source data record, or even if present, may be populated with different data, non-meaningful data, or no data at all).

As another example, the first source data record may include one or more entity identifiers (e.g., social tokens) not present in the second source data record or vice versa. As a more specific example of this, an email data field of the first source data record may be populated with an email address but a phone number data field of the first source data record may be unpopulated. In contrast, a phone number data field of the second source data record may be populated with a phone number but an email data field of the second source data record may be unpopulated.

As yet another example, the first source data record may include different data in a particular data field than what is included in a corresponding data field of the second source data record. As a more specific example, a first name data field in the first source data record may be populated with first data that differs from second data populated in a first name data field of the second source data record (e.g., the first source data record may include a shortened form ("Phil") of a name while the second source data record may include a longer form of the name ("Phillip"). As another more specific example, the first source data record may include a first email address while the second source data record may include a second different email address.

It should be appreciated that the above examples of scenarios in which source data records stored in different source data repositories correspond to a same entity but include different data are merely illustrative and not exhaustive. It should further be appreciated that a first data field in a first source data record may correspond to a second data field in a second source data record if the two data fields are configured or otherwise intended to be populated with data relating to the same type of attribute. For example, the first data field may correspond to the second data field if each is configured to receive a particular character (e.g., "@") that must be included in an email address.

Correspondence between respective data fields of different source data records may be identified in any of a variety of ways depending on how data is organized/formatted/structured within source data repositories. For example, a data dictionary or mapping may be generated that identifies corresponding data fields from different source data records and defines how each of the corresponding data fields can be accessed within the respective source data repositories. The data dictionary or mapping may assign a data field name (e.g., an identifier such as a character string that includes any combination of numeric and/or non-numeric characters) to each data field in a source data record, and corresponding data fields in different source data records may be identified based on having the same data field name assigned thereto. As another example, the data dictionary or mapping may specify, for example, a respective record offset for accessing each corresponding data field from source data records. As an alternative to a data dictionary or mapping, each data field may include an identifier (e.g., a data field name) that identifies the data field. For example, data within any given data field of a source data record may be stored as a key-value pair that includes the data field name and the corresponding data for that data field. Data fields in different source data records may then be identified as corresponding to one another based on having the same key.

In any of the example scenarios discussed above in which a first source data record stored in a first source data repository of a first application system and a second source data record stored in a second source data repository of a second application system each correspond to the same entity but include different identifying information or attribute information for the entity, it would be beneficial for the first application system and the second application system to share the respective information contained in their source data records relating to the same entity in order to obtain a more comprehensive set of data relating to the entity. However, differences in the structure and/or the format of data stored in the first source data repository and the structure and/or format of data stored in the second source data repository may make direct exchange of source data record data between the application systems impractical or infeasible. Further, because the data contained in the source data records may differ, it may be difficult to determine whether the source data records in fact correspond to a same entity.

In example embodiments of the disclosure, the data correlation/integration server system 102 may support functionality—via interaction between the coordination layer 108 and the various engines depicted in FIG. 1A—for determining a set of source data records stored in one or more source data repositories that are candidate source data records potentially corresponding to a same entity, determining a data record matching rule to execute on the candidate source data records, determining a set of one or more matched source data records from the candidate source data records based on execution of the data record matching rule, generating an integrated data record that includes data from the set of one or more matched source data records, and linking the integrated data record to each of the matched source data record(s) stored in their respective source data repositories.

The coordination layer 108 may interact with the various engines of the data correlation/integration server system 102 to direct any particular engine to initiate execution of its respective functionality in response, for example, to the results of execution of the respective functionality of another engine. For example, the coordination layer 108 may trigger the SDR engine 110 to begin execution in response to output generated by the IDR engine 118 and/or in response to receipt of an indication of completion of processing performed by the IDR engine 118. Alternatively, the coordination layer 108 may send an indication of the output generated by the IDR engine 118 and/or an indication of completion of processing performed by the IDR engine 118 to the SDR engine 110, based at least in part on which, the SDR engine 110 may initiate execution. As another example, the coordination layer 108 may trigger the SDR correlation engine 112 to begin execution in response to output generated by the SDR engine 110 and/or in response to receipt of an indication of completion of processing performed by SDR engine 110. Alternatively, the coordination layer 108 may send an indication of the output generated by the SDR engine 110 and/or an indication of completion of processing performed by the SDR engine 110 to the SDR correlation engine 112, based at least in part on which, the SDR correlation engine 112 may initiate execution. It should be appreciated that the above examples of mechanisms by which the data correlation/integration server system 102 may utilize the coordination layer 108 to leverage the respective functionality of one or more engines of the data correlation/integration server system 102 are merely illustrative and not exhaustive.

Figure 1B:
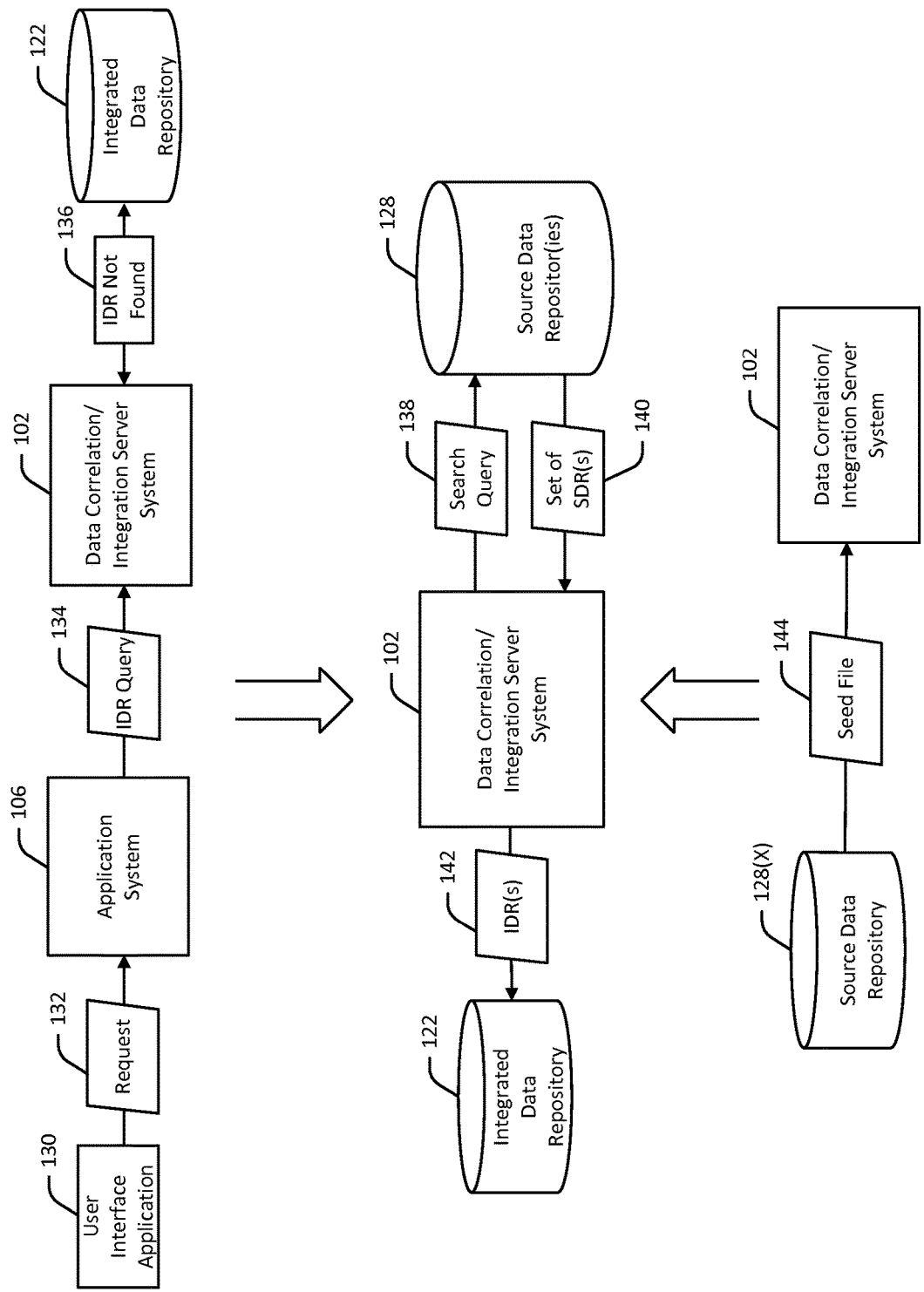
FIG. 1B is a schematic block diagram of example data flows for triggering a data correlation/integration process in accordance with one or more example embodiments of the disclosure.

Referring now to FIG. 1B, the data correlation/integration server system 102, or more specifically, the SDR engine 110 may be configured to generate a search query 138 and submit the search query 138 to one or more source data repositories 128. The search query 138 may specify one or more search parameters and a respective search parameter value for each search parameter. A search parameter may be, for example, a character string that matches a data field name of a corresponding data field in a source data record (as specified, for example, in a data dictionary or mapping); an offset value that indicates a particular data field in a source data record; or the like.

A search parameter value may be a particular value specified in connection with a particular search parameter in the search query 138. For example, if the search parameter corresponds to an address data field in a source data record, the search parameter value specified in the search query 138 in connection with that search parameter may be a character string indicative of a specific address (e.g., "123 Maple St"). The search query 138 may include any logical combination of search parameters. For example, the search query 138 may include one or more logical ANDs and/or one or more logical ORs of search parameters. As another example, the search query 138 may include a logical AND or a logical OR between two combinations of search parameters, where each combination may itself be a logical AND and/or a logical OR of one or more search parameters. A specific and non-limiting example of the search query 138 may be the following SQL query: SELECT * FROM source_data_repository_1 WHERE LastName='Doe' AND (Phone='123-4567' OR Email='jdoe@domain.com').

The search query 138 may be received by an application layer 124 of the application system 106, which may access a DBMS 126 of the application system 106 to identify and retrieve those source data record(s) (if any) that satisfy the search query 138. Alternatively, the SDR engine 110 may submit the search query 138 to the DBMS 126 directly. The search query 138 may be submitted to any number of the application systems 106(1)-106(N), and a set of one or more source data records 140 retrieved from one or more of the source data repositories 128(1)-128(N) may be provided to the SDR engine 110. If the set of source data record(s) 140 includes multiple source data records, the set 140 may be provided to the SDR engine 110 and then (directly or via the coordination layer 108) to the SDR correlation engine 112. As will be described in more detail later in this disclosure, the matching rule selection engine 114 of the SDR correlation engine 112 may then execute processing to determine a data record matching rule to select for execution on the set of source data records 140. Once a data record matching rule is selected, the matching rule execution engine 116 may execute the data record matching rule on the set of source data records 140 to obtain a set of one or more matched source data records. In certain example embodiments, multiple sets of matched source data records may be obtained. A respective integrated data record 142 may then be generated for each set of matched source data records and stored in the integrated data repository 122.

As depicted in FIG. 1B, the process described above may be triggered in different ways. For example, in certain example embodiments of the disclosure, a UI application 130 may submit a request 132 to an application system 106. The UI application 130 may be, for example, a client-side UI application that receives user input and generates the request 132 based on the received user input. In those example embodiments in which the application system 106 is a payment system, the request 132 may be, for example, a payment request to transfer funds to a payee on behalf of a payor. If the request 132 is a payment request, the request 132 may include various information required to execute the payment request such as, for example, one or more identifiers of the payor, one or more identifiers of the payee, a payment amount, and so forth. The application system 106 may generate an integrated data record (IDR) query 134 that includes at least a portion of the information included in the request 132 and may submit the IDR query 134 to the data correlation/integration server system 102. The data correlation/integration server system 102 may execute the query 134 against the integrated data repository 122 to attempt to locate an integrated data record that satisfies the IDR query 134. For example, the IDR query 134 may include one or more identifiers of the payee included in the request 132, and the data correlation/integration server system 102 may execute the IDR query 134 on the integrated data repository 122 to attempt to locate an integrated data record that includes the one or more payee identifiers. The absence 136 of an integrated data record in the integrated data repository 122 that satisfies the IDR query 134 may then trigger the data correlation/integration server system 102 to generate the search query 138 for retrieving the set of candidate source data records 140 that may potentially correspond to the payee identified in the request 132 and performing the data correlation/integration process described herein to obtain a set of matched source data records from the set of candidate source data records and generate an integrated data record from the set of matched source data records.

It should be appreciated that, in certain example embodiments, multiple integrated data records that satisfy the IDR query 134 may be retrieved from the integrated data repository 122. That is, a single integrated data record that unambiguously corresponds to an entity identified in the request 132 may not be identifiable. In such example embodiments where a single integrated data record cannot unambiguously be provided back to the application system 106, the application system 106 may prompt a user for additional information via the UI application 130 in order to facilitate a determination that a particular integrated data record among multiple alternatives is the integrated data record that corresponds to an entity identified in the request 132. In other example embodiments, during a subsequent launch of the UI application 130 or access of a server-side UI application of an application layer 124 of the application system 106 via the client-side UI application 130, a user may be prompted to input additional identifying information that may be used to correlate multiple integrated data records.

In other example embodiments, the data correlation/integration process may be triggered in an asynchronous manner according to which the data correlation/integration server system 102 receives a seed file 144 which may be populated with data from a source data repository 128(X). The seed file 144 may include entity identifiers or complete source data records pertaining to entities (e.g., subscribers) who are registered within the application system 106 that includes the source data repository 128(X) from which the seed file 144 is received. Receipt of the seed file 144 may trigger the data correlation/integration process described herein.

Illustrative Processes

Figure 2:
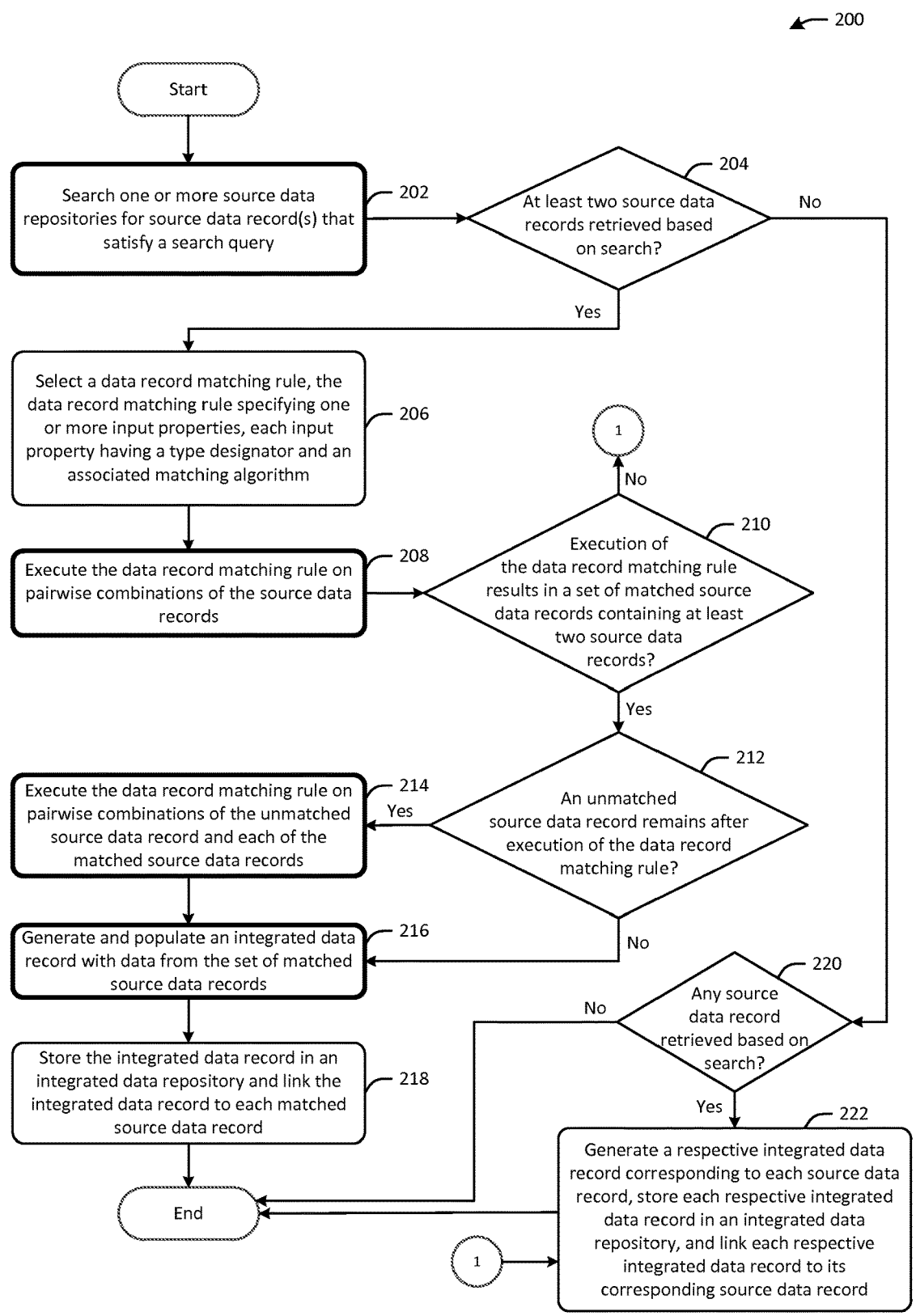
FIG. 2 is a process flow diagram of an illustrative high-level method for obtaining a set of source data records from respective source data repositories, executing a data record matching rule on pair-wise combinations of the source data records to obtain a set of matched source data records, and generating an integrated data record from the set of matched source data records in accordance with one or more example embodiments of the disclosure.

FIG. 2 is a process flow diagram of an illustrative method 200 for obtaining, from respective source data repositories, a set of source data records that satisfy a search query, executing a data record matching rule on pairwise combinations of the source data records to obtain a set of matched source data records, and generating an integrated data record from the set of matched source data records in accordance with one or more example embodiments of the disclosure. In certain example embodiments, the coordination layer 108 may coordinate the execution of respective processing by various engines of the data correlation/integration server system 102 to perform the operations of any of the methods described herein, including the method 200. More specifically, any given operation of a method described herein may be performed in response to execution of computer-executable instructions of one or more engines of the data correlation/integration server system 102 by one or more processing units of the data correlation/integration server system 102. Any particular operation described as being performed by a particular engine or other component of a system (e.g., the data correlation/integration server system 102, an application system 106, etc.) may, in various example embodiments, be performed, at least in part, by one or more other engines or components. Further, an operation described herein as being performed by an engine or component of a system may be performed in response to execution of computer-executable instructions of that engine or component. In addition, any operation of any process flow diagram included herein that is depicted with a more heavily weighted boundary than other operations may represent a series of multiple sub-operations.

The data correlation/integration server system 102 may include one or more data correlation/integration servers, where each server may include one or more processors configured to execute computer-executable instructions of the various engines of the data correlation/integration server system 102 depicted in FIG. 1A. Any of the engines may be replicated across multiple servers and/or any engine may include modules distributed across multiple servers to enable processing supported by the engine to be executed in a distributed fashion by multiple servers. An illustrative configuration of a data correlation/integration server in accordance with example embodiments of the disclosure will be described in more detail in reference to FIG. 20.

Referring now to FIG. 2, at block 202, computer-executable instructions of the SDR engine 110 may be executed to search one or more source data repositories for source data record(s) that satisfy a search query. For example, as described earlier, the SDR engine 110 may generate a search query that specifies one or more search parameters and a respective search parameter value for each search parameter. The data correlation/integration server system 102 may transmit the search query, via one or more network interfaces, to an application system 106, which may utilize a DBMS 126 to execute the search query against a source data repository 128. In certain example embodiments, an application layer 124 may receive the search query and utilize the DBMS 126 to execute the search query against the source data repository 128. If the source data repository 128 stores a source data record that contains populated data fields that match the search parameters and the corresponding search parameter values specified in the search query, the source data record may be returned to the data correlation/integration server system 102 as a source data record that satisfies the search query. A populated data field may match a search parameter and its corresponding search parameter value specified in a search query if, for example, a data field name of the data field matches a search parameter (or the data field name otherwise maps to the search parameter) and if the data populated in the data field is equivalent to the search parameter value.

The search query generated by the SDR engine 110 may be executed against a single source data repository or multiple source data repositories. Upon receiving the results of execution of the search query against one or more source data repositories, the data correlation/integration server system 102 (or more specifically, for example, the coordination layer 108 or the SDR engine 110) may determine, at block 204, whether at least two source data records have been retrieved in response to the search query. In response to a negative determination at block 204, the method 200 may proceed to block 220, where the data correlation/integration server system 102 (or more specifically, for example, the coordination layer 108 or the SDR engine 110) may determine whether a single source data record has been retrieved in response to the search query.

A negative determination at block 220 may indicate that no source data records satisfied the search query, in which case, the method 200 may end. On the other hand, in response to a positive determination at block 220, the coordination layer 108 may provide the single source data record along with an instruction to the IDR engine 118 to generate an integrated data record corresponding to the single source data record. Alternatively, the coordination layer 108 may send the single source data record returned in response to the search query or an indication thereof to the IDR engine 118, and in response, the IDR engine 118 may be configured to execute processing to generate the integrated data record corresponding to the single source data record. After generating the integrated data record, the IDR engine 110 may store the integrated data record in the integrated data repository 122 and link the stored integrated data record to the source data record stored in a source data repository 128. Generation of an integrated data record will be described in more detail in reference to FIG. 10 later in this disclosure.

Referring again to block 204, in response to a positive determination at block 204, the coordination layer 108 may send the set of source data records retrieved based on the search query to the SDR correlation engine 112 and may instruct the SDR correlation engine 112 to leverage the matching rule selection engine 114 to select a data record matching rule to execute on the set of source data records. Alternatively, in response to receipt of the set of source data records, and even in the absence of an explicit instruction from the coordination layer 108, the SDR correlation engine 112 may be configured to initiate execution of computer-executable instructions of the matching rule selection engine 114 to select a data record matching rule.

The selected data record matching rule may define one or more input properties. An input property may be a data construct that includes or is otherwise associated with various data elements that indicate attributes of the input property. The attributes of an input property may indicate which data field(s) of a source data record correspond to the input property, whether such data field(s) must be present in a source data record in order for the data record matching rule to eligible for execution with respect to the source data record, and how respective data populated in such data field(s) of different source data records are to be compared to determine a degree of similarity between the respective data.

For example, an input property may specify a respective data field designator for each of one or more data fields that correspond to the input property. A data field designator specified for an input property may be any suitable identifier that can be used to identify a corresponding data field in a source data record. A data dictionary or mapping may be used to identify a data field in a source data record that corresponds to a data field designator specified in an input property. For example, an input property may include the data field designator "City." This character string may be used to identify a data field in a source data record that is configured for receipt of input data corresponding to the name of a city (e.g., a city in an address of a registered entity).

An input property may further be associated with a type designator and a matching algorithm to be executed on respective data populated in source data record data fields corresponding to a data field designator of the input property. In certain example embodiments, a type designator and a matching algorithm may be specified as attributes of an input property within the data construct that represents the input property. In other example embodiments, an input property defined in a data record matching rule may point to (or otherwise link to) a particular type designator and a particular matching algorithm. In those example embodiments in which an input property does not specify a matching algorithm, a default matching algorithm may be used in connection with the input property. The default matching algorithm may be specified by the data record matching rule.

Further, in certain example embodiments, an input property match threshold value may also be specified for an input property. More specifically, an input property match threshold value may be specified for a matching algorithm associated with an input property. An input property match threshold value may represent a threshold value that a result value outputted by a corresponding matching algorithm must satisfy in order for inputs to the matching algorithm to be considered a match. As previously noted, the inputs to a matching algorithm associated with an input property may be first data populated in a first data field of a first source data record and second data populated in a second data field of a second source data record, where the first data field and the second data field correspond to a data field designator of the input property. In certain example embodiments, an input property may specify multiple matching algorithms, where each matching algorithm corresponds to a respective data field designator of multiple data field designators identified in the input property. In such example embodiments, a respective input property match threshold value may be associated with each matching algorithm. In certain example embodiments, an input property may not specify an input property match threshold value. In such example embodiments, a default input property match threshold value may be associated with the input property. The default input property match threshold value may be a rule match threshold value, which will be described in more detail later in this disclosure.

Referring now to type designators more particularly, a type designator associated with an input property may be any suitable identifier (e.g., a character string) that indicates whether the input property is a required input property, an optional input property, or a choice input property. More specifically, an example type designator may, for example, indicate that an input property is a "required" input property. If a matching rule designates an input property as a required input property, a populated data field that corresponds to a data field designator identified in the input property must be present in each source data record within a set of source data records in order for the matching rule to be eligible for execution on the set of source data records. Another example type designator may be, for example, a type designator that indicates that an input property is an "optional" input property. If a matching rule designates an input property as an optional input property, a populated data field that corresponds to a data field designator identified in the input property is not required to be (but may be) present in any source data record within a set of source data records in order for the matching rule to be eligible for execution on the set of source data records.

Still another example type designator may be, for example, a type designator that indicates that an input property is a "choice" input property. If a matching rule designates an input property as a "choice" input property, then a respective populated data field corresponding to at least one of multiple data field designators identified in the input property (or across multiple related choice input properties) must be present in each source data record of a set of source data records in order for the matching rule to be eligible for execution on the set of source data records. In certain example embodiments, a data record matching rule may specify multiple "choice" input properties that operate independently of one another. For example, a data record matching rule may associate the "choice" type designator with a first input property and with a second input property. In such example embodiments, each source data record in a set of source data records must include a respective populated data field corresponding to at least one data field designator identified in the first input property and a respective populated data field corresponding to at least one data field designator identified in the second input property in order for the data record matching rule to be eligible for execution on the set of source data records.

In certain example embodiments, each input property may specify a single data field designator indicative of a corresponding data field in a source data record. In such example embodiments, if an input property is associated with a type designator that indicates that the input property is a "choice" input property, the type designator may further include a sub-type designator that may indicate that the input property is a member of a specific set of alternative input properties defined in the data record matching rule. For each alternative input property associated with the same sub-type designator, as long as a populated data field corresponding to a respective data field designator identified in at least one of the alternative input properties is present in a source data record, the data record matching rule may be eligible for execution with respect to the source data record. In those example embodiments in which each choice input property contains only one data field designator, a sub-type designator may only be included if the data record matching rule specifies multiple sets of choice input properties where each set of choice input properties operates independently of each other set of choice input properties. For example, a first sub-type designator may be associated with a first group of choice input properties and a second sub-type designator may be associated with a second group of choice input properties to indicate that a source data record need only include a populated data field corresponding to any given choice input property in the first group and a populated data field corresponding to any choice input property in the second group in order for the source data record to satisfy the first and second group of choice input properties.

A matching algorithm associated with an input property may be an algorithm that can be executed to compare first data populated in a first data field of a first source data record with second data populated in a second data field of a second source data record, where the first data field and the second data field correspond to the same data field designator identified in the input property. In particular, a matching algorithm associated with an input property may be executed to determine a degree of similarity between the first data and the second data.

Any of a variety of matching algorithms may be executed in connection with an input property. The type of matching algorithm that is associated with an input property may depend on the nature of the data that is to be compared using the matching algorithm. For example, a string matching algorithm may be executed to compare two character strings and assess their degree of similarity. As another example, a number matching algorithm may be executed to compare two numeric quantities (e.g., a first value populated in a zip code data field of a first source data record and a second value populated in a zip code data field of a second source data record) and assess their degree of similarity.

The output of a matching algorithm may be any suitable metric that provides a measure of how similar or different the inputs to the algorithm are. In certain example embodiments, the output of a matching algorithm may be a distance metric such as an edit distance that indicates the minimum number of operations required to transform one string of symbols into another string of symbols. An example of such a distance matching algorithm is the Levenshtein distance algorithm that receives two character strings as input and generates a Levenshtein distance indicating the minimum number of single-character edits (e.g., insertions, deletions, or substitutions) required to transform one character string into the other. The edit distance generated by a distance matching algorithm may depend on the types of transformation operations that are permitted by the algorithm. For example, other types of distance matching algorithms include, without limitation, the Damerau-Levenshtein distance matching algorithm which permits transposition of adjacent characters in addition to insertions, deletions, or substitutions; the "longest common subsequence" distance matching algorithm which only permits insertions or deletions; and the Hamming distance algorithm which permits only substitution, and thus, requires input strings of equal length.

Another example type of matching algorithm is a probability-based matching algorithm that returns a probability value that is a measure of how similar (or different) inputs to the algorithm are. In certain example embodiments, a probability value of 1 (e.g., 100%) returned by a probability-based matching algorithm may indicate identical inputs, while a probability value of 0 (e.g., 0%) may indicate complete dissimilarity. Thus, in certain example embodiments, the lower the value returned by a probability-based matching algorithm, the lower the degree of similarity between the inputs to the algorithm.

Yet another example type of matching algorithm is a matching algorithm that returns a Boolean value. For example, such a matching algorithm may return a first value indicating that inputs to the algorithm have matched or a second value indicating that inputs to the algorithm have not matched. In certain example embodiments, a Boolean matching algorithm may output a value indicative of a match even if the inputs to the algorithm are not an exact match (e.g., are not identical).

One or more matching algorithms may be associated with an input property. If a single matching algorithm is associated with an input property, that matching algorithm may be executed to compare respective data populated in respective source data record data fields corresponding to each data field designator identified in the input property. In other example embodiments, if an input property includes multiple data field designators, multiple matching algorithms may be associated with the input property, such that each matching algorithm may be executed on respective data populated in respective source data record data fields corresponding to a respective data field designator.

For example, assume that a particular input property includes the following data field designators: "EmailAddress" and "SocialNetworkingID." If the input property is a "choice" input property, for example, a source data record may satisfy the input property as long as at least one of a first data field of the source data record that is configured to receive an email address as input or a second data field of the source data record that is configured to receive a social networking identifier as input is populated with respective data. If a single matching algorithm is specified for the input property (e.g., a string matching algorithm), that algorithm may be used to compare first data populated in an email address data field of a first source data record with second data populated in an email address data field of a second source data record. That same algorithm may also be used to compare first data populated in a social networking id data field of the first source data record and second data populated in a social networking id data field of the second source data record. Assume, on the other hand, that a particular choice input property includes the following alternative data field designators: "EmailAddress" and "Phone." In such an example scenario, a different matching algorithm may be associated with each data field designator. For example, a string matching algorithm may be executed to compare respective data populated in source data record data fields corresponding to the "EmailAddress" data field designator and a number matching algorithm may be used to compare respective data populated in source data record data fields corresponding to the "Phone" data field designator.

If no type designator is explicitly associated with an input property (e.g., specified within the data construct representative of the input property), a default type designator may be associated with the input property. The default type designator may be, for example, a type designator that indicates that an input property is a required input property or an optional input property. Similarly, if no matching algorithm is explicitly associated with an input property, a default matching algorithm specified for the data record matching rule (e.g., a string matching algorithm) may be used in connection with that input property.

In certain example embodiments, the data record matching rule selected at block 206 may be a first data record matching rule determined to be eligible for execution on the set of source data records from among a set of candidate data recording matching rules. A data record matching rule may be determined to be eligible for execution on a set of source data records if: 1) each source data record includes a respective populated data field corresponding to each respective data field designator identified in each required input property and 2) each source data record includes a respective populated data field corresponding to a respective at least one data field designator identified in each choice input property (or each source data record includes a respective populated data field corresponding to a respective at least one choice input property among a group of choice input properties associated with the same sub-type designator). Selection of a first data record matching rule determined to eligible for execution on a set of source data records will be described in more detail in reference to FIG. 3.

In other example embodiments, a data record matching rule determined to be a "best match" among a set of candidate data record matching rules may be selected at block 206. A "best match" data record matching rule may be a rule having the greatest number of required input properties and/or the lowest match threshold ratio among the set of candidate data record matching rules. The match threshold ratio for a data record matching rule may be defined as a ratio of the number of required input properties specified by the data record matching rule to a rule match threshold value associated with the data record matching rule. Alternatively, a "best match" data record matching rule may be a rule having the highest associated matching rule score. The matching rule score may be determined as a weighted combination of any number of attributes of the matching such as, for example, the number of required input properties, the match threshold ratio, and so forth. Selection of a "best match" data record matching rule will be described in more detail in reference to FIGS. 5 and 6.

After a data record matching rule has been selected, the method 200 may proceed to block 208 where the SDR correlation engine 112 may leverage the matching rule execution engine 116 to execute the selected data record matching rule on the set of source data records retrieved based on the search query. More specifically, the matching rule execution engine 116 may execute the selected data record matching rule on pairwise combinations of the source data records. At block 210, the matching rule execution engine 116 may determine whether execution of the data record matching rule on pairwise combinations of the source data records resulted in a set of at least two matched source data records.

As will be described in more detail later in this disclosure, in certain example embodiments, an input property match confidence value may be determined based at least in part on the result value outputted by a matching algorithm associated with an input property. If, for example, the matching algorithm is a probability-based algorithm, the input property match confidence value may be the probability value returned by the algorithm. If, for example, the matching algorithm is a Boolean algorithm, the Boolean value outputted by the algorithm may be converted to a corresponding probability value. For example, a Boolean value that indicates matching inputs may be converted to a match confidence value of 100 (e.g., 100%) and a Boolean value that indicates non-matching inputs may be converted to a match confidence value of 0 (e.g., 0%).

In certain example embodiments, an input property match threshold value may be associated with an input property, or more specifically, with a particular matching algorithm and corresponding data field designator of the input property. For certain types of matching algorithms, an input property match confidence value may be determined based at least in part on the result value outputted by the matching algorithm and the input property match threshold value. For example, for a distance matching algorithm, the input property match confidence value may be calculated based on the following formula that takes into account both the distance metric outputted by the algorithm as well as the input property match threshold value: Match Confidence Value=(100−(Distance*(100/(Match Threshold Value+1)))).

Assuming that the selected data record matching rule is executed on a pairwise combination of a first source data record and a second source data record, a respective input property match confidence value may be determined for each data field designator identified in each input property based on the output result of execution of a respective matching algorithm on respective data populated in data fields of the first and second source data records that correspond to the data field designator. A cumulative confidence value (e.g., an initial value of a cumulative confidence parameter) associated with execution of the data record matching rule on the pairwise combination of the first source data record and the second source data record may be initialized to a default value and then iteratively adjusted based on one or more input property match confidence values to generate one or more intermediate cumulative confidence values.

Any given input property match confidence value may or may not be used to adjust a current intermediate cumulative match confidence value depending on whether the input property to which the given input property match confidence value corresponds is a required, optional, or choice input property. If the input property is a required input property, an input property match confidence value determined for respective data populated in data fields of the first and second source data records that correspond to a data field designator identified in the required input property may be used to adjust a current intermediate cumulative match confidence value regardless of whether the input property match confidence value would enhance or degrade (e.g., increase or decrease) the current intermediate cumulative match confidence value. On the other hand, if the input property is an optional input property, an input property match confidence value determined for respective data populated in data fields of the first and second source data records that correspond to a data field designator identified in the optional input property may be used to adjust a current intermediate match confidence value only if the input property match confidence value would enhance the current intermediate cumulative match confidence value.

Moreover, if the input property is a choice input property, an input property match confidence value determined for respective data populated in data fields of the first and second source data records that correspond to a data field designator identified in the choice input property may be used to adjust a current intermediate cumulative match confidence value regardless of whether the input property match confidence value enhances or degrades the current intermediate cumulative match confidence value if a match has not already been determined with respect to another alternative data field designator identified in the choice input property. For example, if an input property match confidence value determined with respect to a particular alternative data field designator identified in a choice input property satisfies a corresponding input property match threshold value, and no other input property match confidence value has already been determined to satisfy an input property match threshold value with respect to another alternative data field designator identified in the choice input property, then the input property match confidence value may be used to adjust a current intermediate cumulative match confidence value regardless of whether the input property match confidence value enhances or degrades the current intermediate cumulative match confidence value. Any subsequent input property match confidence value determined with respect to another data field designator identified in the choice input property may only be used to adjust a current intermediate cumulative confidence value if the subsequent input property match confidence value satisfies an input property match threshold value and enhances the current intermediate cumulative confidence value.

In certain example embodiments, a current intermediate cumulative confidence value may be adjusted using a particular input property match confidence value corresponding to a particular input property to generate an adjusted intermediate cumulative confidence value by averaging the input property match confidence values used to determine the current intermediate cumulative confidence value with the particular input property match confidence value. In other example embodiments, other statistical metrics may be used to generate an adjusted intermediate cumulative confidence value such as a median value.

In certain example embodiments, different input property match confidence values may be assigned different weights based, for example, on the type designators associated with the different input properties. For example, an input property match confidence value associated with a required input property may be assigned a greater weight than an input property match confidence value associated with an optional input property. As another example, an input property match confidence value associated with a first alternative data field designator that matches in a choice input property (or a first choice input property that matches in a set of related choice input properties) may be assigned a same or similar weight as an input property match confidence value associated with a required input property, whereas an input property match confidence value associated with a subsequent alternative data field that matches in the choice input property (or a subsequent choice input property that matches in the set of related choice input properties) may be assigned a lower weight (e.g., a weight that is the same or similar to a weight assigned to an input property match confidence value associated with an optional input property). In addition, in certain example embodiments, input property match confidence values associated with different input properties having the same type designator (e.g., the required type designator) may be assigned different weights.

An adjusted intermediate cumulative confidence value that takes into account each input property match confidence value that should be taken into account based on the type of input property (e.g., required, optional, or choice) to which the input property match confidence value relates may be selected as the final cumulative confidence value associated with execution of the selected data record matching rule on the pairwise combination of the first and second source data records.

In accordance with the above-described process, a respective cumulative confidence value may be determined for execution of the data record matching rule on each of one or more pairwise combinations of source data records in the set of source data records. If a respective cumulative confidence value associated with a pairwise combination of a first source data record and a second source data record satisfies a rule match threshold value associated with the data record matching rule, then the first source data record and the second source data record may be determined to be matching source data records and may be included in a set of matched source data records. A third source data record determined to match, for example, the second source data record may also be included in the set regardless of whether the data record matching rule is executed on the pairwise combination of the first source data record and the third source data record. Execution of a data record matching rule on pairwise combinations of source data records to determine a set of matched source data records will be described in more detail in reference to FIGS. 7 and 9A-9B.

In response to a negative determination at block 210, that is, a determination that execution of the data record matching rule does not result in a set of matched source data records containing at least two source data records, the method 200 may proceed to block 222 where the IDR engine 118 may execute processing to generate a separate integrated data record for each source data record retrieved based on the search query. Each such integrated data record may be stored in the integrated data repository 122 and linked to its corresponding source data record stored in a source data repository 126.

On the other hand, in response to a positive determination at block 210, computer-executable instructions of the matching rule execution engine 116 may be executed to determine, at block 212, whether an unmatched source data record remains after execution of the data record matching rule. A positive determination at block 212 may occur if, for example, execution of the data record matching rule results in: 1) a subset of matched source data records being identified from the set of source data records retrieved based on the search query and 2) one or more unmatched source data records that are not matched to any source data record in the subset.

In response to a positive determination at block 212, the matching rule execution engine 116 may execute the data record matching rule on pairwise combinations of each unmatched source data record and one or more matched source data records at block 214. The operation at block 214 may be performed as a result of the manner in which the data record matching rule is executed. For example, assume that the set of source data records includes 3 source data records (e.g., Record_1, Record_2, and Record_3). In certain example embodiments, the matching rule execution engine 116 may initially execute the data record matching rule on the pairwise combination (Record_1, Record_2) and the pair-wise combination (Record_1, Record_3).

In certain example implementations, if Record_1 is determined to match Record_2 based on execution of the data record matching rule on the pairwise combination (Record_1, Record_2), then the data record matching rule may not be executed on a pairwise combination of Record_2 with any other source data record in the set of source data records (in this example Record_3). Accordingly, if execution of the data record matching rule on the pairwise combination (Record_1, Record_3) does not result in match, the set of matched source data records may include Record_1 and Record_2 while Record_3 may be an unmatched source data record. However, it is possible that Record_3 would have been determined to be a match with Record_2 if the data record matching rule was executed on the pairwise combination (Record_2, Record_3).

Thus, the operation at block 214 may be performed to determine whether an unmatched source data record matches an already matched source data record against which the unmatched source data record was not previously compared as a result of the matched source data record having already been matched to another source data record in a previous iterative execution of the data record matching rule. It should be appreciated that if multiple sets of matched source data records are determined as a result of one or more prior iterations of the data record matching rule, a subsequent iteration of the data record matching rule may be executed on a pairwise combination of an unmatched source data record and at least one matched source data record from each set of matched source data records. In addition, a subsequent iteration of the data record matching rule may also be executed on a pairwise combination of a first matched source data record from a first set of matched source data records and a second matched source data record from a second set of matched source data records. In still further example embodiments, a different data record matching rule may be executed on a pairwise combination of the first source data record and the second matched source data record. If the first matched source data record and the second matched source data record are determined to match, the first set of matched source data records and the second set of matched source data records may be merged. Iterative execution of a data record matching rule on pairwise combinations of an unmatched source data record and one or more matched source data records will be described in more detail in reference to FIG. 8 later in this disclosure.

From block 214, the method may proceed to block 216. Similarly, if the matching rule execution engine 116 determines that there are no unmatched source data records (e.g., a negative determination at block 212), the method may also proceed to block 216. At block 216, the IDR engine 118 may generate an integrated data record that is populated with at least data from one or more source data records of the set of matched source data records. At block 218, the integrated data record may be stored in the integrated data repository 122 and linked to each source data record in the set of matched source data records. Each matched source data record may be stored in a respective source data repository 128. In certain example embodiments, the integrated data record generated and populated at block 216 may include respective data from each of the matched source data records. In other example embodiments, duplicative data from one or more source data records may not be included in the integrated data record. Further, in certain example embodiments, if a first data field of a first matched source data record is populated with first data and a second corresponding data field of a second matched source data record is populated with second data that is different from the first data (e.g., the first data field is populated with a first email address and the second data field is populated with a second email address), both the first data and the second data may be populated in the integrated data record. A method for generating an integrated data record and populating the integrated data record with data from a set of matched source data records will be described in more detail in reference to FIG. 10 later in this disclosure.

Figure 3:
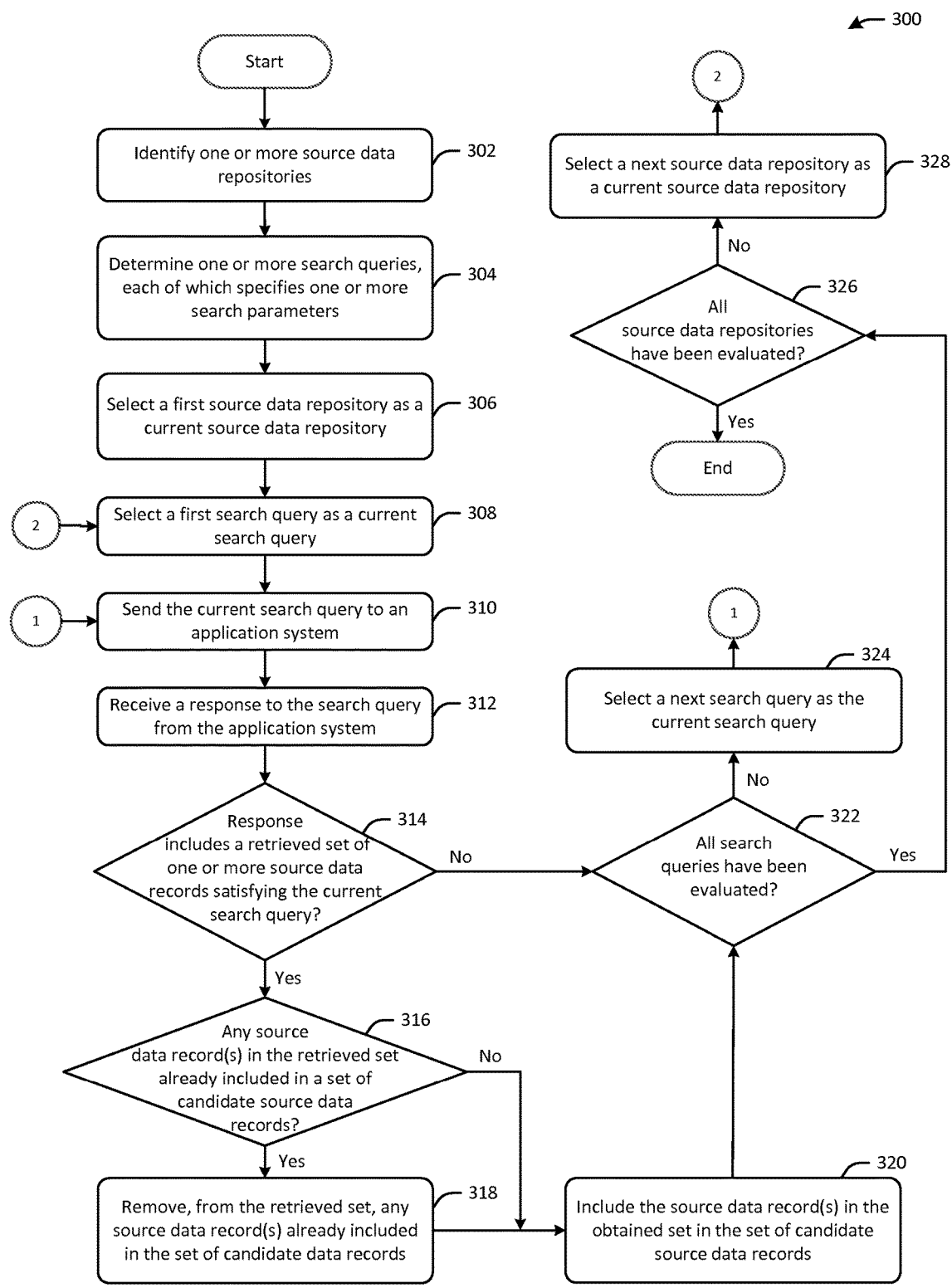
FIG. 3 is a process flow diagram of an illustrative method for obtaining source data records that satisfy search parameter(s) of a search query from various source data repositories in accordance with one or more embodiments of the disclosure.

FIG. 3 is a process flow diagram of an illustrative method 300 for obtaining source data records that satisfy search parameter(s) of a search query from various source data repositories in accordance with one or more embodiments of the disclosure. One or more operations of method 300 may be performed by the SDR engine 110, or more specifically, in response to execution of computer-executable instructions of the SDR engine 110. It should be appreciated, however, that any operation of method 300 may be performed, at least in part, by one or more other engines (e.g., the IDR engine 118) of the data correlation/integration server system 102.

At block 302, the SDR engine 110 may identify one or more source data repositories 128. The SDR engine 110 may identify the one or more source data repositories 128 from a predetermined set of source data repositories 128 associated with application systems 106 that leverage services provided by the data correlation/integration server system 102. This predetermined set of source data repositories 128 may be configurable and/or may be provided to the SDR engine 110 in a parameter file, as options associated with an invocation of the source data record retrieval process, or the like.

At block 304, the SDR engine 110 may determine one or more search queries, each of which specifies one or more search parameters and a respective search parameter value for each search parameter. A search parameter may be, for example, a character string that matches a data field name of a corresponding data field in a source data record (as specified, for example, in a data dictionary or mapping); an offset value that indicates a particular data field in a source data record; or the like. Further, a search query may include one or more logical ANDs and/or one or more logical ORs of search parameters and/or a logical AND or a logical OR between two combinations of search parameters, where each combination may itself be a logical AND and/or a logical OR of one or more search parameters.

As previously described, in certain example embodiments, a search query may be generated from a seed file received from an application system 106. In certain example embodiments, the seed file may be populated with one or more source data records stored in a source data repository 128 of the application system 106. In other example embodiments, the seed file may refer back to one or more source data records stored in the source data repository 128. For example, the seed file may include a source data record identifier that may be used to retrieve a corresponding source data record from the source data repository 128. In those example embodiments in which a seed file is received, a set of one or more data field values of a source data record that is either included in the seed file or identified in the seed file may be selected as search parameter values for a search query. In contrast, if a request for an integrated data record is received from an application system 106, data field values specified in the request.

After generating the one or more search queries, the SDR engine 110 may, at blocks 306-322, iteratively execute each search query against each of the one or more source data repositories. More specifically, the SDR engine 110 may order the set of one or more source data repositories and the set of one or more search queries to enable iteration through each set. For example, the SDR engine 110 may assign a respective identifier of each source data repository to a corresponding position in a first ordered data structure (e.g., a list, an array, a container, a map/associative array/dictionary, a queue, a tree, a graph, etc.). Similarly, the SDR engine 110 may assign a respective search query to a corresponding position in a second ordered data structure. Then, at block 306, the SDR engine 110 may select a respective identifier of a first source data repository from the first ordered data structure as a current source data repository, and at block 308, may select a first search query from the second ordered data structure as a current search query. Any other set of elements described herein (e.g., a set of source data records, a set of matched source data records, a set of candidate data record matching rules, etc.) may be represented by an underlying ordered data structure that enables iteration through elements of the set.

More specifically, the term "set" may be used herein at times to indicate an ordered collection of elements or objects that can be iteratively evaluated or processed. However, it should be appreciated that when the term "set" is used with this connotation, any underlying data structure having an inherent order (including any of those mentioned earlier) may be generated to represent the set. It should further be appreciated that the term "set" may at other times be used herein to merely connote a collection of elements or objects that do not have a designated order. In addition, in certain example embodiments, an ordered data structure may be iterated through by selecting elements of the ordered data structure in succession in accordance with their positions in the ordered data structure. In other example embodiments, an ordered data structure may be iterated through by assigning a pointer to an initial element of the ordered data structure and incrementing the pointer to each successive element of the ordered data structure until the pointer has been incremented to a last element of the ordered data structure.

At the block 310, the SDR engine 110 may send the current search query to an application layer 124 of an application system 106 that includes the current source data repository 128. The application layer 124 may then access a DBMS 126 of the application system 106 to identify and retrieve those source data record(s) (if any) that satisfy the current search query. Alternatively, the SDR engine 110 may submit the current search query to the DBMS 126 directly. At block 312, the application system 106 may return a response to the current search query (potentially via its application layer 124). At block 314, the SDR engine 110 may determine whether the response includes any source data record(s) that have been identified as satisfying the current search query and retrieved from the current source data repository. In other example embodiments, the SDR engine 110 may determine whether the response received from the application system indicates that one or more source data records stored in the current source data repository satisfy the search query, and if so, may send an additional query to the application system to retrieve the source data record(s).

In response to a positive determination at block 314, the method 300 may proceed to block 316, where the SDR engine 110 may determine whether any source data record(s) in the retrieved set of source data record(s) included in the response received from the application system are already included in a set of candidate source data records. For example, a source data record received in response to the current search query may have already been received and included in the set of candidate source data records based on a prior iteration of blocks 306-322. More specifically, a source data record received in response to the current search query may have already been received from the current source data repository in response to a prior search query.

In response to a positive determination at block 316 indicating that the set of source data record(s) retrieved based on the current search query includes one or more source data records that are duplicative of source data record(s) in the set of candidate source data records, the SDR engine 110 may, at block 318, remove such duplicative source data records from the set of source data record(s) received at block 312 and include the remaining source data record(s) in the set of candidate source data records at block 320. In response to a negative determination at block 316, the method 300 may skip the operation at block 316 and proceed directly to block 320.

From block 320, the method 300 may proceed to block 322. The method 300 may also proceed to block 322 in response to a negative determination at block 314, indicating a determination, based on the response received from the application system, that the current source data repository includes no source data record that satisfies that the current search query. At block 322, the SDR engine 110 may determine whether all of the one or more search queries have been evaluated. In response to a negative determination at block 322, the SDR engine 110 may select a next search query as the current search query at block 324. From block 324, the method 300 may proceed iteratively from block 310.

On the other hand, in response to a positive determination at block 322, indicating that each search query has been executed against the current source data repository, the method 300 may proceed to block 326, where the SDR engine 100 may determine whether all source data repository(ies) have been evaluated. In response to a negative determination at block 326, the method 300 may proceed to block 328, where the SDR engine 100 may select a next source data repository as the current source data repository. From block 328, the method may again proceed iteratively from block 308 until each search query has been executed against the current source data repository. In response to a positive determination at block 326, the method 300 may end since all search query(ies) have been executed against all source data repository(ies).

Figure 4A:
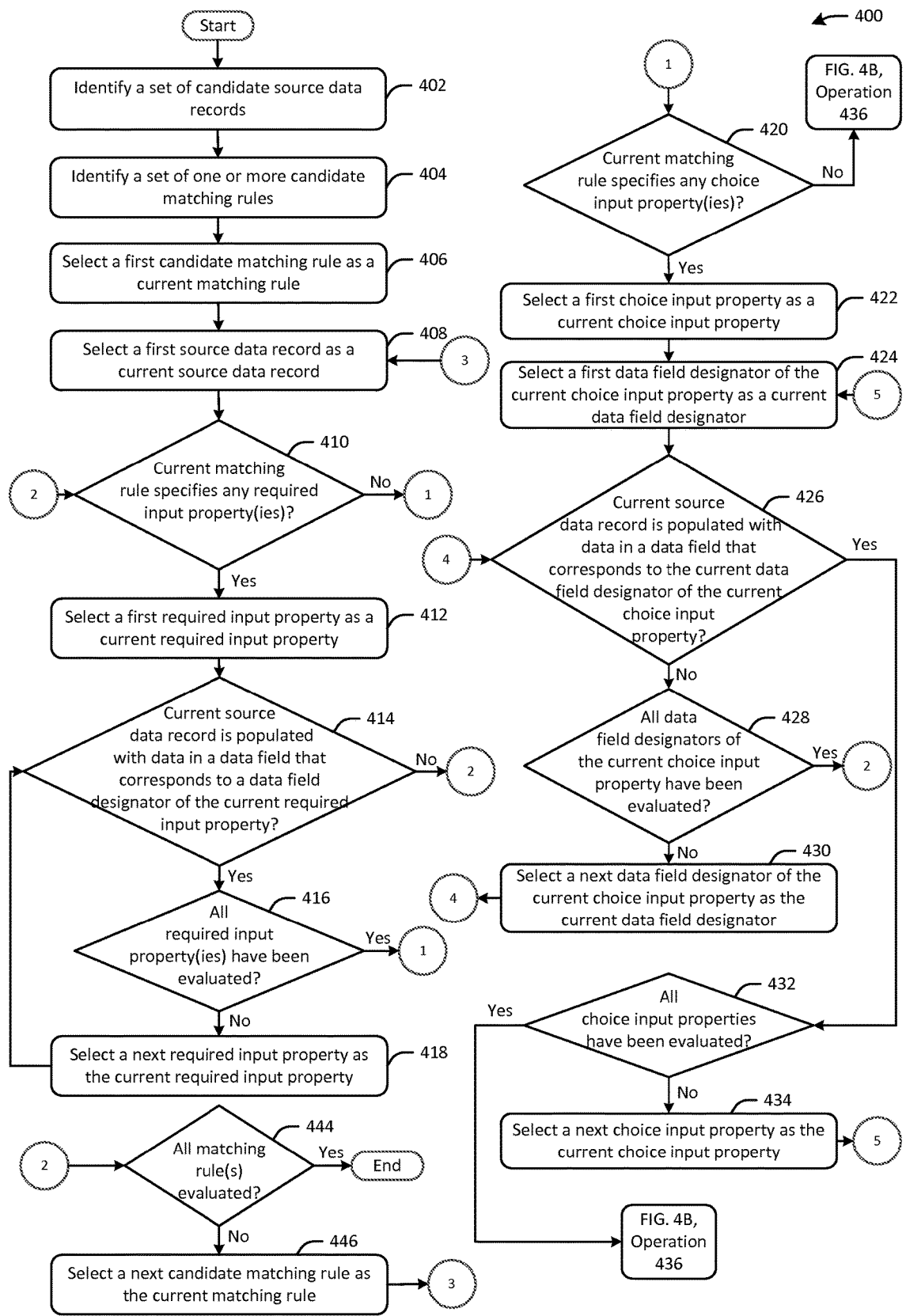
FIGS. 4A-4B are process flow diagrams of an illustrative method for selecting, for execution on a set of source data records, a data record matching rule from a set of candidate data record matching rules in accordance with one or more example embodiments of the disclosure.
Figure 4B:
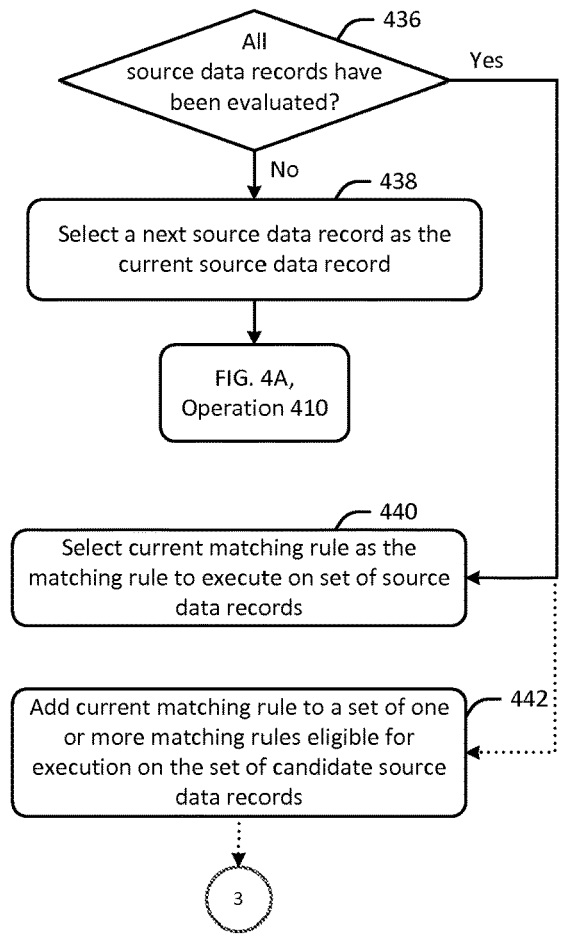

FIGS. 4A-4B are process flow diagrams of an illustrative method 400 for selecting, for execution on a set of source data records, a data record matching rule from a set of candidate data record matching rules in accordance with one or more example embodiments of the disclosure. One or more operations of method 400 may be performed by the matching rule selection engine 114, or more specifically, in response to execution of computer-executable instructions of the matching rule selection engine 114. It should be appreciated, however, that any operation of method 400 may be performed, at least in part, by one or more other engines/sub-engines of the data correlation/integration server system 102.

At block 402, the matching rule selection engine 114 may identify a set of source data records. The set of source data records identified at block 402 may be, for example, the set of candidate source data records received by the SDR engine 110 as a result of the execution of one or more search queries against one or more registry source data repositories, as described in reference to the illustrative method 300 of FIG. 3. The matching rule selection engine 114 may receive the set of candidate source data records directly from the SDR engine 110 or via the coordination layer 108 of the data correlation/integration server system 102.

At block 404, the matching rule selection engine 114 may identify a set of one or more candidate data record matching rules. In certain example embodiments, the matching rule selection engine 114 may include a configuration for each candidate data record matching rule. The configuration of each candidate matching rule may be generated in accordance with a template that indicates attribute(s) of the candidate matching rule to be specified in the configuration. More specifically, the configuration of a candidate matching rule may specify an identifier of the candidate matching rule, a rule match threshold value associated with the candidate matching rule, a default matching algorithm associated with the candidate matching rule, and optionally, a default type designator for any input property that is not explicitly associated with a particular type designator. The configuration of a candidate matching rule may further specify a respective configuration of each of one or more input properties of the candidate matching rule. The configuration of an input property may also be generated in accordance with a template and may specify various attributes of the input property such as, for example, one or more data field designators of the input property, a type designator of the input property (potentially along with a sub-type designator), a respective matching algorithm associated with each data field designator, a respective match threshold value associated with each matching algorithm, and so forth. It should be appreciated that one or more of the example attributes of the data record matching rule or of an input property may not be specified in example configurations.

Example Extensible Markup Language (XML) computer-executable code representative of an example template for configuring data record matching rules is shown below. The example code shown below may form part of, for example, the matching rule selection engine 114. It should be appreciated that the XML code shown below is merely an example template and that this disclosure encompasses other data record matching rule template configurations written in any suitable programming language.

```xml
<?xml version="1.0" encoding="utf-8"?>
<xs:schema attributeFormDefault="unqualified"
elementFormDefault="qualified"
xmlns:xs="http://www.w3.org/2001/XMLSchema">
  <xs:element name="matchingEngine">
   <xs:complexType>
    <xs:sequence>
     <xs:element minOccurs="0" name="matchingRules">
      <xs:complexType>
       <xs:sequence>
        <xs:element minOccurs="0" maxOccurs="unbounded"
          name="addMatchingRule">
         <xs:complexType>
          <xs:sequence>
           <xs:element minOccurs="0" name="inputProperties">
            <xs:complexType>
             <xs:sequence>
              <xs:element minOccurs="0" maxOccurs="unbounded"
name="addInputProperty">
               <xs:complexType>
                <xs:attribute name="name" type="xs:string"
                  use="required" />
                <xs:attribute name="kind" type="xs:string"
                  use="optional" />
                <xs:attribute name="matchThreshold"
                  type="xs:unsignedByte" use="optional" />
                <xs:attribute name="algorithmType" type="xs:string"
                  use="optional" />
               </xs:complexType>
              </xs:element>
             </xs:sequence>
            </xs:complexType>
           </xs:element>
          </xs:sequence>
          <xs:attribute name="name" type="xs:string" use="required" />
          <xs:attribute name="matchThreshold" type="xs:unsignedByte"
            use="required" />
          <xs:attribute name="algorithmType" type="xs:string"
            use="required" />
         </xs:complexType>
        </xs:element>
       </xs:sequence>
      </xs:complexType>
     </xs:element>
    </xs:sequence>
   </xs:complexType>
  </xs:element>
</xs:schema>
```

In addition, example XML code representing an example data record matching rule configuration based on the template above is shown below.

```xml
<matchingEngine>
  <matchingRules>
    <addMatchingRule name="SRSRule" matchThreshold="90"
algorithmType="Fiserv.Now.MatchingEngine.StringCompareMatchingAlgorithm,
Fiserv.Now.MatchingEngine" >
      <inputProperties>
        <addInputProperty name="FirstName" kind="Optional" matchThreshold="3"
algorithmType="Fiserv.Now.MatchingEngine.LevenshtienDistanceMatchingAlgorithm" />
        <addInputProperty name="LastName" kind="Required"
algorithmType="Fiserv.Now.MatchingEngine.DoubleMetaphoneMatchingAlgorithm" />
        <addInputProperty name="AddressLine1" kind="Required"
algorithmType="Fiserv.Now.MatchingEngine.AddressLineMatchingAlgorithm" />
        <addInputProperty name="AddressLine2" kind="Optional"
algorithmType="Fiserv.Now.MatchingEngine.AddressLineMatchingAlgorithm" />
        <addInputProperty name="AddressLine3" kind="Optional"
algorithmType="Fiserv.Now.MatchingEngine.AddressLineMatchingAlgorithm" />
        <addInputProperty name="City" kind="Required" />
        <addInputProperty name="State" kind="Required" />
        <addInputProperty name="PostalCode" kind="Required"
algorithmType="Fiserv.Now.MatchingEngine.NumberCompareMatchingAlgorithm,
Fiserv.Now.MatchingEngine" />
        <addInputProperty name="Phone" kind="Choice"
algorithmType="Fiserv.Now.MatchingEngine.NumberCompareMatchingAlgorithm,
Fiserv.Now.MatchingEngine" />
        <addInputProperty name="EmailAddress" kind="Choice"
algorithmType="Fiserv.Now.MatchingEngine.StringCompareMatchingAlgorithm,
Fiserv.Now.MatchingEngine" />
      </inputProperties>
    </addMatchingRule>
  </matchingRules>
</matchingEngine>
```

With regards to the example data record matching rule configuration shown above, the "name" attribute specified for each input property may be a data field designator of the input property, as that term is used herein. Further, the "kind" attribute specified for each input property may be a type designator associated with the input property, as that term is used herein. In addition, the "algorithmType" attribute specified for each input property may indicate a matching algorithm to be executed on respective data of source data record data fields corresponding to the "name" attribute of the input property.

In the example data record matching rule configuration shown above, each input property identifies a single data field designator (e.g., a single "name" attribute). Thus, the example configuration above corresponds to those example embodiments in which the input properties associated with the "Choice" type designator (e.g., the "kind" attribute "Choice") constitute a set of alternative input properties such that the data record matching rule is eligible for execution with respect to any source data record that includes a populated data field corresponding to the "name" attribute of any of the alternative input properties. More specifically, with respect to the example configuration above, the data record matching rule would be eligible for use in connection with any source data record that includes at least one of a populated data field corresponding to the "Phone" input property or a populated data field corresponding to the "EmailAddress" input property.

Although not depicted above, the example data record rule configuration may further include a sub-type designator associated with each "Choice" input property that indicates a particular set of alternative input properties to which each "Choice" input property belongs. For example, if the example configuration shown above further included a "Username" input property and a "SocialNetworkingID" input property, and the sub-type designator "A" was associated with the "Username" input property and the "EmailAddress" input property, while the sub-type designator "B" was associated with the "SocialNetworkingID" input property and the "Phone" input property, then the data record matching rule would be eligible for execution with respect to any source data record that included at least one of a populated data field corresponding to the "Phone" input property or a populated data field corresponding to the "SocialNetworkingID" input property and at least one of a populated data field corresponding to the "EmailAddress" input property or a populated data field corresponding to the "Username" input property.

Although not depicted in the example configuration shown above, each input property associated with the "Choice" type designator may identify multiple data field designators (e.g., multiple "name" attributes) that represent alternatives for the choice input property, as previously described. For example, in certain example embodiments, "Phone" and "EmailAddress" may be different data field designators identified for a single choice input property. The data record matching rule would then be eligible for use in connection with any source data record that includes a respective populated data field corresponding to any of the alternative data field designators. Additional input properties may then be associated with the "Choice" type designator, with each such input property specifying multiple alternative data field designators. FIGS. 4A-4B will be described assuming an example embodiment in which a choice input property identifies multiple alternative data field designators. Further, although a single example matching rule configuration is shown above, FIGS. 4A-4B will be described assuming that matching rule configurations have been specified.

At block 406, the matching rule selection engine 114 may select a first candidate matching rule from the set of one or more candidate matching rules as a current candidate matching rule. An order in which candidate data record matching rules are selected for evaluation may be determined, for example, based on the order of the respective configurations of the candidate matching rules in the matching rule selection engine 114. At block 408, the candidate matching rule selection engine 114 may select a first source data record from the set of candidate source data records as a current source data record.

At block 410, the candidate matching rule selection engine 114 may determine whether the current candidate matching rule includes any required input property(ies) by iterating through the input property(ies) of the current matching rule and determining the type designator associated with each input property. If the candidate matching rule selection engine 114 does not encounter a type designator indicative of a required input property, the candidate matching rule selection engine 114 may make a negative determination at block 410, and the method 400 may proceed to block 420. Processing at block 420 will be described in more detail later in this disclosure.

On the other hand, if the matching rule selection engine 114 does encounter a required input property, the matching rule selection engine 114 may select the input property as a current required input property at block 412. At block 414, the matching rule selection engine 114 may determine whether the current source data record includes a populated data field that corresponds to a data field designator identified in the current required input property. If the current source data record does not include a populated data field that corresponds to the data field designator identified in the current required input property, the matching rule selection engine 114 may determine that the current matching rule is ineligible for execution on the set of candidate source data records, and the method 400 may proceed to block 444, where the matching rule selection engine 114 may determine whether all candidate matching rule(s) have been evaluated. In response to a positive determination at block 444, the method 400 may end with no candidate matching rule having been identified as being eligible for execution on the set of candidate source data records. Alternatively, in response to a negative determination at block 444, the method 400 may proceed to block 446, where the matching rule selection engine 446 may select a next candidate matching rule as the current matching rule for evaluation. The method 400 may then iteratively proceed from block 408.

Referring again to block 414, in response to a positive determination at block 414, the matching rule selection engine 114 may determine, at block 416, whether all required input property(ies) specified by the current matching rule have been evaluated. In particular, the matching rule selection engine 114 may continue to iterate through the input property(ies) of the current matching rule and determine the type designator associated with each input property. If the candidate matching rule selection engine 114 does not encounter a type designator indicative of another required input property, the candidate matching rule selection engine 114 may make a positive determination at block 416, and the method 400 may proceed to block 420. On the other hand, if the matching rule selection engine 114 does encounter another input property associated with a type designator indicating that the input property is a required input property, a negative determination may be made at block 416, and the matching rule selection engine 114 may select that input property as the next required input property at block 418. The method 400 may then proceed iteratively from block 414 until a populated data field corresponding to a data field designator of the current input property is determined not to be present in the current source data record or until all required input property(ies) have been evaluated.

If the matching rule selection engine 114 determines that the current matching rule includes no required input property or determines that a respective populated data field corresponding to the data field designator of each required input property is present in the current source data record, the method 400 may proceed to block 420. At block 420, the matching rule selection engine 114 may determine whether the current matching rule includes any choice input property(ies) by iterating through the input property(ies) of the current matching rule and determining the type designator associated with each input property. If the candidate matching rule selection engine 114 does not encounter a type designator indicative of a choice input property, the candidate matching rule selection engine 114 may make a negative determination at block 420, and the method 400 may proceed to block 436 (see FIG. 4B).

On the other hand, if the matching rule selection engine 114 does encounter an input property associated with a type designator indicating that the input property is a choice input property, the matching rule selection engine 114 may make a positive determination at block 420, and may select the choice input property as a current choice input property at block 422. At block 424, the matching rule selection engine 114 may select a first data field designator of the current choice input property as a current data field designator.

At block 426, the matching rule selection engine 114 may determine whether the current source data record includes a populated data field that corresponds to the current data field designator of the current choice input property. In response to a positive determination at block 426, the matching rule selection engine 114 may determine that the current input property is satisfied with respect to the current source data record, and the method 400 may proceed to block 432, where the matching rule selection engine 114 may determine whether all choice input property(ies) have been evaluated by iterating through any further input property(ies) of the current matching rule and determining the type designator associated with each such input property. If the candidate matching rule selection engine 114 does not encounter another input property associated with a type designator indicative of a choice input property, the candidate matching rule selection engine 114 may make a positive determination at block 432, and the method 400 may proceed to block 436. On the other hand, if the matching rule selection engine 114 does encounter another input property associated with the choice type designator, the matching rule selection engine 114 may make a negative determination at block 432, and may select that input property as the current choice input property at block 434. The method 400 may then proceed again iteratively from block 424.

Referring again to block 426, if the matching rule selection engine 114 determines that the current source data record does not include a populated data field that corresponds to the current data field designator (a negative determination at block 426), the method 400 may proceed to block 428, where the matching rule selection engine 114 may determine whether all data field designators of the current choice input property have been evaluated. In response to a positive determination at block 428, the matching rule selection engine 114 may determine that the current matching rule is ineligible for execution on the set of candidate source data records because the current source data record does not include a populated data field corresponding to any of the alternative data field designators of the current choice input property, and the method 400 may proceed to block 444, where the matching rule selection engine 114 may determine whether all candidate matching rule(s) have been evaluated. In response to a positive determination at block 444, the method 400 may end with no candidate matching rule having been identified as being eligible for execution on the set of candidate source data records. Alternatively, in response to a negative determination at block 444, the method 400 may proceed to block 446, where the matching rule selection engine 446 may select a next candidate matching rule as the current matching rule for evaluation. The method 400 may then once again iteratively proceed from block 408.

On the other hand, in response to a negative determination at block 428, the matching rule selection engine 114 may select a next data field designator of the current choice input property as a current data field designator, and the method 400 may again proceed iteratively from block 426. If the current matching rule includes no choice input property or if each choice input property of the current matching rule is satisfied, the method 400 may proceed from block 436.

Referring now to FIG. 4B, the matching rule selection engine 114 may determine, at block 436, whether all source data records have been evaluated. In response to a negative determination at block 436, the matching rule selection engine 114 may select a next source data record from the set of candidate source data records as the current source data record and proceed with evaluation of the current matching rule with respect to the now current source data record from block 410.

On the other hand, in response to a positive determination at block 436, the matching rule selection engine 114 may select, at block 440, the current matching rule as the matching rule to execute on the set of candidate source data records. The current matching rule may be selected as the matching rule to execute on the set of candidate source data records in those example embodiments in which the first matching rule determined to be eligible from the set of candidate matching rule(s) is selected. Alternatively, in those example embodiments in which a "best match" matching rule is selected from a set of eligible matching rules, the method 400 may instead proceed from block 436 to block 442, where the matching rule selection engine 114 may instead add the current matching rule to a set of one or more matching rules eligible for execution on the set of candidate source data records.

Figure 5:
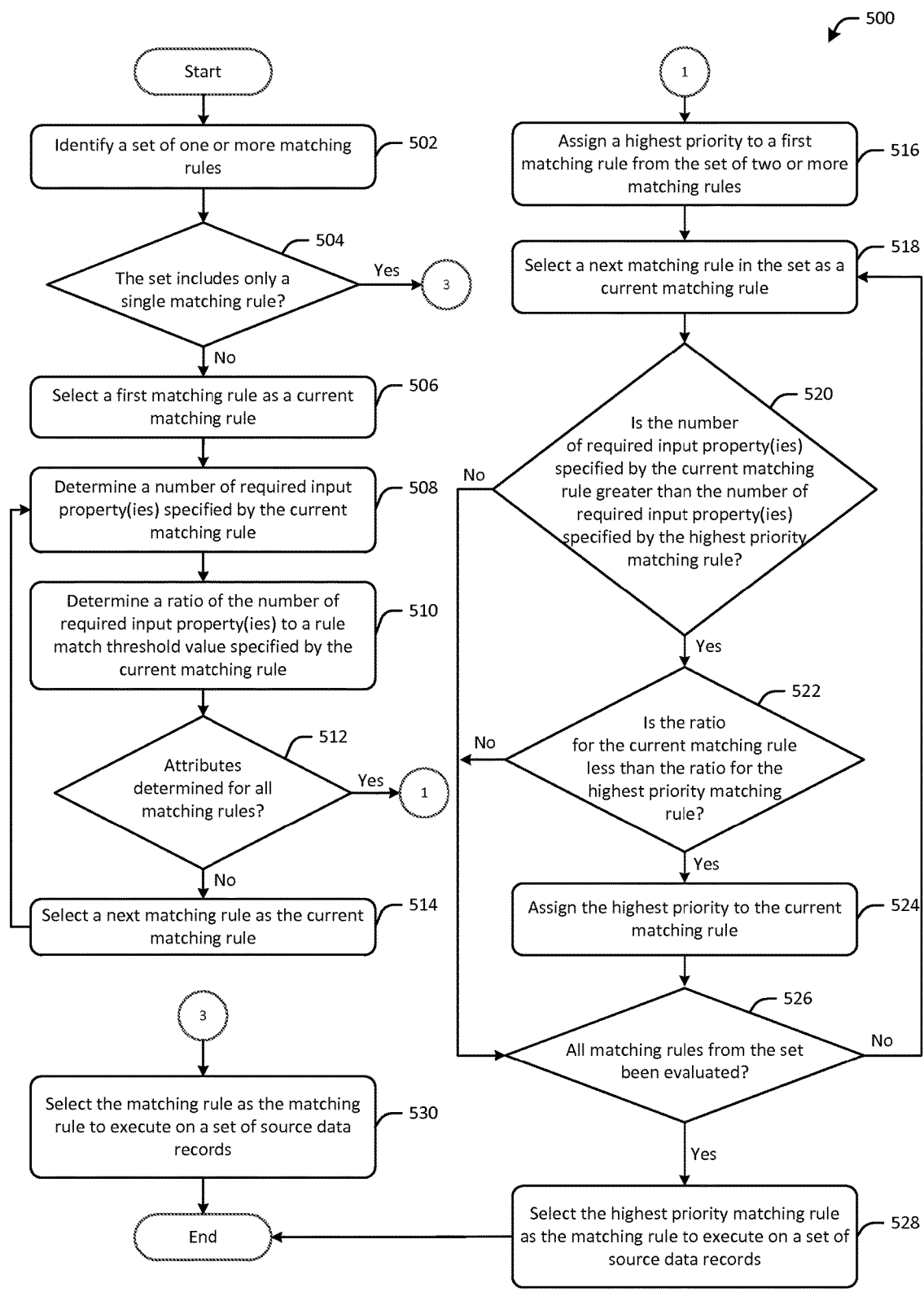
FIG. 5 is a process flow diagram of an illustrative method for selecting, for execution on a set of source data records, a highest priority data record matching rule from a set of candidate data record matching rules in accordance with one or more example embodiments of the disclosure.

FIG. 5 is a process flow diagram of an illustrative method 500 for selecting, for execution on a set of source data records, a highest priority data record matching rule from a set of candidate data record matching rules in accordance with one or more example embodiments of the disclosure. One or more operations of method 500 may be performed by the matching rule selection engine 114, or more specifically, in response to execution of computer-executable instructions of the matching rule selection engine 114. It should be appreciated, however, that any operation of method 500 may be performed, at least in part, by one or more other engines/sub-engines of the data correlation/integration server system 102.

At block 502, the matching rule selection engine 114 may identify a set of one or more matching rules. The set of matching rule(s) may be those matching rule(s) identified via the method 400 depicted in FIGS. 4A-4B as being eligible for execution on a set of source data records. At block 504, the matching rule selection engine 114 may determine whether the set of matching rule(s) includes only a single matching rule. In response to a positive determination at block 504, the matching rule selection engine 114 may select that single matching rule as the matching rule to execute on the set of source data records at block 530.

In response to a negative determination at block 504, on the other hand, the matching rule selection engine 114 may perform an iterative process to determine respective attributes of each matching rule and select a particular matching rule for execution on the set of source data records based on the respective attributes. In particular, at block 506, the matching rule selection engine 114 may select a first matching rule as a current matching rule.

At block 508, the matching rule selection engine 114 may determine a number of required input property(ies) specified by the current matching rule. For example, the matching rule selection engine 114 may determine the number of input property(ies) that are associated with a "required" type designator among the input property(ies) defined in a configuration of the current matching rule. It should be appreciated that, in certain example embodiments, no input property specified by the current matching rule may be a required input property.

At block 510, the matching rule selection engine 114 may determine a match threshold ratio for the current matching rule. The match threshold ratio may be a ratio of a number of required input property(ies) to a rule match threshold value specified by the current matching rule.

At block 512, the matching rule selection engine 114 may determine whether respective attributes have been determined for all matching rules in the set, that is, whether a respective number of required input property(ies) and a respective match threshold ratio have been determined for all matching rules in the set. In response to a negative determination at block 512, the matching rule selection engine 114 may select the next matching rule in the set as the current matching rule at block 514, and the method may proceed again iteratively from block 508.

In response to a positive determination at block 512, the matching rule selection engine 114 may assign a highest priority to a first matching rule in the set of matching rules at block 516. In certain example embodiments, the highest priority may initially be assigned to a first matching rule in the set regardless of the number of required input property(ies) or the match threshold ratio associated with that rule. At block 518, the matching rule selection engine 114 may select a next matching rule in the set as a current matching rule.

At block 520, the matching rule selection engine 114 may determine whether the number of required input property(ies) of the current matching rule is greater than the number of required input property(ies) of the matching rule having the highest assigned priority. In response to a positive determination at block 520, the matching rule selection engine 114 may make a further determination at block 522 as to whether the match threshold ratio for the current matching rule is less than the match threshold ratio for the matching rule having the highest assigned priority. If a positive determination is also made at block 522, the matching rule selection engine 114 may assign the highest priority to the current matching rule, and the method 500 may proceed to block 526. The method 500 may also proceed to block 526 without assigning the highest priority to the current matching rule if a negative determination is made at block 520 or at block 522. That is, if a negative determination is made at block 520 or at block 522, the prioritization of the matching rule having the highest assigned priority may remain unchanged.

At block 526, the matching rule selection engine 114 may determine whether all matching rules from the set have been evaluated, that is, whether each matching rule in the set (other than the first matching rule to which the highest priority is initially assigned) has been evaluated against a matching rule having the highest assigned priority. In response to a negative determination at block 526, the matching rule selection engine 114 may select a next matching rule in the set as a current matching rule for evaluation at block 518, and the method 500 may proceed iteratively from block 520. On the other hand, in response to a positive determination at block 526, the matching rule having the highest assigned priority may be selected as the matching rule for execution on the set of source data records at block 528.

Figure 6:
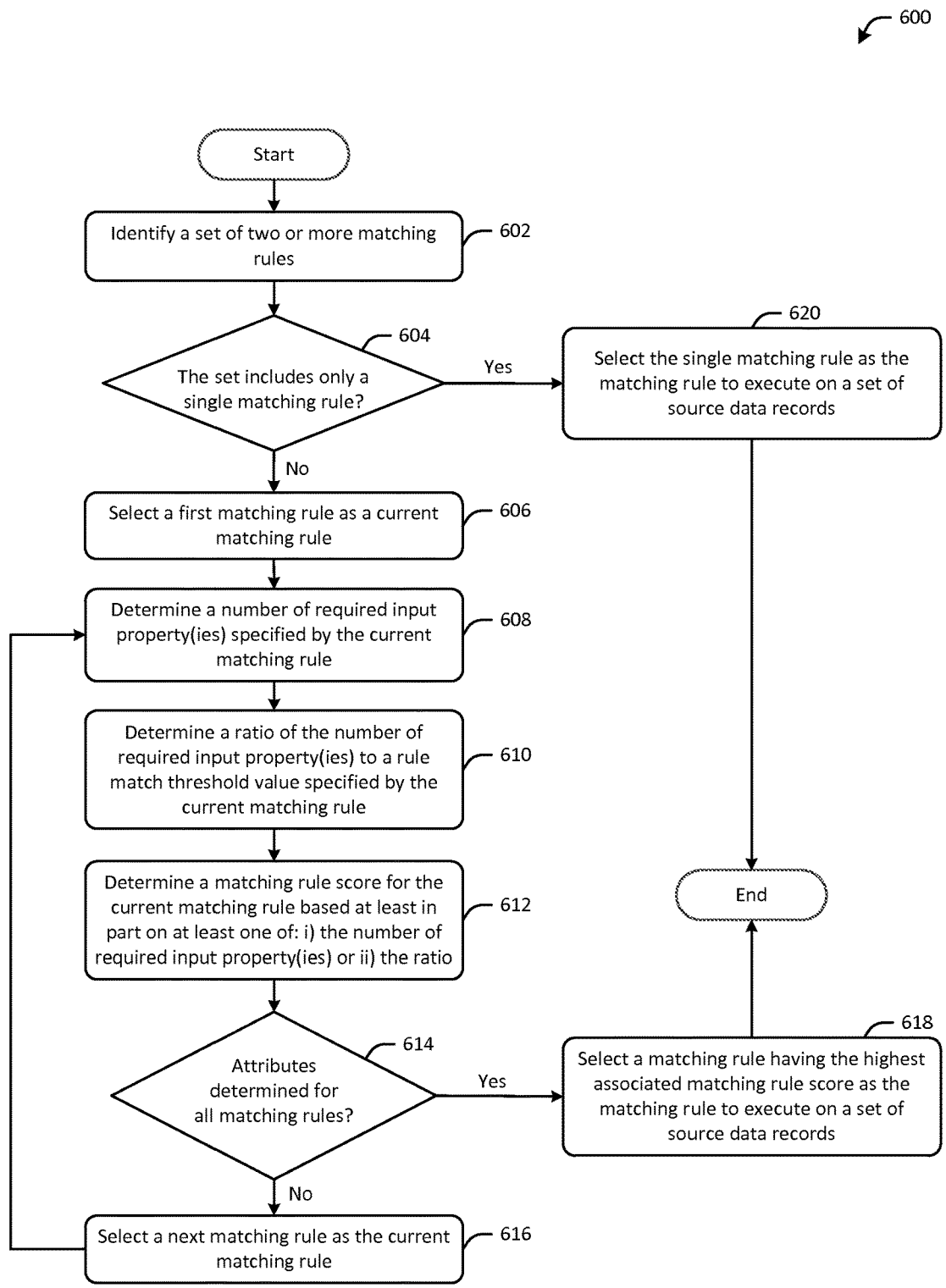
FIG. 6 is a process flow diagram of an illustrative method for selecting, for execution on a set of source data records, a data record matching rule having the highest associated matching rule score from a set of candidate data record matching rules in accordance with one or more example embodiments of the disclosure.

FIG. 6 is a process flow diagram of an illustrative method 600 for selecting, for execution on a set of source data records, a data record matching rule having the highest associated matching rule score from a set of candidate data record matching rules in accordance with one or more example embodiments of the disclosure. One or more operations of method 600 may be performed by the matching rule selection engine 114, or more specifically, in response to execution of computer-executable instructions of the matching rule selection engine 114. It should be appreciated, however, that any operation of method 600 may be performed, at least in part, by one or more other engines/sub-engines of the data correlation/integration server system 102.

At block 602, the matching rule selection engine 114 may identify a set of one or more matching rules. The set of matching rule(s) may be those matching rule(s) identified via the method 400 depicted in FIGS. 4A-4B as being eligible for execution on a set of source data records. At block 604, the matching rule selection engine 114 may determine whether the set of matching rule(s) includes only a single matching rule. In response to a positive determination at block 604, the matching rule selection engine 114 may select that single matching rule as the matching rule to execute on the set of source data records at block 620.

In response to a negative determination at block 604, on the other hand, the matching rule selection engine 114 may perform an iterative process to determine respective attributes of each matching rule, generate a respective matching rule score for each matching rule, and select a particular matching rule for execution on the set of source data records based on the respective matching rule scores. In particular, at block 606, the matching rule selection engine 114 may select a first matching rule as a current matching rule.

At block 608, the matching rule selection engine 114 may determine a number of required input property(ies) specified by the current matching rule. For example, the matching rule selection engine 114 may determine the number of input property(ies) defined in a configuration of the current matching rule that are associated with a "required" type designator. It should be appreciated that, in certain example embodiments, no input property specified by the current matching rule may be a required input property.

At block 610, the matching rule selection engine 114 may determine a match threshold ratio for the current matching rule. The match threshold ratio may be a ratio of a number of required input property(ies) to a rule match threshold value specified by the current matching rule.

At block 612, the matching rule selection engine 114 may determine a matching rule score for the current matching rule based at least in part on at least one of the number of required input property(ies) of the current matching rule or the match threshold ratio for the current matching rule. The matching rule score for the current matching rule may be, for example, a weighted combination of the number of required input property(ies) of the current matching rule and the match threshold ratio for the current matching rule. It should be appreciated that other attribute(s) of the matching rule may be used to determine an associated matching rule score for the matching rule.

At block 614, the matching rule selection engine 114 may determine whether respective attributes have been determined for all matching rules in the set, that is, whether a respective matching rule score has been determined for all matching rules in the set. In response to a negative determination at block 614, the matching rule selection engine 114 may select the next matching rule in the set as the current matching rule at block 616, and the method may proceed again iteratively from block 608.

In response to a positive determination at block 614, the matching rule selection engine 114 may select the matching rule having the highest associated matching rule score as the matching rule to execute on the set of source data records at block 618. It should be appreciated that the number of required input property(ies) and the match threshold ratio are merely example matching rule attributes that may be used to determine the matching rule score for a matching rule.

Figure 7:
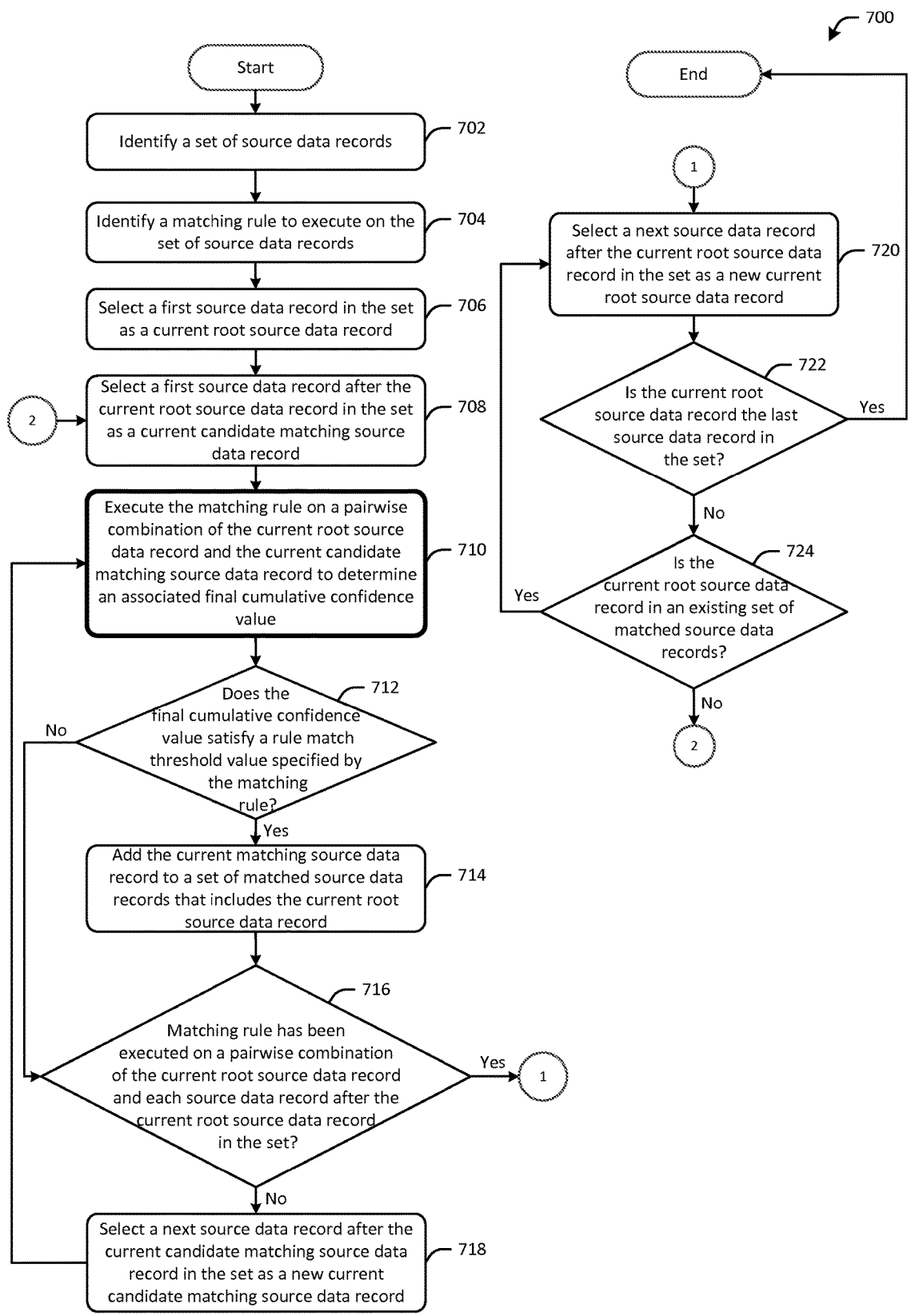
FIG. 7 is a process flow diagram of an illustrative method for executing a data record matching rule on a set of source data records to determine a set of matched source data records in accordance with one or more example embodiments of the disclosure.

FIG. 7 is a process flow diagram of an illustrative method 700 for executing a data record matching rule on a set of source data records to determine a set of matched source data records in accordance with one or more example embodiments of the disclosure. One or more operations of method 700 may be performed by the matching rule execution engine 116, or more specifically, in response to execution of computer-executable instructions of the matching rule execution engine 116. It should be appreciated, however, that any operation of method 700 may be performed, at least in part, by one or more other engines/sub-engines of the data correlation/integration server system 102.

At block 702, the matching rule execution engine 116 may identify a set of source data records. The matching rule execution engine 116 may receive the set of source data records from, for example, the SDR engine 110, potentially via the coordination layer 108. At block 704, the matching rule execution engine 116 may identify a matching rule to execute on the set of source data records. The matching rule execution engine 116 may receive the matching rule (or an indication thereof) from the matching rule selection engine 114. The matching rule selection engine 114 may have selected the matching rule based on any of the example methods 400, 500, or 600 described earlier.

At block 706, the matching rule execution engine 116 may select a first source data record in the set of source data records as a current root source data record. At block 708, the matching rule execution engine 116 may select a first source data record that is logically subsequent to the current root source data record in the set as a current candidate matching source data record. As previously described, the set of source data records may be represented by an ordered data structure. Accordingly, the first source data record that is logically subsequent to the current root source data record may be the source data record assigned to a position in the ordered data structure that immediately follows a position to which the current root source data record is assigned or may be the source data record that is pointed to when a pointer or index is incremented.

At block 710, the matching rule execution engine 116 may execute the matching rule on a pairwise combination of the current root source data record and the current candidate matching source data record to determine a final cumulative confidence value associated with the execution of the matching rule on the pairwise combination. As discussed earlier, and as will be described in more detail in reference to FIGS. 9A-9C, execution of the matching rule on the pairwise combination of the current root source data record and the current candidate matching data source record may include executing a respective matching algorithm on respective populated data fields of each source data record in the pairwise combination that correspond to a respective data field designator of each input property defined by the matching rule to obtain a respective input property match confidence value. One or more input property match confidence values may then be aggregated in some fashion to obtain the final cumulative confidence value.

At block 712, the matching rule execution engine 116 may determine whether the final cumulative confidence value obtained at block 710 satisfies a rule match threshold value specified by the matching rule. In response to a positive determination at block 712, the matching rule execution engine 116 may determine, at block 714, that the current candidate matching source data record matches the current root source data record and may remove the current candidate matching source data record from the set of source data records and add the current candidate matching source data record to a set of matched source data record(s) that includes at least the current root source data record.

From block 714, the method 700 may proceed to block 716, where the matching rule execution engine 116 may determine whether the matching rule has been executed on a pairwise combination of the current root source data record and each source data record that is logically subsequent to the current root source data record in the set of source data records. The method 700 may also proceed to block 716 in response to a negative determination at block 712, in which case, the current candidate matching source data record is not added to a set of matched source data record(s) that includes at least the current root source data record.

In response to a negative determination at block 716, the matching rule execution engine 116 may select a next source data record that is logically subsequent to the current candidate matching source data record in the set of source data records as a new current candidate matching source data record, and the method 700 may proceed iteratively from block 710, where the matching rule execution engine 116 may execute the matching rule on the pairwise combination of the current root source data record and the new current candidate matching source data record.

On the other hand, in response to a positive determination at block 716, the matching rule execution engine 116 may select, at block 720, a next source data record that is logically subsequent to the current root source data record in the set of source data records as a new current root source data record. Following selection of the new current root source data record, the matching rule execution engine 116 may determine whether the selected current root data source data is the last source data record in the set of source data records at block 722. In response to a positive determination at block 722, the method 700 may end since the matching rule has been executed on a pairwise combination of each source data record with at least one other source data record in the set of source data records.

On the other hand, in response to a negative determination at block 722, the method 700 may proceed to block 724, where the matching rule execution engine 116 may determine whether the current root source data record has already been included in an existing set of matched source data records (e.g., whether the current root source data record has already matched another source data record). In response to a positive determination at block 724, the method 700 may again proceed iteratively from block 720, where the matching rule execution engine 116 may select a next source data record that is logically subsequent to the current root source data record as a new current root source data record. On the other hand, in response to a negative determination at block 724, the method 700 may again proceed iteratively from block 708 to execute the matching rule on a respective pairwise combination of the current root source data record and each source data record that is logically subsequent to the current root source data record.

It should be appreciated that in certain example embodiments, if the matching rule execution engine 116 determines that a candidate matching source data record matches a current root source data record, the matching rule execution engine 116 may remove that matching source data record from the set of source data records in addition to adding the matching source data record to a set of matched source data records that includes at least the current root source data record. In such example embodiments, the determination at block 724 may be unnecessary.

At the completion of the method 700, one or more sets of matched source data records may be obtained. Further, in certain example embodiments, one or more unmatched source data records in the set of source data records may not have matched to any root source data record. Each unmatched source data record may then be compared against a respective one or more source data records of each set of matched source data records to determine whether a potential match exists, as will be described in more detail in reference to FIG. 8.

As an example of how method 700 may be performed to determine one or more sets of matched source data records from an initial set of source data records, consider an initial set of source data records that includes (Record_1, Record_2, Record_3, Record_4, and Record_5). The matching rule execution engine 116 may select Record_1 as an initial root source data record. The matching rule execution engine 116 may then execute a selected matching rule on pairwise combinations of Record_1 and each of the other source data records in the set (e.g., Record_2, Record_3, Record_4, Record_5).

If a particular source data record (e.g., Record_2) is determined to match the current root source data record (e.g., Record_1) based on execution of matching rule on the pairwise combination (Record_1, Record_2), then the particular source data record may be added to a set of matched source data records that includes at least the current root source data record (e.g., Record_1). For example, a set of matched source data records may include Record_1 and Record_2. Since Record_2 was determined to match Record_1, Record_2 may not be chosen as a new current root source data record. As such, the matching rule may not be executed on the pairwise combination (Record_2, Record_3), the pairwise combination (Record_2, Record_4), or the pairwise combination (Record_2, Record_5). Rather, Record_3 may be chosen as the new current root source data record, and the matching rule may be executed on the pairwise combination (Record_3, Record_4) and the pairwise combination (Record_3, Record_5).

If Record_3 is determined to match Record_4, then a second set of matched source data records that includes the current root source data (e.g., Record_3) and the source data record that matched to the current source data record (e.g., Record_4) may be obtained. Since Record_4 matched Record_3, it may not be chosen as the new current root source data record. Further, since Record_5 is the last source data record in the set, the matching rule execution engine 116 may not choose Record_5 as the new current root source data record either, and matching process may end with respect to the set of source data records.

At the conclusion of the matching process with respect to the example scenario discussed above, two different sets of matched source data records may be obtained. A first set of matched source data records may include Record_1 and Record_2 while a second set of matched source data records may include Record_3 and Record_4. In addition, an unmatched source data record (e.g., Record_5) may remain. The matching rule execution engine 116 may then execute the matching rule on pairwise combinations of Record_5 with each of one or more matched source data records from each of the first set of matched source data records and the second set of matched source data records. This process will be described in more detail hereinafter in reference to FIG. 8. In addition, in certain example embodiments, the same matching rule or one or more different matching rules may be executed on pairwise combinations of at least one matched source data record from the first set and at least one matched source data record from the second set. If a match is determined, the first set and the second set may be merged into a single set of matched source data records.

Figure 8:
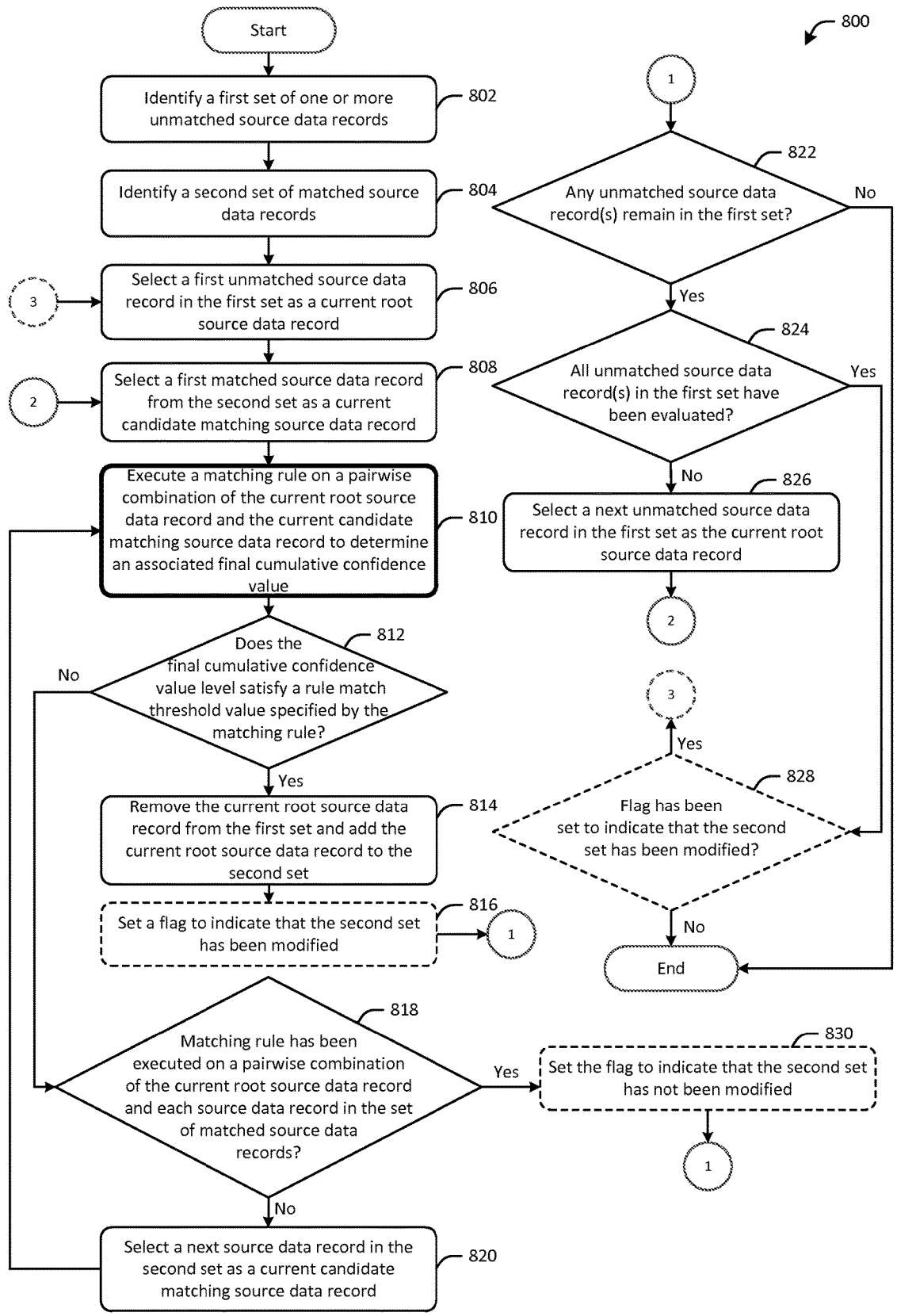
FIG. 8 is a process flow diagram of an illustrative method for executing a data record matching rule on pairwise combinations one or more unmatched source data records and one or more matched source data records in accordance with one or more example embodiments of the disclosure.

FIG. 8 is a process flow diagram of an illustrative method 800 for matching one or more unmatched source data records with a set of matched source data records in accordance with one or more example embodiments of the disclosure. One or more operations of method 800 may be performed by the matching rule execution engine 116, or more specifically, in response to execution of computer-executable instructions of the matching rule execution engine 116. It should be appreciated, however, that any operation of method 800 may be performed, at least in part, by one or more other engines/sub-engines of the data correlation/integration server system 102.

At block 802, the matching rule execution engine 116 may identify a first set of one or more unmatched source data records. The matching rule execution engine 116 may have determined the first set of unmatched source data records as a result of execution of the matching process described in reference to FIG. 7. At block 804, the matching rule execution engine 116 may identify a second set of matched source data records. The matching rule execution engine 116 may have also determined the second set of matched source data records as a result of execution of the matching process described in reference to FIG. 7.

At block 806, the matching rule execution engine 116 may select a first unmatched source data record in the first set as a current root source data record. Further, at block 808, the matching rule execution engine 116 may select a first matched source data record from the second set as a current candidate matching source data record. Then, at block 810, the matching rule execution engine 116 may execute a selected matching rule on a pairwise combination of the current root source data record and the current candidate matching source data record to determine an associated final cumulative confidence value. The matching rule may be selected in accordance with any of the illustrative methods 400, 500, or 600 depicted in FIGS. 4, 5, and 6, respectively.

At block 812, the matching rule execution engine 116 may determine whether the final cumulative confidence value satisfies a rule match threshold value specified by the matching rule. In response to a positive determination at block 812, which corresponds to a determination that the current candidate matching source data record matches the current root source data record, the matching rule execution engine 116 may remove the current root source data record from the first set and add the current root source data record to the second set at block 814. That is, the matching rule execution engine 116 may remove the current candidate matching source data record from the set of unmatched source data records and may include it the set of matched source data records.

In addition, the matching rule execution engine 116 may, at block 816, optionally set a flag (or other indicator) to indicate that the second set (e.g., the set of matched source data records has been modified. The operation at block 816 (and the operation at block 828 which will be described in more detail hereinafter) may be performed to ensure that an unmatched source data record that may remain unmatched after execution of the matching rule on a pairwise combination of the unmatched source data record and each source data record in the set of matched source data records is also compared to any unmatched source data record that did match and that as a result was included in the set of matched source data records. That is, the operations at block 816 and 828 may be performed to ensure that the matching rule executed at block 810 (or one or more other matching rules) is executed on a pairwise combination of an unmatched source data record that has not matched any of the matched source data records and a previously unmatched source data record that has matched one of the matched source data records. This scenario may arise, for example, if a particular unmatched source data record does not match any of the matched source data records, but another unmatched source data record that is logically subsequent to the particular unmatched source data record in the set of unmatched source data record(s) does match.

From block 814 (or from block 816 if performed), the method 800 may proceed to block 822. Referring again to block 812, if a negative determination is made at block 812, the method 800 may proceed to block 818, where the matching rule execution engine 116 may determine whether the matching rule has been executed on a pairwise combination of the current root source data record and each source data record in the set of matched source data records. In response to a positive determination at block 818, the matching rule execution engine 116 may optionally set, at block 830, the flag to indicate that the second set (e.g., the set of matched source data records) has not been modified and may proceed to block 822. If the operation at block 830 is not performed, the method 800 may proceed directly from block 818 to block 822 in response to a positive determination at block 818.

On the other hand, in response to a negative determination at block 818, the method 800 may proceed to block 820, where the matching rule execution engine 116 may select a next source data record in the set of matched source data records as a current candidate matching data record. The method 800 may then proceed iteratively from block 810, where the matching rule execution engine 116 may execute the matching rule on a pairwise combination of the current root source data record and the current candidate matching data record. The operations at blocks 810-820 may be performed iteratively until a positive determination is made at block 818.

At block 822, the matching rule execution engine 116 may determine whether any unmatched source data record(s) remain in the set of one or more unmatched source data records. In response to a negative determination at block 822, the method 800 may end. In response to a positive determination at block 822, the method 800 may proceed to block 824, where the matching rule execution engine 116 may determine whether all unmatched source data record(s) in the set of one or more unmatched source data records have been evaluated. That is, at block 824, the matching rule execution engine 116 may determine whether the matching rule has been executed on a pairwise combination of each unmatched source data record and each of at least one matched source data record.

In response to a negative determination at block 824, the method 800 may proceed to block 826, where the matching rule execution engine 116 may select a next unmatched source data record in the set of unmatched source data record(s) as the current root data record. The method 800 may then proceed to block 808, and the operations at blocks 808-820 may again be performed iteratively until the matching rule has been executed on pairwise combinations of the new current root source data record and each of the matched source data records.

On the other hand, in response to a positive determination at block 824, the matching rule execution engine 116 may optionally determine whether a flag has been set to indicate that the set of matched source data records has been modified (e.g., that an unmatched source data record has matched a source data record in the set of matched source data records, and thus, has been included in the set of matched source data records). In response to a negative determination at block 828, the method 800 may end. On the other hand, in response to a positive determination at block 828, the method 800 may proceed iteratively from block 806 such that each unmatched source data record that remains may be compared to each matched source data record in the modified set of matched source data records. If the operation at block 828 is not performed, the method 800 may end responsive to a positive determination at block 824.

The method 800 assumes a single set of matched source data records. However, it should be appreciated that multiple sets of matched source data records may be obtained as a result of method 700, in which case, the method 800 may be performed with respect to each set of matched source data records. That is, the matching rule execution engine 116 may execute the selected matching rule on pairwise combinations of each unmatched source data record and each matched source data record in each of the multiple sets of matched source data records until the unmatched source data is matched or until each of the multiple sets of matched source data records are exhausted.

In addition, in certain example embodiments, the method 800 may be optimized by modifying the method 700 to include storing, with each unmatched source data record, a respective indication of each source data record that did not match the unmatched source data record. That is, if execution of a selected matching rule on a pairwise combination of a first source data record and each of one or more other source data records does not result in a match, matching data may be generated that includes a respective indication of each of the one or more other source data records. The matching data may be stored in association with the first source data record. With this optimization, when method 800 is performed, the matching data stored in association with an unmatched source data record may be accessed to determine those source data record(s) in a set of matched source data records that the unmatched source data record was previously determined not to match. A selected matching rule may then only be executed on pairwise combinations of an unmatched source data record and each matched source data record not identified in the matching data associated with the unmatched source data record.

As an example of how method 800 may be performed, consider an initial set of source data records shown below in Table 1. The source data records shown below will be referenced hereinafter in descending order as Record_1, Record_2, Record_3, Record_4, Record_5. It should be appreciated that the source data records depicted below merely indicate a logical grouping of populated data fields. The manner in which data is populated in data fields of a source data record may depend on the manner in which data is structured/formatted based on the particular database schema of the database that stores the source data record.

TABLE 1

| FirstName | LastName | AddressLine1 | City | State | Email | Account |
|---|---|---|---|---|---|---|
| Alex | Keller | 5 Spruce Ln | Atlanta | GA | jalexkeller@domain.com | 88888 |
| John | Keller | 5 Spruce Lane | Atlanta | GA | john.keller@domain.com | 88888 |
| Al | Keller | 5 Spruce Ln | Atlanta | GA | jalexkeller@domain.com | 99999 |
| A | Keller | 5 Sproce Ln | Atlanta | GA | john.keller@domain.com | 77777 |
| Alex | Keller | 5 Spruce Ln | Atlanta | GA | jkell@domain.com | 99999 |

In addition, assume that a matching rule having the following example configuration is selected for execution on the set of source data records identified above.

```
<addMatchingRule name="NameAddressEMailAccount"
matchThreshold="90" algorithmType="Fiserv.Now.MatchingEngine.
StringCompareMatchingAlgorithm, Fiserv.Now.MatchingEngine">
    <inputProperties>
        <clearInputProperties/>
        <addInputProperty name="LastName" kind="Required"
matchThreshold="3" algorithmType="Fiserv.Now.MatchingEngine.
LevenshtienDistanceMatchingAlgorithm, Fiserv.Now.MatchingEngine"/>
        <addInputProperty name="AddressLine1" kind="Required"
           matchThreshold="4"/>
        <addInputProperty name="City" kind="Required" />
        <addInputProperty name="State" kind="Required"/>
        <addInputProperty name="Email" kind="Choice"/>
        <addInputProperty name="Account" kind="Choice"/>
    </inputProperties>
</addMatchingRule>
```

Assuming that the matching rule execution engine 116 performs method 700 on the set of example source data records depicted above using a matching rule having the example configuration shown above, Record_1 may be chosen as an initial root source data record, and the matching rule may be executed on pairwise combinations of Record_1 with each of Record_2, Record_3, Record_4, and Record_5. Record_2 may be determined to match Record_1 based on a result of executing a Levenshtein distance algorithm on the respective populated data in the LastName data fields of Record_2 and Record_1 and based on respective results of executing a default string matching algorithm specified for the matching rule on respective populated data in each of the AddressLine1, City, State, and Account data fields of Record_2 and Record_1.

Although the respective data populated in the Email data fields of Record_2 and Record_1 does not match, this is inconsequential since the "Email" and "Account" data fields are associated with alternative choice input properties. In particular, because the "Email" data field in each source data record corresponds to an alternative choice input property, even though execution of the string matching algorithm on the respective data populated in the "Email" data fields of Record_2 and Record_1 results in a non-match, this is inconsequential since execution of the string matching algorithm on the respective data populated in the "Account" data fields of Record_2 and Record_1 (which correspond to the other alternative choice input property) does result in a match.

Upon determining that Record_2 matches Record_1, a set of matched source data records that includes Record_1 and Record_2 may be established. In addition, Record_3 may be determined to match Record_1 based on a result of executing the Levenshtein distance algorithm on the respective populated data in the LastName data fields of Record_3 and Record_1 and based on respective results of executing the default string matching algorithm specified for the matching rule on respective populated data in each of the AddressLine1, City, State, and Email data fields of Record_3 and Record_1. Upon determining that Record_3 matches Record_1, Record_3 may be included in the set of matched source data records. That is, the set of matched source data records may now include Record_1, Record_2, and Record_3.

Execution of the matching rule on the pairwise combination of Record_1 and Record_4, however, does not result in a match. In particular, neither execution of the string matching algorithm on the respective data populated in the "Email" data fields of Record_1 and Record_4 nor execution of the string matching algorithm on the respective data populated in the "Account" data fields of Record_1 and Record_4 results in a match. As such, no alternative choice input property matches, and thus, Record_4 may be determined not to match Record_1, and thus, Record_4 may not be included in the set of matched source data records. In addition, because Record_2 and Record_3 have already matched Record_1, these source data records may not be selected as root source data records for subsequent iterations of the matching process. Similarly, execution of the matching rule on the pairwise combination of Record_1 and Record_5 also does not result in a match.

Accordingly, Record_4 may be the next source data record selected as a root source data record. The matching rule may then be executed on the pairwise combination of Record_4 and Record_5, which does not result in a match. In particular, neither execution of the string matching algorithm on the respective data populated in the "Email" data fields of Record_4 and Record_5 nor execution of the string matching algorithm on the respective data populated in the "Account" data fields of Record_4 and Record_5 results in a match. As such, no alternative choice input property matches, and thus, Record_5 may be determined not to match Record_4, and thus, Record_4 and Record_5 may each remain as unmatched source data records.

Accordingly, at the completion of method 700 on the example set of source data records depicted above, a set of matched source data records including Record_1, Record_2, and Record_3 and a set of unmatched source data records including Record_4 and Record_5 may be determined. The matching rule execution engine 116 may then perform method 800 on the set of matched source data records and the set of unmatched source data records. As part of performing the method 800, the matching rule execution engine 116 may execute the matching rule on the pairwise combination of Record_4 and each of the source data records in the set of matched source data records (e.g., Record_1, Record_2, and Record_3) as well as on the pairwise combination of Record_5 and each of the source data records in the set of matched source data records.

As previously noted, Record_4 was already determined not to match Record_1. Execution of the matching rule on the pairwise combination of Record_4 and Record_2, however, may result in a match. In particular, Record_4 may be determined to match Record_2 based on a result of executing the Levenshtein distance algorithm on the respective populated data in the LastName data fields of Record_4 and Record_2 and based on respective results of executing the default string matching algorithm specified for the matching rule on respective populated data in each of the AddressLine1, City, State, and Email data fields of Record_4 and Record_2. Upon determining that Record_4 matches Record_2, Record_4 may be added to the set of matched source data records.

Similarly, Record_5 was already determined not to match Record_1. Execution of the matching rule on the pairwise combination of Record_5 and Record_2 similarly results in a non-match. However, execution on the matching rule on the pairwise combination of Record_5 and Record_3 may result in a match. In particular, Record_5 may be determined to match Record_3 based on a result of executing the Levenshtein distance algorithm on the respective populated data in the LastName data fields of Record_5 and Record_3 and based on respective results of executing the default string matching algorithm specified for the matching rule on respective populated data in each of the AddressLine1, City, State, and Account data fields of Record_5 and Record_3. Upon determining that Record_5 matches Record_3, Record_5 may be added to the set of matched source data records.

Thus, after performing method 800, the set of matched source data records may include Record_1, Record_2, Record_3, Record_4, and Record_5. If additional unmatched source data records remain after performing method 700 (e.g., Record_6), each such unmatched source data record may be selected as a current root source data record and the matching rule may be executed on pairwise combinations of the unmatched source data record and each of the source data records in the initial set of matched source data records (e.g., Record_1, Record_2, and Record_3), as part of performing method 800. In addition, if the method 800 is optimized as described earlier, any unmatched source data record (e.g., Record_4A that follows Record_3 and precedes Record_4) that does not match any of the initial matched source data records (e.g., Record_1, Record_2, or Record_3) may again be evaluated against the set of matched source data records if the set is modified. For example, if the initial set of matched source data records is modified to include Record_4 and Record_5 as described earlier, then Record_4A may be evaluated against the modified set including Record_1, Record_2, Record_3, Record_4, and Record_5. Moreover, if the method 800 is further optimized, each initial unmatched source data record (e.g., Record_4, Record_5) may only be evaluated in succession against those matched source data records that it was not previously evaluated against until a match is determined or the unmatched source data record is evaluated against each such matched source data record. For example, if the method 800 is further optimized as noted above, Record_4 may not be re-evaluated against Record_1 or Record_5 and may only be evaluated against Record_2, and optionally, Record_3. That is, if Record_4 had not matched Record_2, Record_4 may be evaluated against Record_3 as well. Similarly, Record_5 may be evaluated against Record_2 and Record_3 but not re-evaluated against Record_1 or Record_4.

Figure 9A:
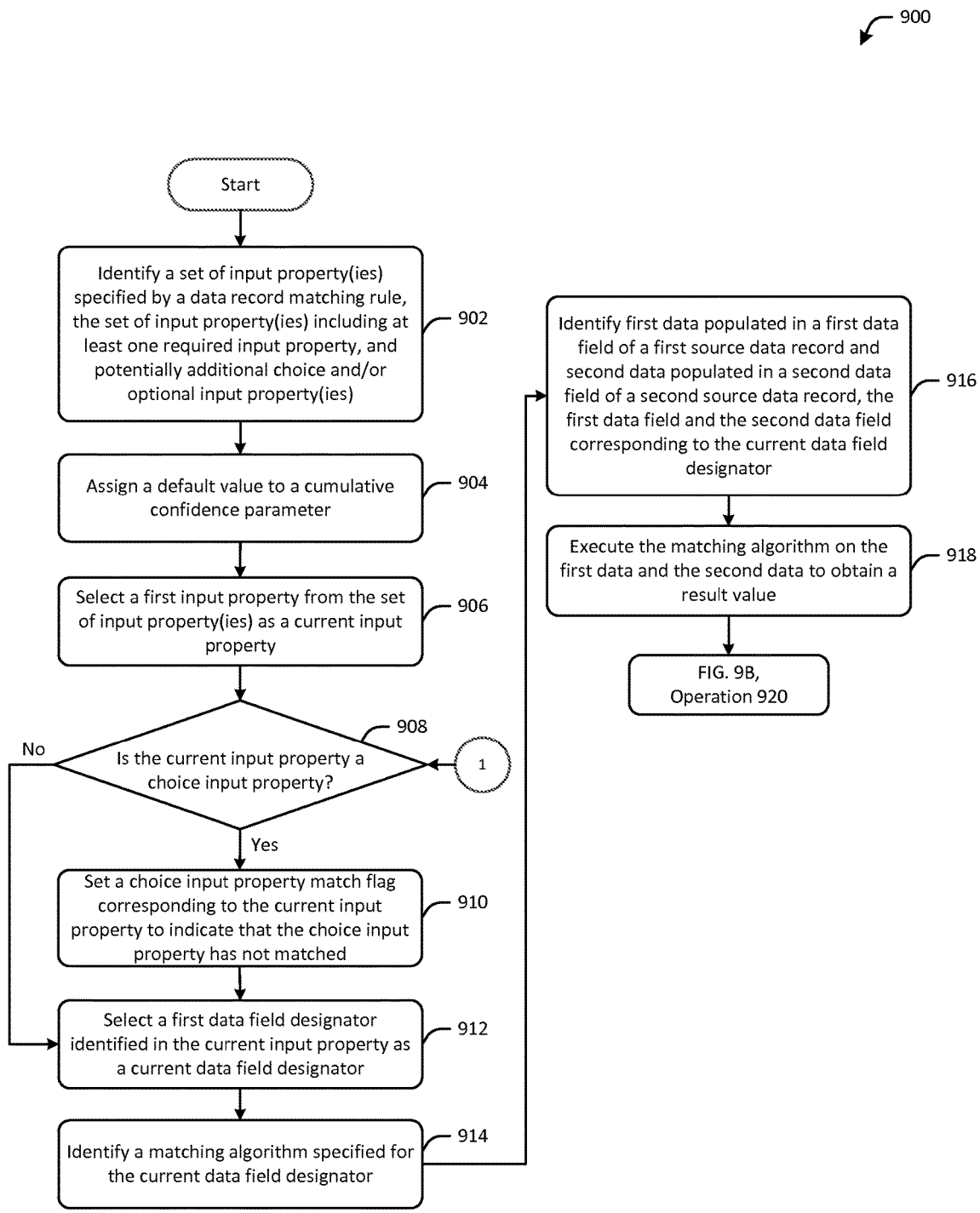
FIGS. 9A-9C are process flow diagrams of a more detailed illustrative method for executing a data record matching rule on a set of source data records in accordance with one or more example embodiments of the disclosure.
Figure 9B:
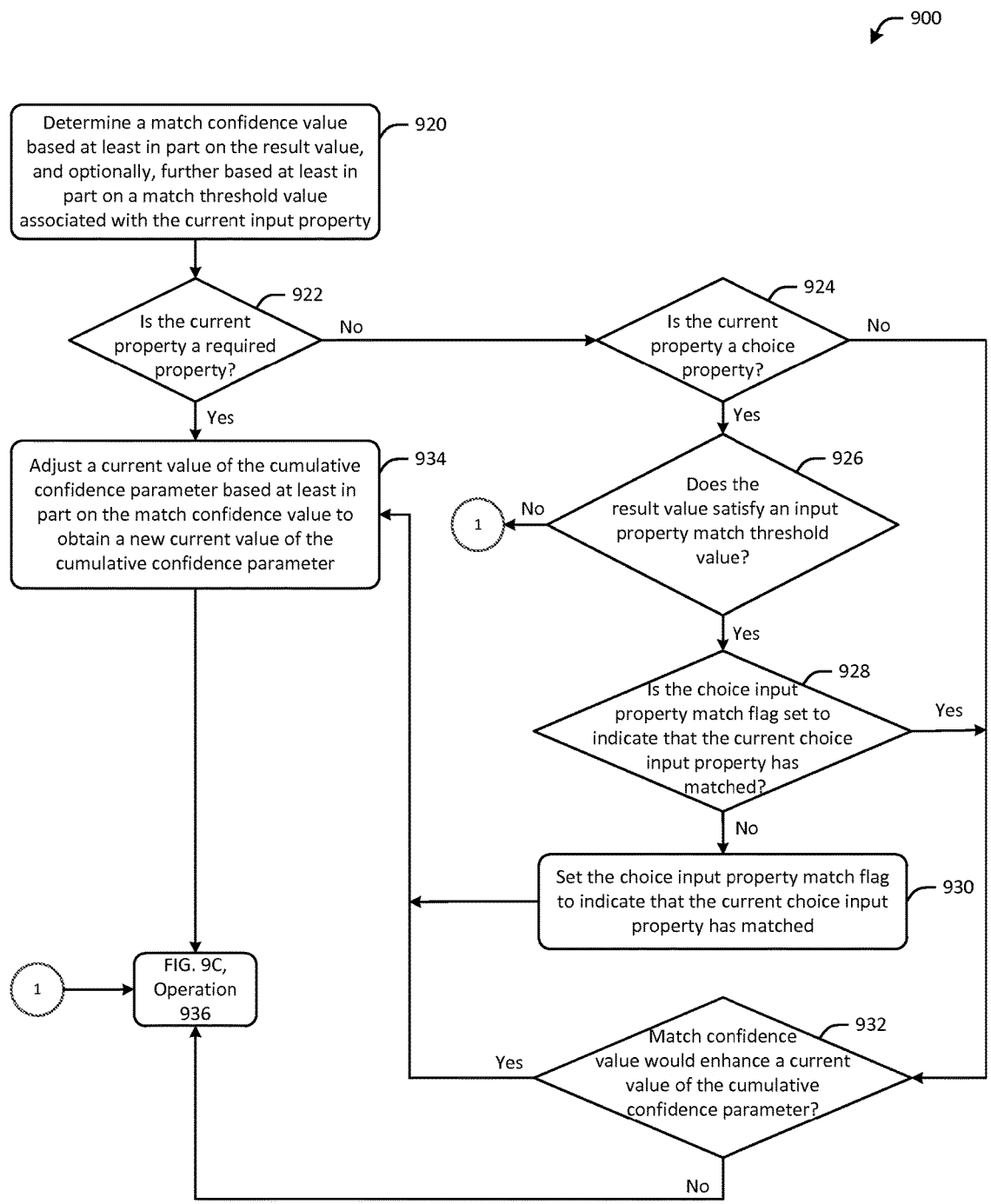
Figure 9C:
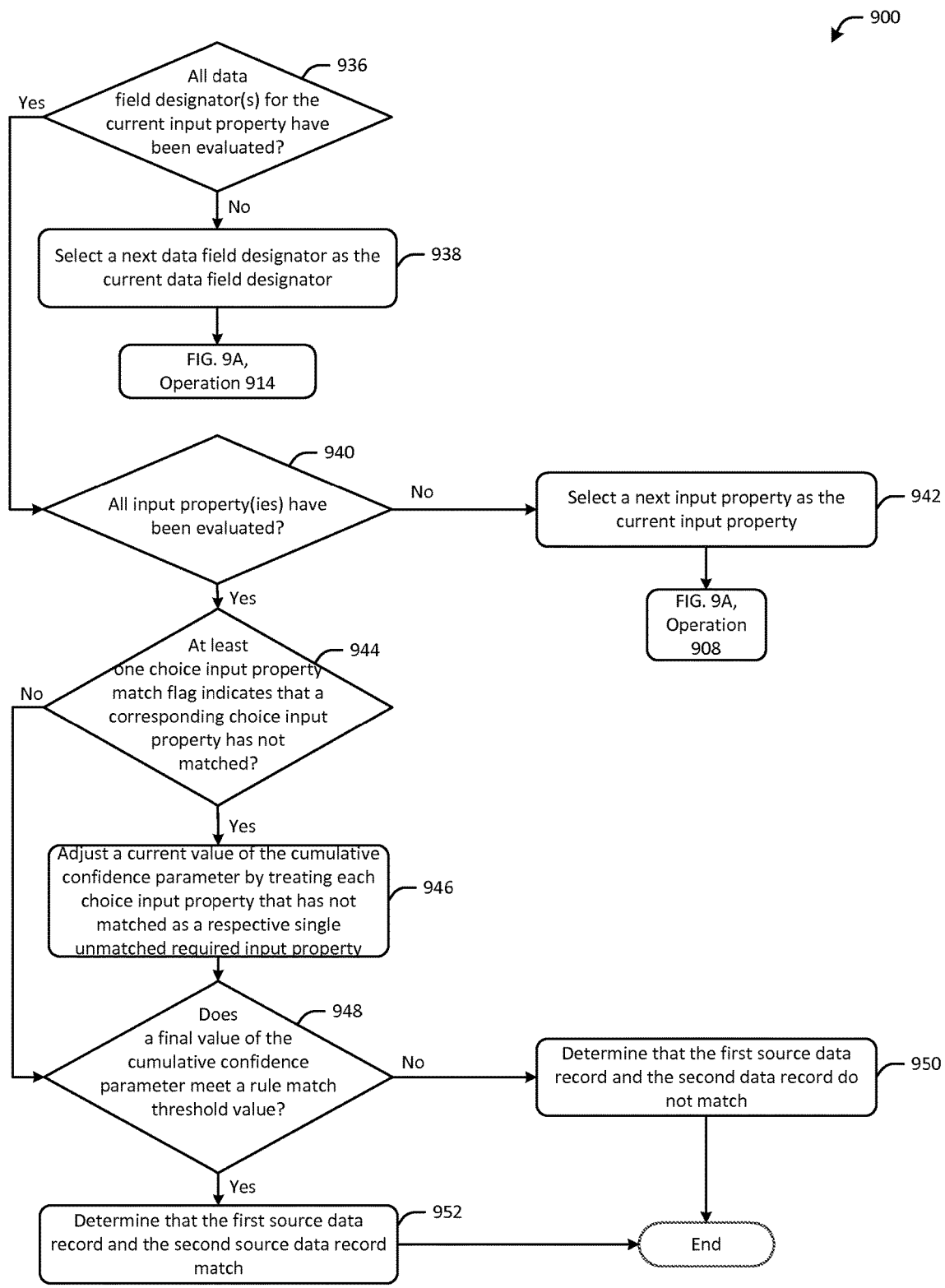

FIGS. 9A-9C are process flow diagrams of a more detailed illustrative method 900 for executing a data record matching rule on a set of source data records in accordance with one or more example embodiments of the disclosure. One or more operations of method 900 may be performed by the matching rule execution engine 116, or more specifically, in response to execution of computer-executable instructions of the matching rule execution engine 116. It should be appreciated, however, that any operation of method 900 may be performed, at least in part, by one or more other engines/sub-engines of the data correlation/integration server system 102. Further, the method 900 illustrates execution of a data record matching rule on a single pairwise combination of a first source data record and a second data record. It should be appreciated, however, that the method 900 may performed on any number of pairwise combination of source data records.

At block 902, the matching rule execution engine 116 may identify a set of input property(ies) specified by a data record matching rule. The set of input property(ies) may include at least one required input property. The set of input property(ies) may optionally further include at least one choice input property and/or at least one input property associated with an "optional" type designator.

It should be appreciated that the method 900 will be described based on the assumption that a data record matching rule is defined in accordance with a matching rule template that permits specifying multiple data field designators within a single input property (e.g., multiple alternative data field designators for a choice input property). In certain example embodiments, however, an alternative data record matching rule template may be used. For example, a data record matching rule template may be used in which a set of alternative source data record data fields are identified using a collection of alternative choice input properties, where each alternative choice input property specifies a single data field designator corresponding to a particular alternative source data record data field. A data record matching rule defined in accordance with this alternative template is eligible for execution with respect to a source data record that includes a populated data field corresponding to the data field designator of any of the alternative choice input properties (as long as other input property(ies) are satisfied). If the data record matching rule is defined in accordance with such an alternative data record matching rule template, certain operations of method 900 may be rendered unnecessary and/or superfluous.

At block 904, the matching rule execution engine 116 may assign a default value (e.g., zero) to a cumulative confidence parameter associated with execution of the matching rule on a first source data record and a second source data record. At block 906, the matching rule execution engine 116 may select a first input property from the set of input property(ies) as a current input property.

At block 908, the matching rule execution engine 116 may determine whether the current input property is a choice input property. As previously described, this determination may be made by determining whether a type designator associated with the current input property indicates that the input property is a choice input property. In response to a positive determination at block 908, the method 900 may proceed to block 910, where the matching rule execution engine 116 may set a choice input property flag corresponding to the current input property to a default value (e.g., a default Boolean value) that indicates that a match has not previously been determined with respect to the current choice input property. The method 900 may then proceed from block 910 to block 912. In response to a negative determination at block 908 (indicating that the current input property is not a choice input property), the method may proceed directly to block 912 without performing the operation at block 910.

At block 912, the matching rule execution engine 116 may select a first data field designator identified in the current input property as a current data field designator. In certain example embodiments, if the current input property is a required input property or an optional input property, it may specify only one data field designator. In contrast, if the current input property is a choice input property, it may specify multiple alternative data field designators.

At block 914, the matching rule execution engine 116 may identify a matching algorithm specified for the current data field designator. In certain example embodiments, a single matching algorithm may be specified for the input property, in which case, that matching algorithm is to be used in connection with each data field designator identified in the current input property. In other example embodiments, the current input property may not specify a matching algorithm, in which case, a default matching algorithm associated with the data record matching rule may be selected. In still other example embodiments, a respective matching algorithm may be associated with each of multiple data field designators identified in the input property. For example, a string matching algorithm may be associated with a first data field designator that corresponds to source data record data fields configured to receive a character string as input (while potentially excluding certain types of characters such as, for example, non-alphanumeric characters), a number matching algorithm tailored for comparing numeric quantities may be associated with a second data field designator that corresponds to source data record data fields configured to receive numeric input only, and a Levenshtein distance matching algorithm may be associated with a third data field designator that corresponds to source data record data fields configured to receive a character string representative of an entity's first name as input. It should be appreciated that the example matching algorithms discussed above are merely illustrative and not exhaustive.

At block 916, the matching rule execution engine 116 may identify first data from the first source data record and second data from the second source data record, where the first data and the second data are populated in a first data field of the first source data record and a second data field of the second source data record, respectively, and where the first data field and the second data field each correspond to the current data field designator. Then, at block 918, the matching rule execution engine 116 may execute the matching algorithm on the first data and the second data to obtain a result value.

Referring now to FIG. 9B, at block 920, the matching rule execution engine 116 may determine an input property match confidence value based at least in part on the result value. Depending on the matching algorithm executed at block 918, a match threshold value specified in the current input property may also be used to determine the input property match confidence value. For example, if the matching algorithm is a distance matching algorithm, both the result value and the match threshold value associated with the current input property may be used to determine the input property match confidence value. It should be appreciated that the input property match confidence value determined at block 920 is a metric that indicates a likelihood that respective data populated in respective data fields of the first and second source data records match, where the respective data fields correspond to the current data field designator. Thus, the input property match confidence value may correspond to the current data field designator. If an input property specifies multiple data field designators, multiple input property match threshold values may be determined for the input property, each of which corresponds to a particular data field designator specified by the input property.

From block 920, the method 900 may proceed to block 922, where the matching rule execution engine 116 may determine whether the current input property is a required input property. As previously described, this determination may be made by determining whether a type designator associated with the current input property indicates that the input property is a required input property. In response to a positive determination at block 922, the method 900 may proceed to block 934, where the matching rule execution engine 116 may adjust a current intermediate value of the cumulative confidence parameter based at least in part on the input property match confidence value determined at block 920. Because the current input property has been determined to be a required input property, the input property match confidence value may be used to adjust the current value of the cumulative confidence parameter regardless of whether it enhances or degrades (e.g., increases or decreases) the current cumulative confidence parameter value. From block 934, the method 900 may proceed to block 936.

More specifically, the input property match confidence value may be aggregated with a current value of the cumulative confidence parameter to determine an adjusted new current value of the cumulative confidence parameter. For example, the current value of the cumulative confidence parameter may be adjusted from the default value to the full normalized value of the input property match confidence value determined at block 920 during a first iteration of the method 900. The input property match confidence value determined at block 920 may be normalized to a value within any suitable range such as, for example, a value between 0 and 100, a value between 0 and 1, etc. Input property match confidence values determined during subsequent iterations of the method 900 may then be normalized and aggregated with the current value of the cumulative confidence parameter if they enhance the current value of the cumulative confidence parameter, or under certain circumstances described in more detail hereinafter, even if they degrade the current value of the cumulative confidence parameter. The aggregation may be a simple averaging if all input property match confidence values are weighted equally or may be a weighted averaging that takes into account respective weighting for individual input property match confidence values.

In particular, an input property match confidence value determined at block 920 may be normalized and averaged with one or more normalized input property match confidence values previously used to generate the current value of the cumulative confidence parameter. More specifically, a counter of the number of normalized input property match confidence values that have been averaged to obtain the current value of the cumulative confidence parameter may be maintained. The current value of the cumulative confidence parameter may then be multiplied by the value of the counter, and this result may be summed with the normalized input property match confidence value corresponding to the current data field designator and divided by the value of the counter incremented by one to obtain the adjusted value of the cumulative confidence parameter. In addition, the incremented value of the counter may be stored as the current counter value.

In other example embodiments, the extent to which an input property match confidence value contributes to a value of the cumulative confidence parameter may be determined based at least in part on the number of required and choice input property(ies) specified by the data record matching rule (assuming that a choice input property specifies multiple alternative data field designators). More specifically, the input property match confidence value determined at block 920 may be normalized and divided by a value indicative of the number of required and choice input property(ies) specified by the data record matching rule. The value thus obtained may be summed with the current value of the cumulative confidence parameter to obtain an adjusted value of the cumulative confidence parameter. In certain example embodiments, an input property match confidence value associated with an optional input property may also contribute to a value of the cumulative confidence parameter. In such example embodiments, a value representing a sum of the number of required input property(ies) and the number of choice input property(ies), as well as the number of optional input property(ies) whose corresponding input property match confidence value(s) would enhance the cumulative confidence value, may be determined and each input property match confidence value that contributes to the cumulative confidence value may be normalized and divided by this sum to determine its contribution to the cumulative confidence value.

It should be appreciated that a given input property may be associated with multiple input property match confidence values if, for example, the input property specifies multiple data field type designators. It should further be appreciated that input property match confidence values may be weighted differently depending on the type designator of the input property with which they are associated. For example, an input property match confidence value associated with a required input property or a first choice input property that matches may be weighted more heavily than an input property match confidence value associated with an optional property.

Still referring to FIG. 9B, in response to a negative determination at block 922, the method 900 may proceed to block 924, where the matching rule execution engine 116 may determine whether the current input property is a choice input property. It should be appreciated that, in certain embodiments, the matching rule execution engine 116 may rely on the earlier determination at block 908 rather than making the determination again at block 924. In response to a positive determination at block 924, the method 900 may proceed to block 926 where the matching rule execution engine 116 may determine whether the result value obtained at block 918 satisfies an input property match threshold value associated with the current choice input property. In those example embodiments in which the current choice input property does not specify an input property match threshold value, a default match threshold value (which may be the rule match threshold value) may be used.

In response to a negative determination at block 926 (indicating that the first data and the second data do not match with respect to the current choice input property), the remaining operations depicted in FIG. 9B may be skipped, and the method 900 may proceed directly to block 936. On the other hand, in response to a positive determination at block 926 (indicating that the first data and the second data match with respect to the current choice input property), the method 900 may proceed to block 928, where the matching rule execution engine 116 may determine whether a choice input property match flag has been set to indicate that the current choice input property has matched. In response to a negative determination at block 928 (indicating that the current choice input property has not previously matched), the matching rule execution engine 116 may set the choice input property match flag to indicate that the current choice input property has matched (e.g., may flip a Boolean value of the flag) at block 930. The method 900 may proceed from block 930 to block 934, where the matching rule execution engine 116 may adjust the current value of the cumulative confidence parameter based at least in part on the input property match confidence value determined at block 920. Since a negative determination is made at block 928, the current data field designator has been determined to be the first data field designator for which a match has been determined to exist for the current choice input property, and thus, the current value of the cumulative confidence parameter may be adjusted using the input property match confidence value determined at block 920 regardless of whether the input property match confidence value enhances or degrades the current cumulative confidence parameter value.

On the other hand, in response to a positive determination at block 928, the method 900 may proceed to block 932, where the matching rule execution engine 116 may determine whether the input property match confidence value determined at block 920 would enhance (e.g., increase) or degrade (e.g., decrease) the current value of the cumulative confidence parameter. A positive determination may be made at block 928 if the choice input property match flag indicates that a match has previously been determined for the current choice input property with respect to another data field designator other than the current data field designator.

In response to a positive determination at block 932, the method 900 may proceed to block 934, where the matching rule execution engine 116 may adjust the current value of the cumulative confidence parameter based at least in part on the input property match confidence value determined at block 920. On the other hand, in response to a negative determination at block 932, the method 900 may proceed directly to block 936.

Referring again to block 924, if, on the other hand, a negative determination is made at block 924, the operations at block 926-930 may be skipped, and the method 900 may proceed directly to block 932, where the matching rule execution engine 116 may determine whether the input property match confidence value determined at block 920 enhances or degrades the current value of the cumulative confidence parameter, as described earlier. If a negative determination is made at block 924, this may indicate that the current input property is an optional input property, and thus, only an input property match confidence value that enhances the current value of the cumulative confidence parameter may be used to perform the operation at block 934. This determination is reflected in block 932.

Referring now to FIG. 9C, at block 936, the matching rule execution engine 116 may determine whether all data field designator(s) have been evaluated for the current input property. More specifically, the matching rule execution engine 116 may determine whether a matching algorithm has been executed on respective data populated in respective data fields of the first source data record and the second source data record corresponding to each of the data field designator(s) specified in the current input property. In response to a negative determination at block 936, the method 900 may proceed to block 938, where the matching rule execution engine 116 may select a next data field designator of the current input property as a current data field designator. The method may then proceed iteratively from block 914 such that a matching algorithm may be selected and executed in connection with the current data field designator.

On the other hand, in response to a positive determination at block 936, the method 900 may proceed to block 940, where the matching rule execution engine 116 may determine whether all input property(ies) of the data record matching rule have been evaluated. In response to a negative determination at block 940, the method 900 may proceed to block 942, where the matching rule execution engine 116 may select a next input property specified in the data record matching rule as a current input property. The method 900 may then proceed iteratively from block 908.

If, however, a positive determination is made at block 940 (indicating that all input property(ies) for the matching rule have been evaluated), the method 900 may proceed to block 944, where the matching rule execution engine 116 may determine whether at least one choice input property match flag has been set to indicate that a corresponding choice input property has not matched. In response to a positive determination at block 944, the method may proceed to block 946, where the matching rule execution engine 116 may adjust a current value of the cumulative confidence parameter by treating each choice input property that has not matched as a single unmatched required input property. More specifically, the matching rule execution engine 116 may, for example, aggregate (e.g., average) each respective input property match confidence value determined with respect to each data field designator of a choice input property that has not matched to obtain an aggregated value and may adjust a current value of the cumulative confidence parameter using the aggregated value to obtain a final value of the cumulative confidence parameter. This may be repeated with respect to each choice input property that has not matched.

From block 946, the method 900 may proceed to block 948. Further, in response to a negative determination at block 944 (a determination that all choice input property(ies) have matched), the method 900 may skip the operation at block 946 and proceed directly to block 948. At block 948, the matching rule execution engine 116 may determine whether a final value of the cumulative confidence parameter satisfies a rule match threshold value associated with the matching rule. In response to a positive determination at block 948, the method 900 may proceed to block 952, where the matching rule execution engine 116 may determine that the first source data record and the second source data record match. As a result, the first source data record and the second source data may be included in a set of matched source data records. On the other hand, in response to a negative determination at block 948, the method 900 may proceed to block 950 where the matching rule execution engine 116 may determine that the first source data record and the second source data record do not match. Depending on which source data record is the root source data record, either the first source data record or the second source data record (or both if the root source data record does not match any other source data record) may be included in a set of unmatched source data records.

FIGS. 9A-9C depict execution of a particular data record matching rule on a particular pairwise combination of source data records to determine whether the source data records should be included in a set of matched source data records. In certain example embodiments, multiple data record matching rules (each of which is determined to be eligible for execution on a set of source data records) may be executed on pairwise combinations of source data records in the set. For a given pairwise combination, a respective final value of a cumulative confidence parameter may be determined in connection with execution of each data record matching rule. If any such respective final cumulative confidence parameter value satisfies a rule match threshold value of a corresponding data record matching rule, then the source data records in the associated pairwise combination may be determined to match. Alternatively, the data record matching rule that yields the largest final cumulative confidence parameter value for a particular pairwise combination of source data records may be identified and that final cumulative confidence parameter value may be compared against a rule match threshold value for the matching rule to determine whether the source data records in the particular pairwise combination match.

In addition, as previously described, an input property match confidence value associated with a required input property (or with a first data alternative data field designator of a choice input property) may be used to adjust an intermediate value of a cumulative confidence parameter regardless of whether the input property match confidence value enhances or degrades the intermediate value. For example, the input property match confidence value may be normalized and aggregated in some manner with the current intermediate value of the cumulative confidence parameter. Further, as previously described, in certain example embodiments, it may be determined that a match does not exist with respect to a required input property or with respect to any alternative data field designator of a choice input property if a result value obtained via execution of a matching algorithm does not satisfy a corresponding input property match threshold value. In such example embodiments, a zero confidence value (rather than the normalized input property match confidence value) may be used to adjust a current intermediate cumulative confidence parameter value.

Figure 10:
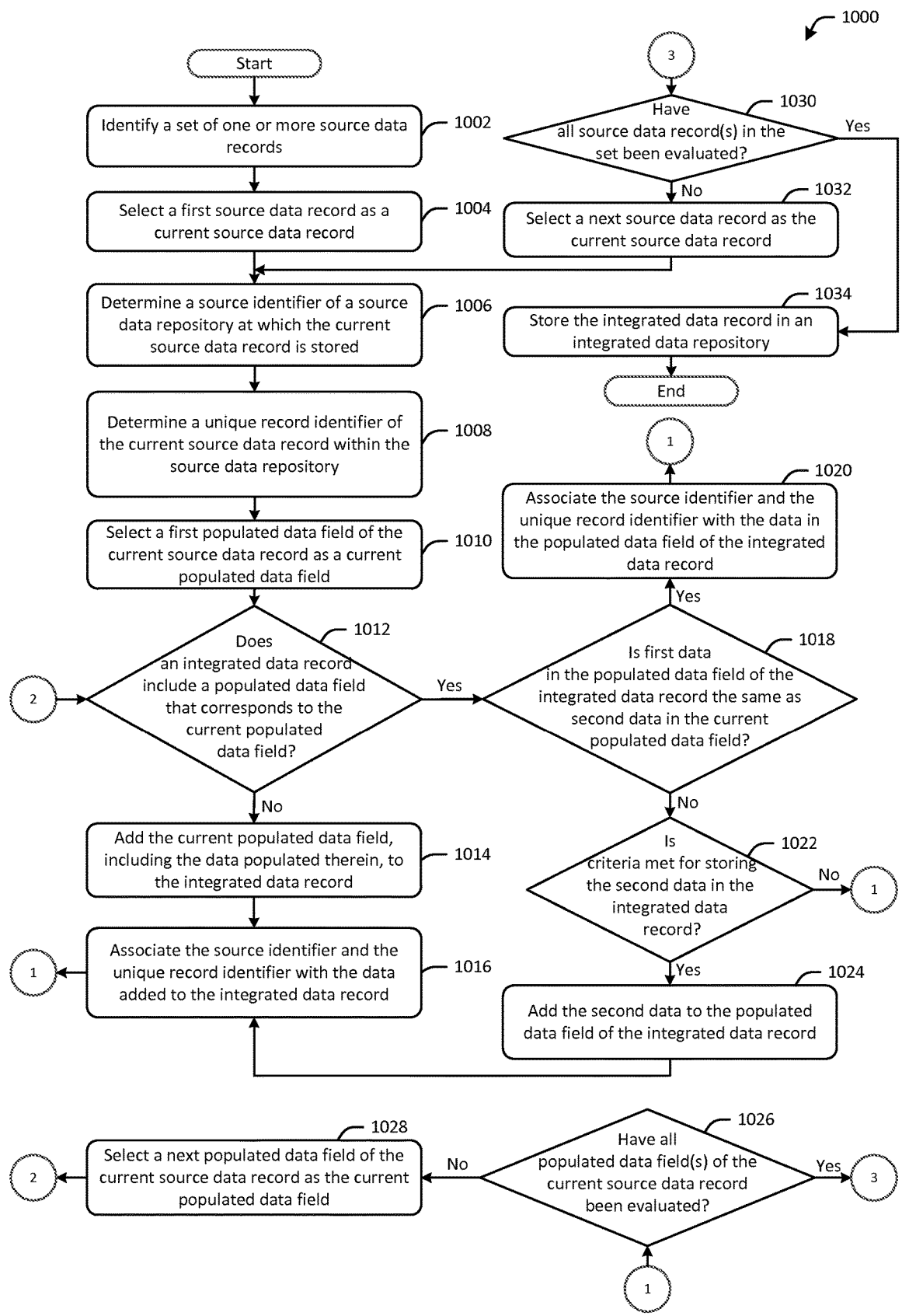
FIG. 10 is a process flow diagram of an illustrative method for generating an integrated data record from a set of one or more source data records in accordance with one or more example embodiments of the disclosure.

FIG. 10 is a process flow diagram of an illustrative method 1000 for generating an integrated data record from a set of one or more source data records in accordance with one or more example embodiments of the disclosure. One or more operations of method 1000 may be performed by the IDR engine 118, or more specifically, in response to execution of computer-executable instructions of the IDR engine 118. It should be appreciated, however, that any operation of method 1000 may be performed, at least in part, by one or more other engines/sub-engines of the data correlation/integration server system 102.

At block 1002, the IDR engine 118 may identify a set of one or more source data records. In certain example embodiments, the set of source data records may include a set of two or more matched source data records. In other example embodiments, the set of source data record(s) may include a single unmatched source data record. The IDR engine 118 may receive the set of source data record(s) from the SDR correlation engine 112, potentially via the coordination layer 108.

At block 1004, the IDR engine 118 may select a first source data record from the set of source data record(s) as a current source data record. At block 1006, the IDR engine 118 may determine a source identifier of a source data repository at which the current source data record is stored. The source identifier may be a value populated in a particular data field of the source data record, may be included in metadata associated with the source data record, or the like. At block 1008, the IDR engine 118 may determine a unique record identifier based on which the current source data record is identifiable within the source data repository at which the current source data record is stored. The unique record identifier may be a value populated in a particular data field of the source data record, may be included in metadata associated with the source data record, or the like.

At block 1010, the IDR engine 118 may select a first populated data field of the current source data record as a current populated data field. In certain example embodiments, each populated data field of the current source data record may be selected as a current populated data field during a corresponding iteration of the method 1000, while in other example embodiments, the IDR engine 118 may identify data fields in the current source data record and retrieve data populated therein in accordance with a data template that indicates which data fields in the current source data record to retrieve data from for populating an integrated data record. It should be appreciated that if the source identifier and/or the unique record identifier are populated in corresponding data fields of the current source data record, a populated data field selected as a current populated data field at block 1010 may be a data field other than the data field(s) populated with the source identifier and/or the unique record identifier.

At block 1012, the IDR engine 118 may determine whether an integrated data record includes a populated data field that corresponds to the current populated data field. Although not explicitly depicted in FIG. 10, it should be appreciated that as part of a first iteration of the method 1000, the IDR engine 118 may generate an empty data structure corresponding to the integrated data record. In response to negative determination at block 1012, the IDR engine 118 may add the current populated data field from the current source data record to the integrated data record at block 1014. In particular, the IDR engine 118 may, at block 1014, populate a corresponding data field of the integrated data record with the data populated in the current populated data field of the current source data record. The IDR engine 118 may use a data mapping (e.g., a data dictionary) to determine a correspondence between the current populated data field of the current source data record and a data field of the integrated data record to be populated with the data populated in the current populated data field.

From block 1014, the method 1000 may proceed to block 1016, where the IDR engine 118 may associate the source identifier and the unique record identifier with the data added to the integrated data record during a previous operation (e.g., the data retrieved from the current populated data field of the current source data record). In certain example embodiments, a sub-record may be created within the integrated data record. The populated data field added to the integrated data record at block 1014 may be a populated data field added to the sub-record, and the operation at block 1016 may include populating the source identifier and the unique record identifier in additional respective data fields of the same sub-record. In other example embodiments, the source identifier and/or the unique record identifier may be stored in association with the data populated in the populated data field added to the integrated data record at block 1014 (e.g., as a key-value pair). From block 1016, the method 1000 may proceed to block 1026.

On the other hand, in response to a positive determination at block 1012 (e.g., the integrated data record includes a "LastName" data field populated with the data "Viswanadham"), the method 1000 may proceed to block 1018, where the IDR engine 118 may determine whether first data in the populated data field of the integrated data record that corresponds to the current populated data field of the current source data record is the same as second data populated in the current populated data field of the current source data record. In response to a positive determination at block 1018 (e.g., a "LastName" data field of the integrated data record is already populated with the data "Viswanadham"), the method 1000 may proceed to block 1020, where the IDR engine 118 may associate the source identifier with the first data that is populated in the data field of the integrated data record that corresponds to the current populated data field of the current source data record. From block 1020, the method 1000 may proceed to block 1026.

On the other hand, in response to a negative determination at block 1018, the method 1000 may proceed to block 1022. A negative determination may be made at block 1018 if, for example, the current populated data field of the current source data record is an "Email" data field populated with a first email address and the corresponding data field of the integrated data record is populated with a second, different email address. At block 1022, the IDR engine 118 may determine whether one or more criteria are satisfied for storing the second data (e.g., the data populated in the current populated data field of the current source data record) in the integrated data record. An example criterion may be, for example, whether the data field in the integrated data record is capable of being populated with multiple distinct data items (e.g., whether multiple email addresses can be populated in an "Email" data field of the integrated data record).

In response to a positive determination at block 1022, the method 1000 may proceed to block 1024, where the IDR engine 118 may add the second data to the data field of the integrated data record that is already populated with the first data. In certain example embodiments, the second data may not be added to the same data field of the integrated data record that is already populated with the first data. Rather, a new instance of the data field in the integrated data record may be generated and the first data may be populated in this new instance of the data field. From block 1024, the method 1000 may proceed to block 1016, where the source identifier and the unique record identifier associated with the current source data record may be associated with the second data populated in the data field of the integrated data record that now includes both the first data and the second data (or populated in the new instance of the data field). On the other hand, in response to a negative determination at block 1022, the method 1000 may proceed to block 1026. A negative determination may be made at block 1022 if, for example, the first data is the data "Kenneth" populated in a "FirstName" data field of the integrated data record and the second data is the data "Ken" populated in a corresponding "FirstName" data field of the current source data record. For example, an example criterion may specify that certain types of data fields (e.g., the "FirstName" data field) may only be populated with a single data element.

At block 1026, the IDR engine 118 may determine whether all populated data field(s) in the current source data record (or some subset of data field identified by a data template) have been evaluated to determine whether data populated therein should be included in the integrated data record. In response to a negative determination at block 1026, the method 1000 may proceed to block 1028, where the IDR engine 118 may select a next populated data field of the current source data record as the current populated data field. It should be appreciated that the next populated data field that is selected at block 1028 may exclude any data field(s) in the current source data record that are not specified in a data template associated with the integrated data record and/or that are populated with the source identifier and/or the unique record identifier. From block 1028, the method 1000 may proceed iteratively from block 1012.

On the other hand, in response to a positive determination at block 1026, the IDR engine 118 may determine, at block 1030, whether all source data record(s) in the set of source data record(s) identified at block 1002 have been evaluated. In response to a positive determination at block 1030, the method 1000 may proceed to block 1034, where the IDR engine 118 may store the integrated data record in an integrated data repository and the method 1000 may end. On the other hand, in response to a negative determination at block 1030, the IDR engine 118 may select a next source data record as the current source data record at block 1032, and the method 1000 may proceed iteratively from block 1006.

Figure 11:
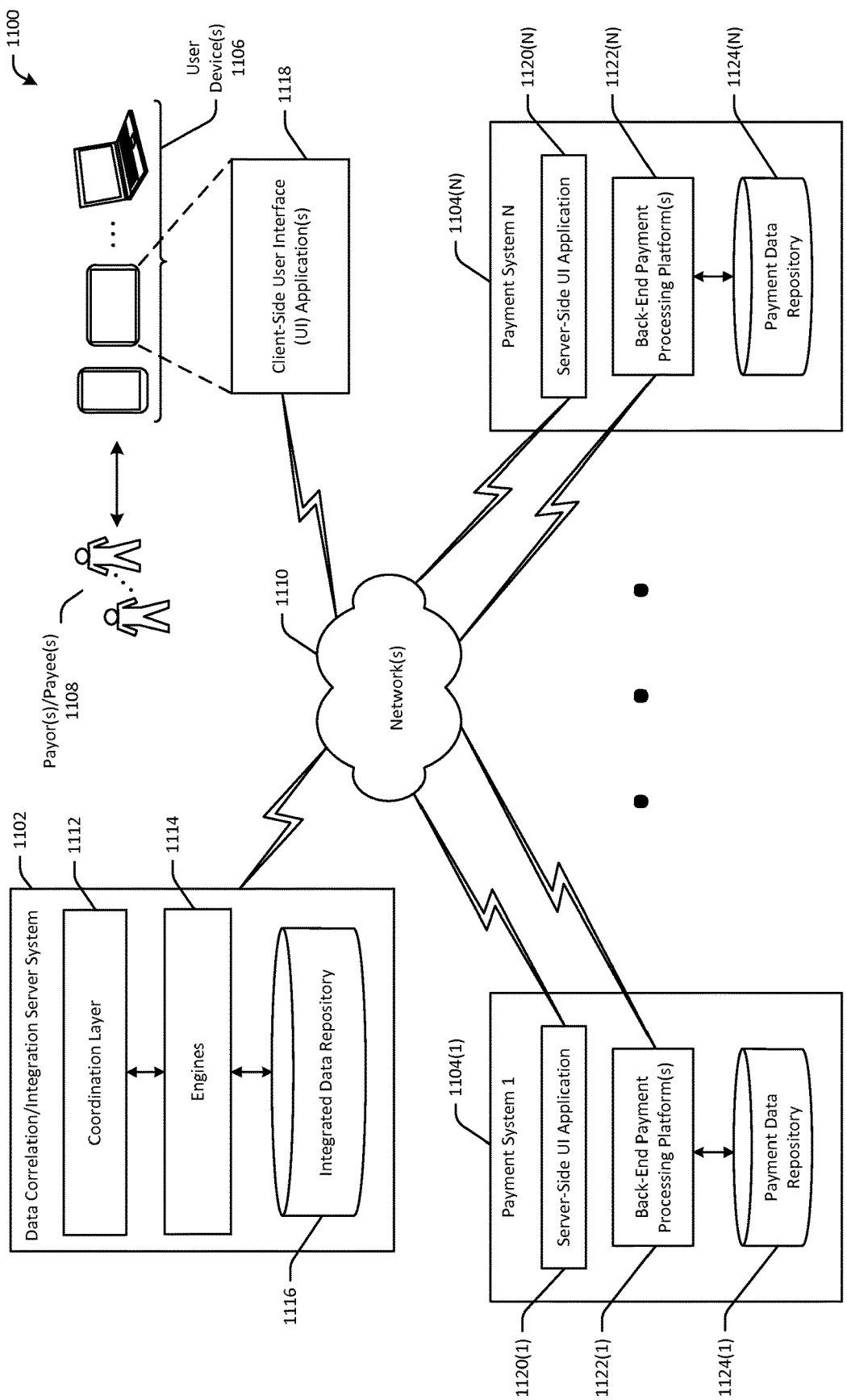
FIG. 11 is a schematic block diagram of an illustrative networked architecture that includes a data correlation/integration server system and one or more payment systems configured to leverage the data correlation/integration server system in accordance with one or more embodiments of the disclosure.

FIG. 11 is a schematic block diagram of an illustrative networked architecture 1100 that includes a data correlation/integration server system 1102 and one or more payment systems 1104(1)-1104(N) configured to leverage the data correlation/integration server system 1102 in accordance with one or more embodiments of the disclosure. In certain example embodiments, the data correlation/integrated server system 1102 may be the data correlation/integrated server system 102 depicted in FIG. 1A.

The illustrative networked architecture 1100 may include the data correlation/integration server system 1102, the one or more electronic payment systems 1104(1)-1104(N), and one or more user devices 1106. Any of these components of the networked architecture 1100 may be configured to communicate with any other component of the networked architecture 1100 via one or more networks 1110. The network(s) 1110 may include any of the types of example networks and any of the example types of transmission media and communication links described in reference to the network(s) 104 depicted in FIG. 1A.

The user device(s) 1106 may include any suitable network-accessible device capable of displaying or otherwise presenting one or more user interfaces with which one or more users (e.g., one or more payors/payees 1108, hereinafter also referred to as payor 1108 or payee 1108) may interact to provide input data and receive output data. The user device(s) 1106 may include, without limitation, a personal computer, a laptop computer, a smartphone, a tablet, a personal digital assistant (PDA), a wearable computing device, a content streaming device, a gaming device, or the like. Further, in certain example embodiments, the user device(s) 1106 may include a device configured for voice-based user interaction. While the user device(s) 1106 may be referred to herein in the singular, it should be appreciated that any number of user devices 1106 may be configured to interact with any number of electronic payment systems 1104(1)-1104(N) and/or the data correlation/integration server system 1102 via one or more of the network(s) 1110. It should be appreciated that a particular payor 1108 or payee 1108 may use any of multiple user devices 1106 to interact with any of the electronic payment systems 1104(1)-1104(N) and/or the data correlation/integration server system 1102.

The data integration/correlation server system 1102 may include a coordination layer 1112, engines 1114, and an integrated data repository 1116. As previously noted, in certain example embodiments, the data correlation/integration server system 1102 may be the data correlation/integration server system 102 depicted in FIG. 1A. As such, the coordination layer 1112 may be the coordination layer 108, the engines 1114 may include any of the engines depicted as part of the data correlation/integration server system 102, and the integrated data repository 1116 may be the integrated data repository 122. More specifically, the engines 1114 may include the SDR engine 110, the SDR correlation engine 112 (including the matching rule selection engine 114 and the matching rule execution engine 116), the IDR engine 118, and the other engine(s) 120. In certain example embodiments, the other engine(s) 120 included among the engines 1114 may include a risk engine configured to execute risk processing (e.g., debit risk processing); a money movement engine configured to generate debit and/or credit instructions to cause a debit and/or a credit to be initiated; a notification engine configured to execute processing to generate any of a variety of types of notifications (e.g., a credit notification, an invitation message to register with a payment system, etc.); and so forth.

Each electronic payment system 1104(1)-1104(N) may include a respective server-side user interface (UI) application 1120(1)-1120(N), a respective one or more back-end payment processing platforms 1122(1)-1122(N), and a respective payment data repository 1124(1)-1124(N). The reference numeral 1104 may be used herein to generically denote any given electronic payment system. Similarly, the reference numeral 1120 may be used herein to generically denote a server-side UI application of an electronic payment system 1104, the reference numeral 1122 may be used herein to generically denote back-end payment processing platform(s) of an electronic payment system 1104, and the reference numeral 1124 may be used herein to generically denote a payment data repository of an electronic payment system 1104. An electronic payment system 1104 may correspond to a particular implementation of the application system 106 depicted in FIG. 1A. As such, the server-side UI application 1120 and the back-end payment processing platform(s) 1122 may form part of the application layer 124 of an application system 106, the payment data repository 1124 may be a particular type of source data repository 128, and the back-end payment processing platform(s) 1122 may include or otherwise leverage the DBMS 126 to access the payment data repository 1124. Further, while an electronic payment system 1104 may, at times, be referred to herein simply as a payment system, it should be appreciated that the system being referred to is one that enables electronic, network-based payment processing.

In certain example embodiments, a user device 1106 may enable interaction between a payor 1108 and a payment system 1104. More specifically, a payor 1108 may utilize a UI application, at least a portion of which may be executable on a user device 1106, to interact with a payment system 1104. Such a UI application may include a server-side component (e.g., the server-side UI application 1120) that may form part of the payment system 1104 (and which may be hosted by an entity that operates the payment system 1104 or by another entity) and a client-side component (e.g., a client-side UI application 1118) executable on a user device 1106.

The client-side UI application 1118 may be a "thin" client such as a traditional or mobile Web browser, a thin client augmented with customized elements (e.g., Active X controls, UI widgets, client-side executable scripts, etc.), or a fully customized "fat" client such as a mobile application, a downloadable or installable application executable on a personal or laptop computer, or the like. The client-side UI application 1118 may be configured to interact with the server-side UI application of a payment system 1104 via one or more of the network(s) 1110. For example, the client-side UI application 1118 may receive user input data provided to one or more UIs and may transmit the input data to the server-side UI application 1120. Similarly, the client-side UI application 1118 may receive data from the server-side UI application 1120 and may be configured to display or otherwise present the received data (or a representation thereof) via one or more UIs on the user device 1106. The manner in which functionality of a UI application is distributed between the server-side component (e.g., the server-side UI application 1120) and the client-side component (e.g., the client-side UI application 1118) and the extent to which data generated or utilized by the UI application is stored at the payment system 1104 (e.g., at the payment data repository 1124) or at the user device 1106 may depend on the particular architectural implementation of the UI application.

As previously noted, a payor 1108 may utilize a UI application that includes a server-side component hosted remotely from a user device 1106 and a client-side component executing locally on the user device 1106 to interact with a payment system 1104. For example, a payor 1108 may submit payment requests to the payment system 1104 via the client-side UI application 1118. A payor 1108 may include an individual (e.g., a consumer) or an entity (e.g., a business, small or large) that is registered with the payment system 1104. For example, a payor 1108 may initiate payment requests through its registration profile with the payment system 1104. In those example embodiments in which the payor 1108 is a business entity, an authorized individual (e.g., a business owner, employee, or contactor) may submit payment requests to the payment system 1104 on behalf of the payor 1108 (e.g., the business entity). The term payor 1108 as used herein encompasses both an individual interacting with a payment system 1104 via the client-side UI application 1118 (whether or not the individual is the entity registered with the payment system 1104 or acting in an authorized capacity on behalf of a registered entity) as well as the registered entity itself.

Similarly, a payee 1108 may utilize a UI application that includes a server-side component hosted remotely from a user device 1106 and a client-side component executing locally on the user device 1106 to interact with a payment system 1104. For example, a payee 1108 may interact with the payment system 1104 via the client-side UI application 1118 to submit requests for payment to the payment system 1104 and/or receive payments electronically from the payment system 1104. As described above with respect to a payor 1108, a payee 1108 may be an individual (e.g., a consumer) or a business entity (e.g., a merchant, biller, etc.) may interact with the payment system 1104 to register and/or receive payments. In those example embodiments in which the payee 1108 is a business entity, an authorized individual (e.g., a business owner, employee, or contactor) may interact with the payment system 1104 via the client-side UI application 1118 to register and/or receive payments on behalf of the payee 1108 (e.g., the business entity). The term payee 1108 as used herein encompasses both an individual interacting with a payment system 1104 via the client-side UI application 1118 (whether or not the individual is the entity registered with the payment system 1104 or acting in an authorized capacity on behalf of a registered entity) as well as the registered entity itself.

In certain example embodiments, the data correlation/integration server system 1102 may enable integration of a first payment system 1104(1) with a second payment system 1104(2). The first payment system 1104(1) and the second payment system 1104(2) may maintain different repositories (e.g., payment data repository 1124(1) and payment data repository 1124(2)) storing data relating to entities registered with the respective payment systems. Further, the first payment system 1104(1) and the second payment system 1104(2) may have different processing capabilities and may support different functionality. For example, payment requests that may be rejected by a particular payment system (e.g., the first payment system 1104(1)) may be successfully executed by another payment system (e.g., the second payment system 1104(2)). As another example, payment processing typically performed in one manner by a particular payment system (e.g., the first payment system 1104(1)) may be performed in an improved manner by another payment system (e.g., the second payment system 1104(2)). For example, the second payment system 1104(2) may be capable of utilizing information stored at its payment data repository 1124(2) and/or the payment processing capabilities of its back-end payment processing platform(s) 1122(2) to electronically credit a payee 1108 in situations where the first payment system 1104(1) cannot. More generally, the second payment system 1104(2) may be configured to use alternative debiting and/or crediting mechanisms (including possibly the use of financial accounts unknown to the first payment system 1104(1)) than the first payment system 1104(1) (or vice versa) to reduce the risk of a payment transaction, reduce the cost of a payment transaction, or increase the transaction speed of a payment transaction (e.g., reduce the amount of time required to credit a payee).

The data correlation/integration server system 1102 may enable integration between the first payment system 1104(1) and the second payment system 1104(2) to allow either payment system to take advantage of alternative debiting and/or crediting mechanisms of the other payment system. Further, in certain example embodiments, the data correlation/integration server system 1102 may enable use of information known to a particular payment system (e.g., the second payment system 1104(2)) to improve the manner in which a payment is executed in a payment system that originally receives a payment request (e.g., the first payment system 1104(1)). For example, the data correlation/integration server system 1102 may enable retrieval of a financial account identifier known to the second payment system 1104(2) but unknown to the first payment system 1104(1) to allow the first payment system 1104(1) to perform a credit electronically. More generally, the data correlation/integration server system 1102 may enable all the payment processing to be handled by one payment system (except possibly notification), but in an improved manner by leveraging information from another payment system.

In certain example embodiments, the first payment system 1104(1) may be an electronic bill payment system and the second payment system 1104(2) may be a person-to-person (P2P) payment system (or vice versa). A bill payment system may permit payments to be made to a wider range of payees than a P2P payment system. For example, a bill payment system may allow a registered payor to pay non-registered payees in addition to registered payees by supporting paper instrument payments in addition to electronic payments. On the other hand, a P2P payment system may store a greater breadth of information (e.g., information pertaining to registered entities such as consumers and small business entities) to enable electronic payments to a wider range of payees. Consumers and small business entities are often not registered with a bill payment system for receiving electronic payments. While a bill payment system and a P2P payment system may maintain different data for registered entities, the systems may also store common data. For example, a bill payment system may store a physical address for a non-electronic payee to enable a paper instrument payment to be made to the non-electronic payee while a P2P payment system may not. Conversely, a P2P payment system may store a mobile phone number for a registered entity for identification and/or notification purposes while a bill payment system may not. However, in certain instances, a bill payment system and a P2P payment system may store common data such as, for example, a name of a registered entity, a notification identifier such as an email address, etc.

Registered entities within a bill payment system may include, for example, subscribers (e.g., enrolled consumers or small businesses that utilize the bill payment system to make payments and/or receive electronic bills), managed payees (e.g., payees for whom the bill payment system has additional information beyond that which the consumer provides thereby enabling payment to be made in an improved or more optimal fashion), electronic billers, and so forth. Registered entities within a P2P payment system may include, for example, subscribers, such as consumers or small businesses, who utilize the P2P payment system to make and receive payments. It should be appreciated that a registration profile for an entity registered with a P2P payment system may, in certain scenarios, only permit the entity to perform one of these functions.

The first payment system 1104(1) and the second payment system 1104(2) may be hosted by a same entity or by different entities. Further, the data correlation/integration server system 1102 may be hosted by a same entity as the first payment system 1104(1) and/or the second payment system 1104(2) or by an entity different from an entity hosting the first payment system 1104(1) and an entity hosting the second payment system 1104(2).

Each payment system 1104 may support a variety of types of respective functionality. For example, the back-end payment processing platform(s) 1122(1) of the first payment system 1104(1) may be configured to execute various payment-related processing supported by the first payment system 1104(1), and similarly, the back-end payment processing platform(s) 1122(2) of the second payment system 1104(2) may be configured to execute various payment-related processing supported by the second payment system 1104(2). For any given payment system 1104, such payment-related processing may include, without limitation, storing, updating, and retrieving data in/from a payment data repository 1124 of the payment system 1104; obtaining data from other systems, services, and/or data repositories (either local or remote) to enable determinations to be made (e.g., a determination as to whether a payee is eligible for crediting via another payment system) or other processing to be performed; selecting a payment request for processing at a designated time; performing identity risk analysis with respect to a registering entity; performing payment risk processing with respect to a payment request; matching a payor indicated by a payee to a known (managed or registered) payee; performing account scheming/modification on a payor's account for a payee; determining appropriate mechanisms for executing a credit and/or a debit (including, for electronic payments, determining financial accounts and payment networks to utilize); generating and transmitting debit and/or credit instructions; generating and transmitting remittance advice; generating and transmitting various other notifications (e.g., registration invitation messages); supporting registration of an entity; and so forth.

A payment data repository 1124 of a payment system 1104 may include data relating to registered entities (e.g., payors or payees); data relating to financial institutions or other sponsors; business or operating rules; and so forth. A sponsor may be an entity through whom subscribers may obtain access to the services of the payment system 1104. A sponsor may be a financial institution or some other type of entity such as, for example, an Internet portal, a service provider, a merchant, or a biller. Functionality supported by the payment system 1104, operating rules, transaction costs, and/or UI characteristics may be configured for a sponsor.

The data relating to a registered entity may include, for example, identifying information for the registered entity; notification identifiers/contact information associated with the registered entity; financial account information (e.g., one or more financial account numbers associated with the registered entity); contacts of the registered entity (e.g., designated payees); user preferences associated with the registered entity; network connectivity information (e.g., device identifying information of a user device 1106 associated with the registered entity (e.g., an Internet Protocol (IP) address)); notification information relating to prior notifications sent or received; payment history information indicating prior completed payments, pending payment requests, etc.; and so forth.

The identifying information may include, for example, a name of the registered entity, a social token associated with the registered entity (e.g., an email address, a social networking identifier, etc.), and so forth. The notification identifiers/contact information may include, for example, an email address of the registered entity, a phone number of the registered entity, a physical address of the registered entity, and so forth. It should be appreciated that a social token (e.g., an email address) may constitute both identifying information of the registered entity as well as a notification identifier associated with the registered entity. In addition, in certain example embodiments, identifying information for a registered entity may include a financial account number, a customer's billing account number with a biller, etc. These various types of account numbers may be considered social tokens of the registered entity.

While example embodiments may be described herein with respect to scenarios in which the data correlation/integration server system 1102 enables integration between two particular payment systems (e.g., the first payment system 1104(1) and the second payment system 1104(2)), it should be appreciated that the data correlation/integration server system 1102 may enable integration between any number of application systems 106 such as, for example, any number of payment systems 1104 that include respective payment data repositories 1124 storing financial account information for registered entities. For example, even in those example embodiments in which a particular payment system 1104 (e.g., the first payment system 1104(1)) initiates the debit and credit associated with a payment system (e.g., performs all or nearly all of the payment processing associated with the payment request), the data correlation/integration server system 1102 may nonetheless enable a form of integration with another payment system (e.g., the payment system 1104(2)) by providing the first payment system 1104(1) with information (e.g., a financial account number) known to the second payment system 1104(2) but not known to the first payment system 1104(1). Further, in certain example embodiments, the data correlation/integration server system 1102 may enable integration between greater than two payment systems 1104 in scenarios in which a debit or credit is split into multiple transactions handled by different payment systems 1104. In certain example embodiments, the data correlation/integration server system 1102 (or one or more components thereof) may be incorporated into one or more payment systems 1104 (not simply hosted by a same entity that hosts a payment system 1104).

The integrated data repository 1116 of the data correlation/integration server system 1102 may be a standalone repository that stores at least a portion of respective data stored in respective payment data repositories 1124 of each of one or more payment systems 1104 and that is independent from the respective payment data repositories 1124. For example, the integrated data repository 1116 may store one or more integrated data records, where each integrated data record may include respective data from each of one or more source data records. Each source data record may be stored in a respective payment data repository 1124 of a respective payment system 1104 and may correspond to a particular entity registered with the respective payment system 1104. Source data records from different payment systems 1104 may be matched to one another in accordance with the matching processes described earlier in this disclosure. Moreover, an integrated data record may be populated with respective data from matched source data records in accordance with, for example, the method 1000 illustrated in and described in reference to FIG. 10.

The respective data from a source data record that may be included in an integrated data record may include, for example, an identifier of the payment data repository 1124 at which the source data record is stored, a unique record identifier of the source data record within the payment data repository 1124, identifying information for the registered entity with which the source data record is associated, notification identifiers/contact information associated with the registered entity, financial account information (e.g., one or more financial account numbers associated with the registered entity), user preferences associated with the registered entity, and so forth. The identifying information may include, for example, a name of the registered entity, a social token (e.g., an email address, a social networking identifier, etc.), and so forth. The notification identifiers/contact information may include, for example, an email address, a phone number, a physical address, and so forth. It should be appreciated that a social token (e.g., an email address) may constitute both identifying information of the registered entity as well as a notification identifier.

In other example embodiments, the integrated data repository 1116 may be a "federated" registry—a logical integration of source record data stored at respective payment data repositories 1124 of respective payment systems 1104—rather than a standalone data repository that is independent of the respective payment data repositories 1124. In those example embodiments in which the integrated data repository 1116 is a federated registry, source record data may not be duplicated in the integrated data repository 1116. However, even if the integrated data repository 1116 is a "thinner" federated repository, an integrated data record stored in the integrated data repository 1116 may still store information (e.g., a payment data repository 1124 identifier, a source data record identifier, etc.) that links data populated in the integrated data record back to a corresponding source data record stored in a payment data repository 1124.

In various example embodiments, the integrated data repository 1116 may include data from one or more systems other than, for example, the first payment system 1104(1) and the second payment system 1104(2), but which can be utilized to further enhance the matching of respective source data records stored in respective payment data repositories 1124(1) and 1124(2) of the first payment system 1104(1) and the second payment system 1104(2). Such data from one or more other systems may also be utilized to facilitate payment without requiring a payee registered with the first payment system 1104(1) to re-enroll with the second payment system 1104(2); may enable integration with one or more other payment systems 1104; and so forth. The other system(s) may include any system that stores data relating to registered entities associated with financial accounts including, for example, an online banking system, a core account processing system, a funds transfer system, a merchant payment system, and so forth. The other system(s) may be hosted by a same entity that hosts the first payment system 1104(1) and/or the second payment system 1104(2). The other system(s) may also include third-party payment systems such as, for example, third-party P2P payment system, retail systems, electronic wallets, and so forth.

FIGS. 12A-15B are sequence diagrams that depict a variety of payment scenarios according to which the data correlation/integration server system 1102 may enable integration between the first payment system 1104(1) and the second payment system 1104(2). The example payment scenarios depicted in FIGS. 12A-15B may be implemented in a context in which the first payment system 1104(1) is a bill payment system and the second payment system 1104(2) is a P2P payment system. An example use case within this context is one in which a payor initiates a payment to a non-electronic payee via the first payment system 1104(1) (e.g., a bill payment system), which would generally be executed as a paper payment by the first payment system 1104(1), but which may executable as an electronic payment by the second payment system 1104(2) (e.g., a P2P payment system). However, it should be appreciated that payment scenarios in which the first payment system 1104(1) is a P2P payment system (or another type of payment system) and the second payment system 1104(2) is a bill payment system (or another type of payment system) are also within the scope of this disclosure.

Figure 12A:
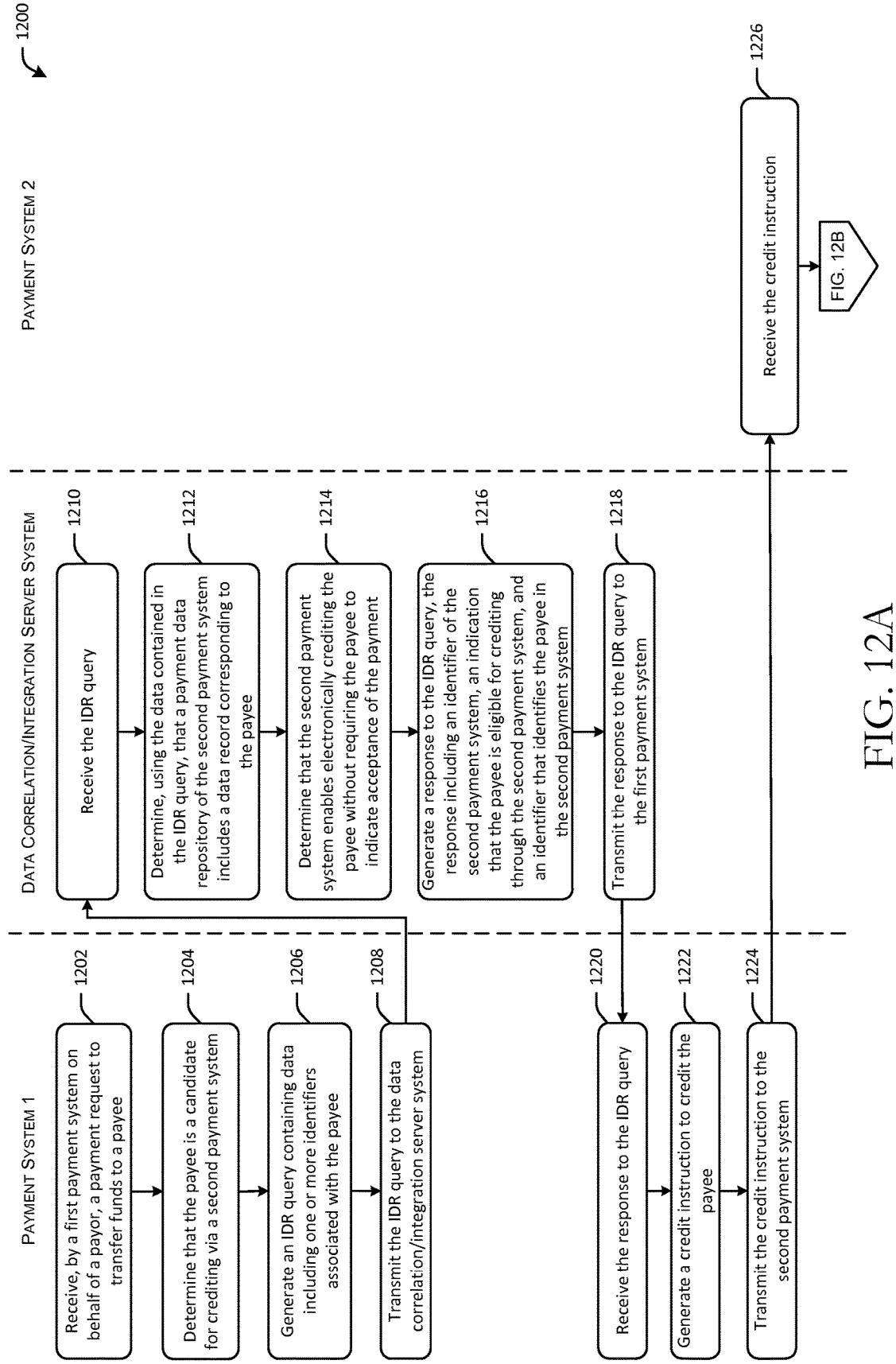
FIGS. 12A-12B are sequence diagrams illustrating a first payment system leveraging information from a data correlation/integration server system to credit a payee via a second payment system without requiring interaction with the payee in accordance with one or more example embodiments of the disclosure.
Figure 12B:
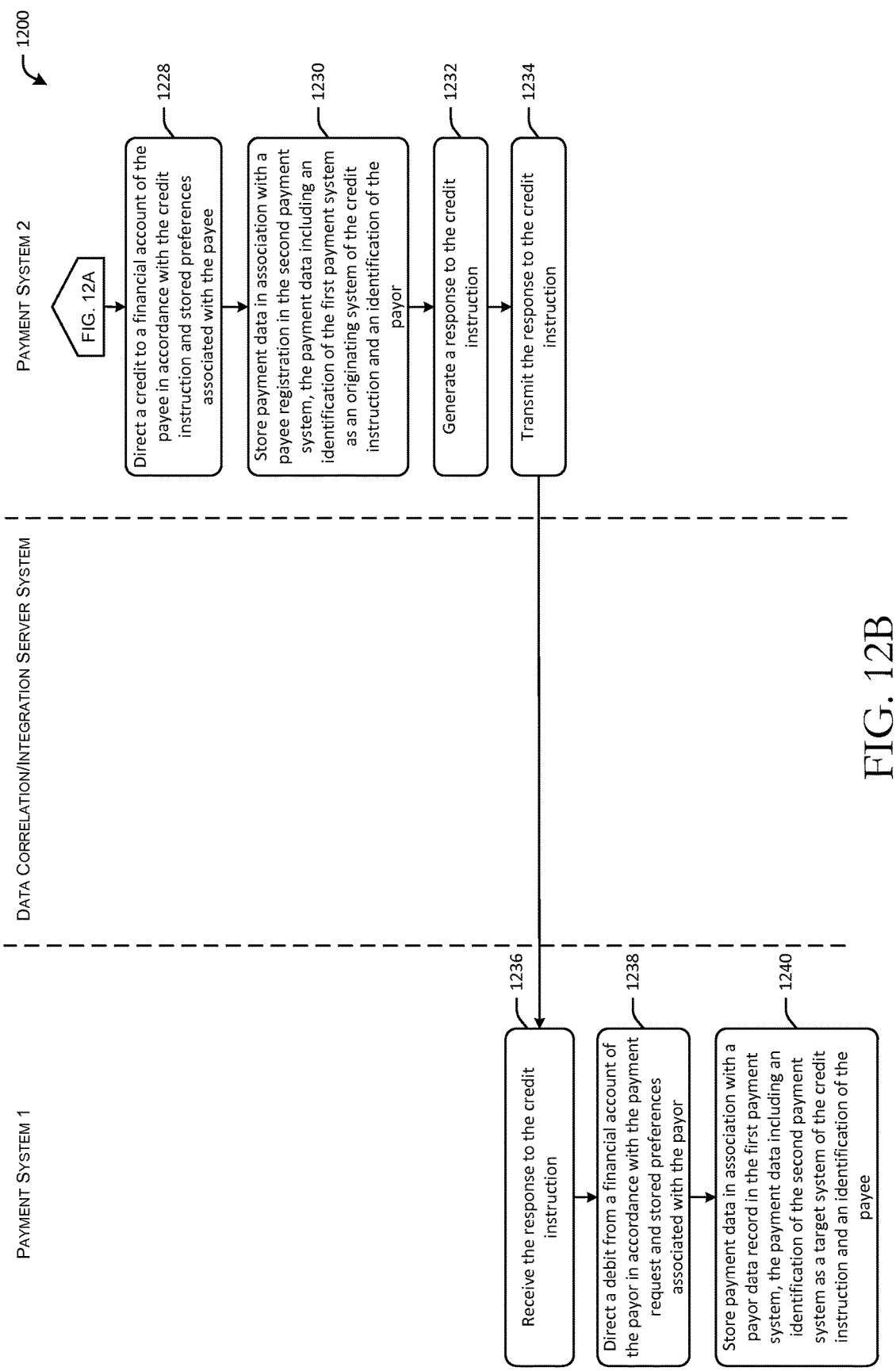

FIGS. 12A-12B are sequence diagrams illustrating the first payment system 1104(1) leveraging information from the data correlation/integration server system 1102 to credit a payee via the second payment system 1104(2) without requiring interaction with the payee in accordance with one or more example embodiments of the disclosure.

Referring first to FIG. 12A, at block 1202, the first payment system 1104(1) may receive a payment request to transfer funds to a payee. For example, a payor may utilize a UI application associated with the first payment system 1104(1) to submit the payment request. More specifically, a payor may provide input data to a client-side component of the UI application (e.g., the client-side UI application 1118) executing on a user device 1106, and the client-side UI application 1118 may generate the payment request based on the input data and transmit the payment request to the server-side UI application 1120(1) of the first payment system 1104(1). In certain example embodiments, the server-side UI application 112)(1) may reformat the payment request received from the client-side UI application 1118. Alternatively, the client-side UI application 1118 may transmit the input data to the server-side UI application 1120(1), which may, in turn, generate the payment request. The payment request may then be received by the back-end payment processing platform(s) 1122(1) of the first payment system 1104(1) from the server-side UI application 1120(1).

The payment request may be a one-time payment request or a recurring payment request. A recurring payment request may establish a recurring payment model, based on which, a requisite number of individual payment instances may be generated. Each such payment instance may be processed equivalently to a one-time payment. A recurring payment request may specify a recurring payment amount, a payment date for the first payment instance, a periodicity with which recurring one-time payments corresponding to the recurring payment request are to be made, and optionally, a total number of payments to be made based on the recurring payment request or an end date for such payments. A one-time payment request may specify a payment amount and a desired payment date. The payment date may be a near-term date (e g, immediate/today, next day, or earliest available date) or some future specified date. The payment request may, in certain example embodiments, include additional user-specified payment processing parameters such as, for example, a payment transaction cost threshold or a payment transaction speed threshold, which may, in turn, impact the choice of payment network(s) used to execute the payment request.

At block 1204, the first payment system 1104(1) may determine whether the payee is a candidate for crediting via the second payment system 1104(2). For example, the first payment system 1104(1) may evaluate the payment request against one or more conditions to determine whether the first payment system 1104(1) can integrate with the second payment system 1104(2) to execute the payment. An example eligibility condition may be, for example, whether the payee identified in the payment request is registered as an electronic payee with the first payment system 1104(1). The condition may be satisfied if the payee is not registered as an electronic payee with the first payment system 1104(1). The payee may not be registered as electronic payee with the first payment system 1104(1) if, for example, the payee is not a known payee, a managed payee, or a registered payee with the first payment system 1104(1) or if the payee is a known payee, managed payee, or registered payee, but is not enabled for electronic payment.

Other example eligibility conditions that may be evaluated include, for example, whether the payee is likely a consumer, whether the first payment system 1104(1) stores at least one of an email address or a phone number for the payee; whether the payment amount specified in the payment request is less than a threshold amount; whether the payment date is at least a threshold period of time after a date of receipt of the payment request, and so forth. Any of these eligibility conditions may be deemed satisfied if an affirmative determination is made with respect to the eligibility condition. A payee may be determined to likely be a consumer based, for example, an evaluation of a name of the payee or a physical address of the payee or an evaluation of prior payments made to the payee.

At block 1206, the first payment system 1104(1) may generate an IDR query that contains one or more identifiers of the payee. For example, the IDR query may include a name of the payee and other identifying information of the payee or notification identifiers associated with the payee such as, for example, a social token, an email address, a phone number, a physical address, and so forth. The data included in the IDR query may be retrieved from the payment request and/or from the payment data repository 1124(1). At block 1208, the first payment system 1104(1) may transmit the IDR query to the data correlation/integration server system 1102, which may then be received by the coordination layer 1112 of the data correlation/integration server system 1102 at block 1210.

At block 1212, the data correlation/integration server system 1102 may determine, using the data contained in the IDR query, that the payee is registered with the second payment system 1104(2), or more specifically, that the payment data repository 1124(2) of the second payment system 1104(2) includes a source data record corresponding to the payee. For example, the data correlation/integration server system 1102 may utilize the payee-related data included in the IDR query to locate an integrated data record stored in the integrated data repository 1116 and may determine that the integrated data record is linked to a source data record stored in the payment data repository 1124(2) of the second payment system 1104(2). Alternatively, if the data correlation/integration server system 1102 is unable to locate an integrated data record based on the data contained in the IDR query or a located integrated data record is not linked to a source data record in the second payment system 1104(2), a matching process may be triggered that results in an integrated data record being generated, based at least in part on the data contained in the IDR query, that links to a source data record in the second payment system 1104(2) or a link being established between a located integrated data record and a source data record in the second payment system 1104(2).

At block 1214, the data correlation/integration server system 1102 may evaluate additional conditions (beyond whether the payee is registered with the second payment system 1104(2)) to determine whether the payee is eligible for crediting via the second payment system 1104(2). For example, the data correlation/integration server system 1102 may determine that the second payment system 1104(2) enables electronically crediting the payee without requiring the payee to indicate acceptance of the payment (e.g., that the payee is enrolled for automatic crediting with the second payment system 1104(2) without having to accept a payment following receipt of a notification). This determination may be made based on information included in a registration profile associated with the payee in the second payment system 1104(2). In particular, the information based on which the determination at block 1214 is made may be either populated in the integrated data record (previously copied into the integrated data record from a source data record stored in the payment data repository 1124(2) of the second payment system 1104(2)) or may be retrieved from the payment data repository 1124(2) at block 1214.

At block 1216, the data correlation/integration server system 1102 may generate a response to the IDR query. The response may include an indication that the payee is eligible for crediting via the second payment system 1104(2). The response may further include an identifier of the second payment system 1104(2), an identifier that identifies the payee with respect to the second payment system 1104(2), and potentially other information. The identifier that identifies the payee with respect to the second payment system 1104(2) may be, for example, a unique record identifier of a source data record associated with the payee in the second payment system 1104(2) or any data included therein such as, for example, a name of the payee, a social token of the payee, a notification identifier (e.g., an email address) of the payee, and so forth. At block 1218, the data correlation/integration server system 1102 may transmit the response to the IDR query to the first payment system 1104(1), which may be received by the first payment system 1104(1) at block 1220.

At block 1222, the first payment system 1104(1) may generate a credit instruction. The credit instruction may include information specified by the payment request such as, for example, a payment amount, a payment date, etc. If the payment request is a recurring payment request the credit instruction may include one or more of an indication of a periodicity of the individual payment instances of the recurring payment request, a term for the recurring payment request, and so forth. The credit instruction may further include an identifier of the payee based on which the payee is identifiable to the second payment system 1104(2). This payee identifier may have been obtained from the response to the IDR query. The credit instruction may further include a payor identifier based on which the payor is identifiable to the first payment system 1104(1), a payor identifier based on which the payor is identifiable to the second payment system 1104(2) (e.g., a billing account number of the payor with the payee), and so forth.

It should be appreciated that if the payment request is a recurring payment request, various attributes of the recurring payment request (e.g., the periodicity of the individual payment instances, a term for the recurring payment request, etc.) may not be communicated from the first payment system 1104(1) to the second payment system 1104(2). The first payment system 1104(1) may be responsible for generating the individual payment instances for fulfilling the recurring payment request, and thus, the first payment system 1104(1) may only communicate information pertaining to a debit or credit associated with a particular payment instance of the recurring payment request rather than attributes of the recurring payment request itself. Thus, the second payment system 1104(2) may not be aware that it is executing a credit or debit associated with a recurring payment request. It should further be appreciated that the credit instruction generated at block 1222 is distinct from a message sent from a payment system 1104 to a payment network to cause a credit to be performed.

If the payment request is a recurring payment request, example embodiments described herein may assume that both the first payment system 1104(1) and the second payment system 1104(2) are capable of supporting recurring payments with the same periodicity. In certain example embodiments, the first payment system 1104(1) and the second payment system 1104(2) may exchange information, potentially via the data correlation/integration server system 1102, that indicates the recurring payment characteristics/parameters supported by each payment system such that only recurring payment requests that are associated with common characteristics/parameters are sent from the first payment system 1104(1) to the second payment system 1104(2) for execution.

At block 1224, the first payment system 1104(1) may transmit the credit instruction to the second payment system 1104(2), which may be received by the second payment system 1104(2) at block 1226. Referring now to FIG. 12B, at block 1228, the second payment system 1104(2) may direct a credit to a financial account of the payee in accordance with the received credit instruction and based on stored preferences associated with the payee (e.g., a preference regarding a financial account to be credited). The second payment system 1104(2) may initiate a credit to the payee in accordance with standard payment processing performed by the second payment system 1104(2), which may include, for example, notifying the payee of the impending credit. Initiating the credit to the payee may include issuing and mailing a paper payment instrument (e.g., a check), the deposit of which triggers a crediting of a payee's financial account; transmitting an electronic credit transaction to a financial institution or a payment network, which may cause a financial account of the payee to be credited by another entity; and so forth. If the payment is associated with a recurring payment request, the second payment system 1104(2) may establish a recurring credit in accordance with the specified periodicity and term. Example payment networks that may receive an electronic debit or credit transaction include, without limitation, an Automated Clearing House (ACH) network, such as that supported by the Federal Reserve or the Electronic Payments Network (EPN), a proprietary network of financial institutions, a real-time settlement network, a debit network, a credit network, or any other suitable payment network capable of facilitating and/or processing financial transactions between member financial institutions or between member financial institutions and non-member financial institutions.

At block 1230, the second payment system 1104(2) may store payment data in association with a registration profile of the payee with the second payment system 1104(2). The payment data may be stored in the payment data repository 1124(2) and may be stored in association with a source data record in the payment data repository 1124(2) that corresponds to the payee. The payment data may include payment details such as the payment amount, the payment date, and so forth. The payment data may further include an indication of the source system from which the credit instruction was received (e.g., the first payment system 1104(1)) and a payor identifier based on which the payor is identifiable to the first payment system 1104(1) to facilitate problem resolution or return processing with the payment, if necessary.

At block 1232, the second payment system 1104(2) may generate a response to the credit instruction, which may indicate successful crediting of the payee (even though the credit may only have been initiated at this point and not completed). At block 1234, the second payment system 1104(2) may transmit the response to the credit instruction to the first payment system 1104(1), which may be received by the first payment system 1104(1) at block 1236.

At block 1238, the first payment system 1104(1) may direct a debit from a financial account of the payor in accordance with the payment request and stored preferences associated with the payor (e.g., a payor preference indicating a financial account to debit). In certain example embodiments, the amount of the debit may be increased by a transaction cost for the payment or to account for risk associated with the payment.

In the example scenario of FIGS. 12A-12B in which interaction with the payee is not required to credit the payee, the first payment system 1104(1) may direct the debit from the financial account of the payor prior to generating and transmitting the credit instruction since success of initiating the credit is guaranteed. However, in other example scenarios in which interaction with the payee is required to credit the payee, it may not be desirable to direct a debit of a financial account of the payor prior to receiving an indication of successful initiation of the credit to the payee. In general, however, a debit and a credit associated with a payment request may be initiated/executed in any order. As noted above, it may be desirable to initiate a debit prior to initiating a credit if interaction with the payee is required to successfully initiate the credit. Further, a debit may need to be initiated prior to a credit if initiation of the credit depends on the type of risk mitigation processing being performed (e.g., good-funds processing as opposed to risk analysis). It should be appreciated that in certain example embodiments, it may be possible to initiate a credit prior to successful completion of a debit, while in other example embodiments, serialization may be required as successful completion of the debit may be necessary before the credit can be initiated.

In addition, while the example scenario of FIGS. 12A-12B and other example payment scenarios described herein assume direct communication between payment systems 1104 (e.g., communication of a credit instruction from the first payment system 1104(1) to the second payment system 1104(2)), such communication may, in fact, occur through the data correlation/integration server system 1102. For example, the credit instruction transmitted by the first payment system 1104(1) at block 1224 may, in fact, be transmitted to the data correlation/integration server system 1102, and one or more of the engines 1114 of the data correlation/integration server system 1102 (e.g., one or more of the other engine(s) 120) may be leveraged to cause the credit instruction to be transmitted to the second payment system 1104(2). Similarly, the second payment system 1104(2) may leverage the data correlation/integration server system 1102 to transmit a response to the credit instruction to the first payment system 1104(1). For example, the engines 1114 may include a money movement engine (which may be one of the other engines(s) 120) that may support functionality for communicating debit/credit instructions and responses thereto between payment systems 1104. In this manner, different payment systems 1104 may not need to be aware of one another and may not directly communicate, but instead, may communicate via the data correlation/integration server system 1102.

At block 1240, the first payment system 1104(1) may store payment data in association with a registration profile of the payor with the first payment system 1104(1). The payment data may be stored in the payment data repository 1124(1) and may be stored in association with a source data record in the payment data repository 1124(1) that corresponds to the payor. The payment data may include payment details such as the payment amount, the payment date, and so forth associated with the payment request. The payment data may further include an indication of the target system to which the credit instruction was sent (e.g., the second payment system 1104(2)) and a payee identifier based on which the payee is identifiable to the second payment system 1104(2) to facilitate problem resolution or return processing with the payment, if necessary. In addition, in certain example embodiments, an indication of the second payment system 1104(2) and a payee identifier may be stored in association with a payee entry for the payee in a payee list of the payor maintained by the first payment system 1104(1). This information may then be used in connection with a future payment request to the payee to confirm that the payee is still registered with second payment system 1104(2) and continues to be eligible for crediting by the second payment system 1104(2) in connection with a payment request received by the first payment system 1104(1).

The example payment scenario depicted in FIGS. 12A-12B (as well as other example payment scenarios discussed herein) involve the first payment system 1104(1) leveraging the data correlation/integration server system 1102 to determine whether a payee can be credited by the second payment system 1104(2) in an improved manner. However, example embodiments described herein are also applicable to scenarios according to which the first payment system 1104(1) may leverage the data correlation/integration server system 1102 to determine whether a payor can be debited by the second payment system 1104(2) in an improved manner. While the payor is assumed to be registered with the first payment system 1104(1), and thus, the first payment system 1104(1) stores information identifying one or more financial accounts of the payor that can be debited as well as information indicating one or more mechanisms for debiting the payor, the second payment system 1104(2) may enable alternative or improved mechanisms for debiting the payor. For example, the second payment system 1104(2) may provide a good-funds mechanism for confirming that a financial account of the payor has sufficient funds to cover the debit, while the first payment system 1104(1) may not enable such a mechanism. As another example, the second payment system 1104(2) may enable a faster and/or more cost-effective debiting mechanism than the first payment system 1104(1). As yet another example, the second payment system 1104(2) may permit a different financial account of the payor to be debited that may offer more advantageous risk, speed, or cost characteristics than a financial account that the first payment system 1104(1) may debit.

Figure 13A:
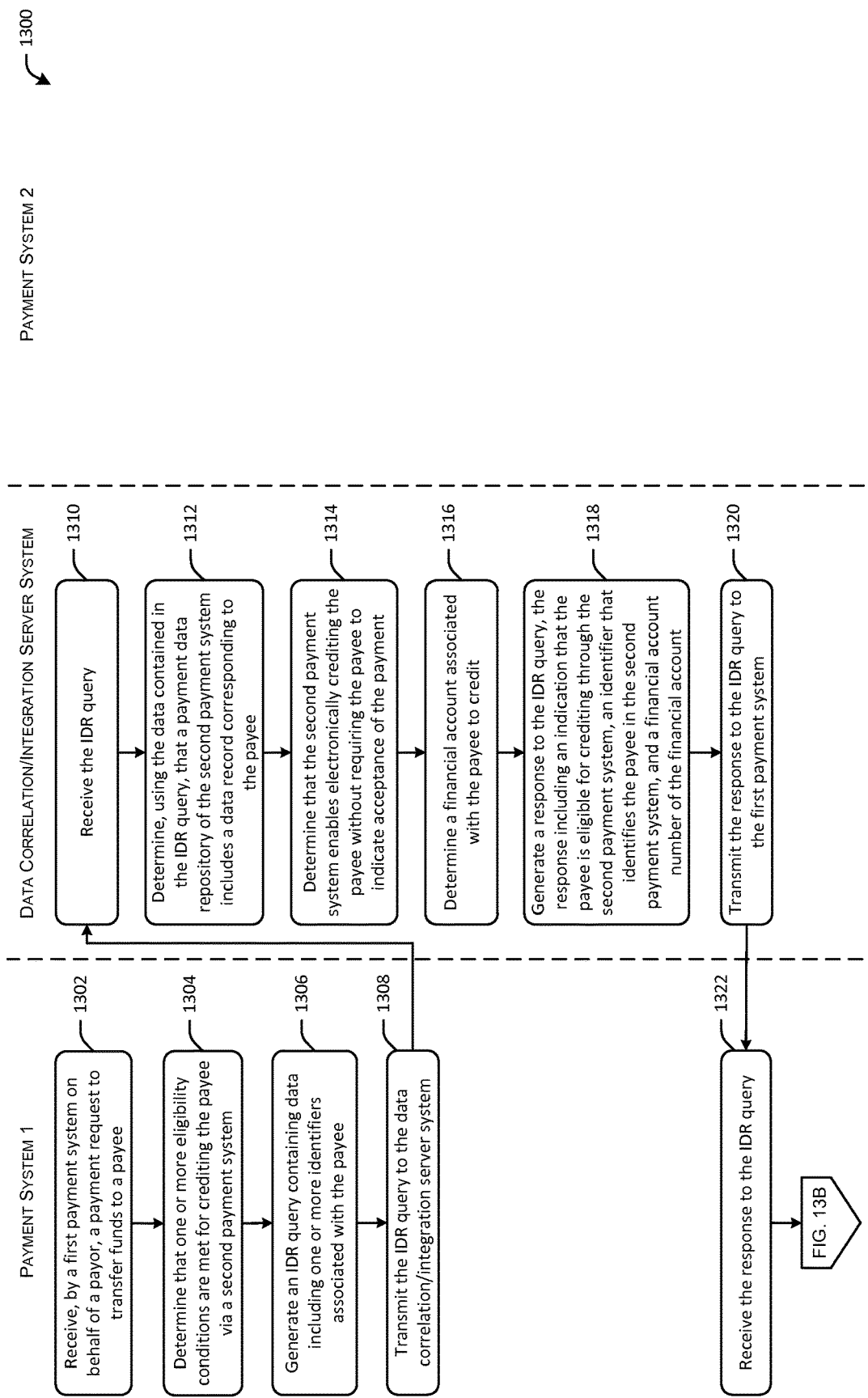
FIGS. 13A-13B are sequence diagrams illustrating a first payment system crediting a payee using information about the payee known to a second payment system and made available to the first payment system by a data correlation/integration server system in accordance with one or more example embodiments of the disclosure.
Figure 13B:
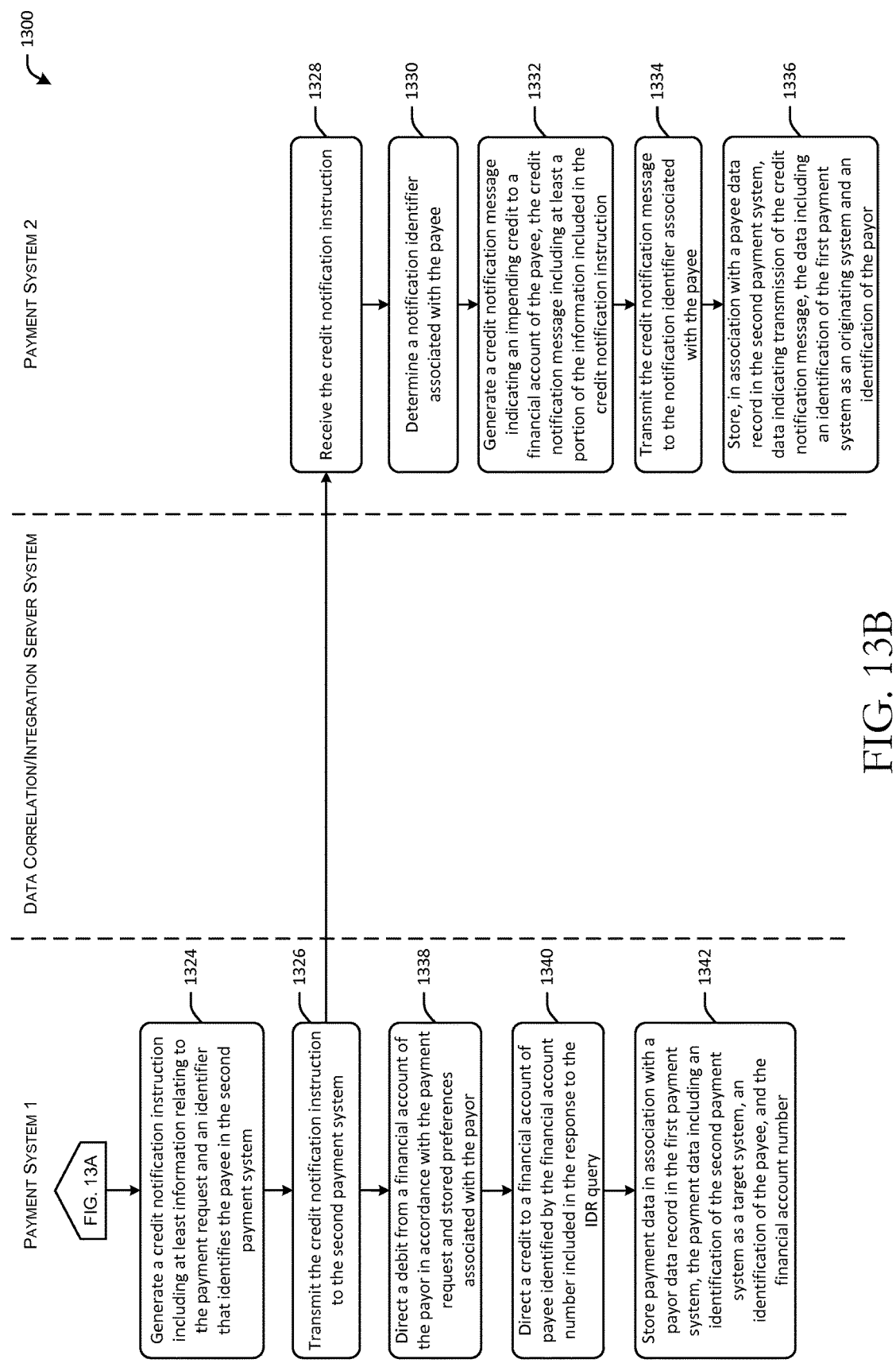

FIGS. 13A-13B are sequence diagrams illustrating the first payment system 1104(1) crediting a payee using information about the payee known to the second payment system 1104(2) and made available to the first payment system 1104(1) by the data correlation/integration server system 1102 in accordance with one or more example embodiments of the disclosure.

Referring first to FIG. 13A, at block 1302, the first payment system 1104(1) may receive a payment request to transfer funds to a payee. For example, a payor may utilize a UI application associated with the first payment system 1104(1) to submit the payment request. More specifically, a payor may provide input data to a client-side component of the UI application (e.g., the client-side UI application 1118) executing on a user device 1106, and the client-side UI application 1118 may generate the payment request based on the input data and transmit the payment request to the server-side UI application 1120(1) of the first payment system 1104(1). Alternatively, the client-side UI application 1118 may transmit the input data to the server-side UI application 1120(1), which may, in turn, generate the payment request. The payment request may be a one-time payment request or a recurring payment request and may include any of the information described in reference to block 1202 of FIG. 12A.

At block 1304, the first payment system 1104(1) may determine whether the payee is a candidate for crediting via the second payment system 1104(2). For example, the first payment system 1104(1) may evaluate the payment request against one or more conditions to determine whether the first payment system 1104(1) can integrate with the second payment system 1104(2) to execute the payment. Any of the example eligibility conditions described in reference to block 1204 of FIG. 12A may be evaluated.

At block 1306, the first payment system 1104(1) may generate an IDR query that contains one or more identifiers of the payee. For example, the IDR query may include a name of the payee and other identifying information of the payee or notification identifiers associated with the payee such as, for example, a social token, an email address, a phone number, a physical address, and so forth. The data included in the IDR query may be retrieved from the payment request and/or from the payment data repository

1124(1). At block 1308, the first payment system 1104(1) may transmit the IDR query to the data correlation/integration server system 1102, which may then be received by the coordination layer 1112 of the data correlation/integration server system 1102 at block 1310.

At block 1312, the data correlation/integration server system 1102 may determine, using the data contained in the IDR query, that the payee is registered with the second payment system 1104(2), or more specifically, that the payment data repository 1124(2) of the second payment system 1104(2) includes a source data record corresponding to the payee. The data correlation/integration server system 1102 may make this determination as described in reference to block 1212 of FIG. 12A.

At block 1314, the data correlation/integration server system 1102 may evaluate additional conditions (beyond whether the payee is registered with the second payment system 1104(2)) to determine whether the payee is eligible for crediting via the second payment system 1104(2). For example, the data correlation/integration server system 1102 may determine that the second payment system 1104(2) enables electronically crediting the payee without requiring the payee to indicate acceptance of the payment, as described in reference to block 1214 of FIG. 12A.

At block 1316, the data correlation/integration server system 1102 may determine a financial account associated with the payee. The payee's financial account may be stored in an integrated data record that is linked to a source data record corresponding to the payee and stored in the payment data repository 1124(2) of the second payment system 1104(2). Alternatively, the data correlation/integration server system 1102 may request the payee's financial account from the second payment system 1104(2). The data correlation/integration server system 1102 may determine that the financial account of the payee is eligible for use based on user preferences associated with the payee that may be populated in the integrated data record. Alternatively, the data correlation/integration server system 1102 may receive an indication from the second payment system 1104(2) as to whether the financial account is eligible for use.

At block 1318, the data correlation/integration server system 1102 may generate a response to the IDR query. The response may include an indication that the payee is eligible for crediting via the second payment system 1104(2). The response may further include an identifier of the second payment system 1104(2), an identifier that identifies the payee with respect to the second payment system 1104(2), the payee's financial account, and potentially additional information. The identifier that identifies the payee with respect to the second payment system 1104(2) may be, for example, a unique record identifier of a source data record associated with the payee in the second payment system 1104(2) or any data included therein such as, for example, a name of the payee, a social token of the payee, a notification identifier (e.g., an email address) of the payee, and so forth. At block 1320, the data correlation/integration server system 1102 may transmit the response to the IDR query to the first payment system 1104(1), which may be received by the first payment system 1104(1) at block 1322.

Referring now to FIG. 13B, at block 1324, the first payment system 1104(1) may generate a credit notification instruction to instruct the second payment system 1104(2) to notify the payee of the impending credit. The credit notification instruction may include information specified by the payment request such as, for example, a payment amount, a payment date, etc. If the payment request is a recurring payment request the credit notification instruction may optionally include one or more of an indication of a periodicity of the individual payment instances of the recurring payment request, a term for the recurring payment request, and so forth. The credit notification instruction may further include an identifier of the payee based on which the payee is identifiable to the second payment system 1104(2). This payee identifier may have been obtained from the response to the IDR query. The credit notification instruction may further include a payor identifier by which the payor is identifiable to the first payment system 1104(1); a payor identifier by which the payor is identifiable to the second payment system 1104(2) (e.g., a billing account number of the payor with the payee); a social token or other public identifier associated with the payor; and so forth. Even though the first payment system 1104(1) will be performing the credit, the payee is nonetheless registered with the second payment system 1104(2), and thus, it may be more efficient for the second payment system 1104(2) to notify the payee of the impending credit. For example, the second payment system 1104(2) may have previously confirmed a notification identifier of the payee during registration of the payee.

At block 1326, the first payment system 1104(1) may transmit the credit notification instruction to the second payment system 1104(2), which may be received by the second payment system 1104(2) at block 1328. At block 1330, the second payment system 1104(2) may determine a notification identifier associated with the payee. The second payment system 1104(2) may utilize the payee identifier included in the received credit notification instruction to determine the notification identifier. For example, the second payment system 1104(2) may utilize the payee identifier to locate a source data record stored in the payment data repository 1124(2) and may retrieve the notification identifier from the source data record. The notification identifier may be, for example, an email address, a mobile phone number, or the like.

At block 1332, the second payment system 1104(2) may generate a credit notification message indicating an impending credit to a financial account of the payee. The credit notification message may include at least a portion of the information included in the credit notification instruction such as, for example, a payment amount, a payment date, an identification of the payor, etc. The format/structure of the credit notification message may depend on the notification identifier determined at block 1330. For example, if the notification identifier is an email address, the credit notification message may be an email message. At block 1334, the second payment system 1104(2) may transmit the credit notification message to the notification identifier associated with the payee.

In other example embodiments, the second payment system 1104(2) may leverage a notification service (e.g., an engine of the engines 1114 of the data correlation/integration server system 1102) to transmit the credit notification message, and perhaps, generate the credit notification message. In addition, in yet other example embodiments, the first payment system 1104(1) may leverage such a notification service in lieu of transmitting a credit notification instruction to the second payment system 1104(2).

At block 1336, the second payment system 1104(2) may store data indicating transmission of the credit notification message. The data may be stored in the payment data repository 124(2) in association with, for example, a source data record associated with the payee. The data may include an indication of the source system that is performing the credit and from which the credit notification instruction was received (e.g., the first payment system 1104(1)); an indication of the system that is performing the debit (e.g., the first payment system 1104(1)); and payor identifier based on which the payor is identifiable to the first payment system 1104(1) to facilitate problem resolution or return processing with the payment, if necessary.

At block 1338, the first payment system 1104(1) may direct a debit from a financial account of the payor in accordance with the payment request and stored preferences associated with the payor (e.g., a payor preference indicating a financial account to debit). In certain example embodiments, the amount of the debit may be increased by a transaction cost for the payment or to account for risk associated with the payment. At block 1340, the first payment system 1104(1) may direct a credit to a financial account of the payee. The financial account of the payee may be determined from the response to the IDR query received from the data correlation/integration server system 1102.

At block 1342, the first payment system 1104(1) may store payment data in association with a registration profile of the payor with the first payment system 1104(1). The payment data may be stored in the payment data repository 1124(1) and may be stored in association with a source data record in the payment data repository 1124(1) that corresponds to the payor. The payment data may include payment details such as the payment amount, the payment date, and so forth. The payment data may further include an indication of the target system to which the credit notification instruction was sent (e.g., the second payment system 1104(2)), a payee identifier based on which the payee is identifiable to the second payment system 1104(2), and/or the financial account of the payee to facilitate problem resolution or return processing with the payment, if necessary.

Figure 14A:
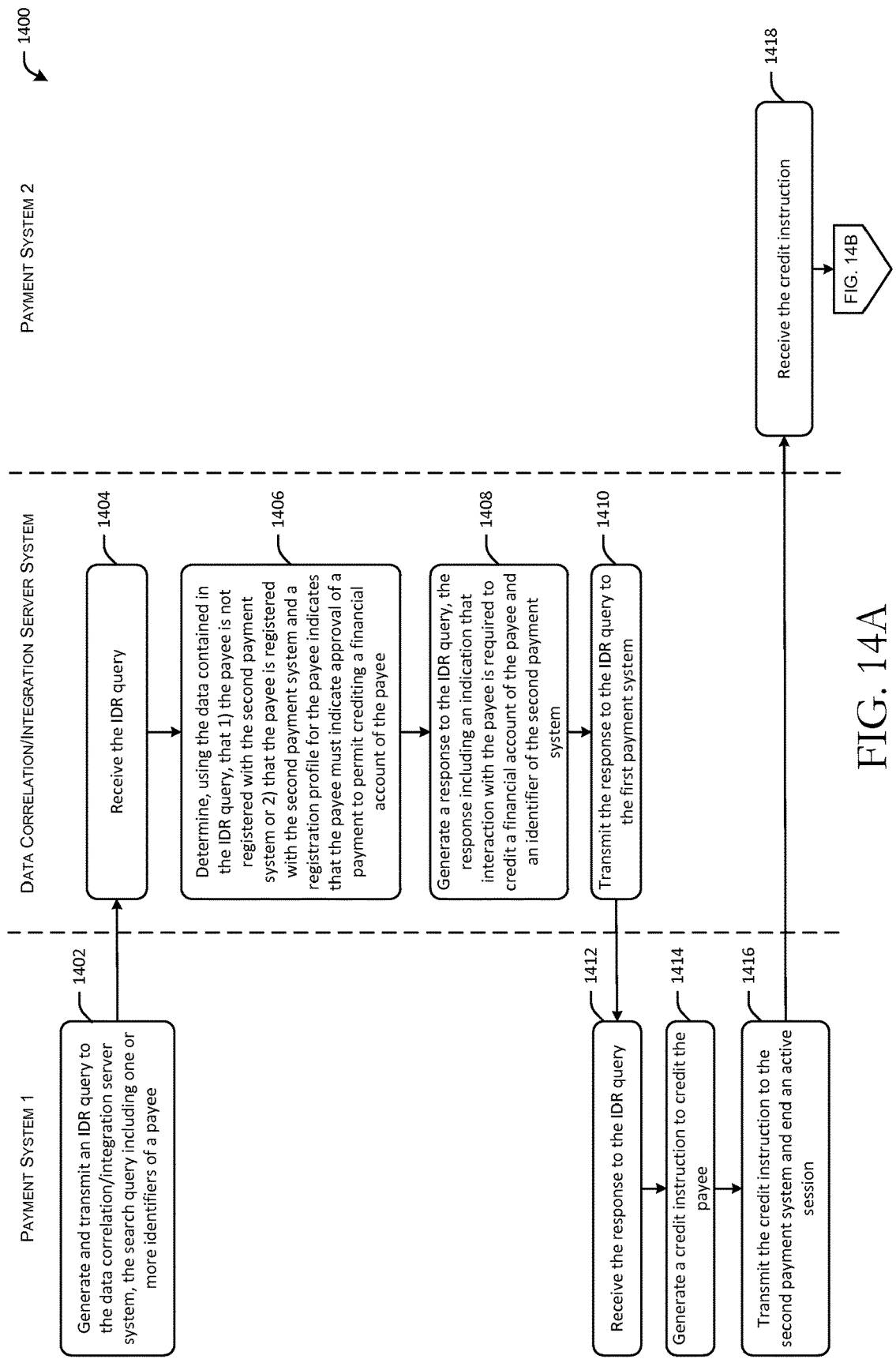
FIGS. 14A-14B are sequence diagrams illustrating a first payment system leveraging information from a data correlation/integration server system to credit a payee via a second payment system subsequent to required interaction with the payee in accordance with one or more example embodiments of the disclosure.
Figure 14B:
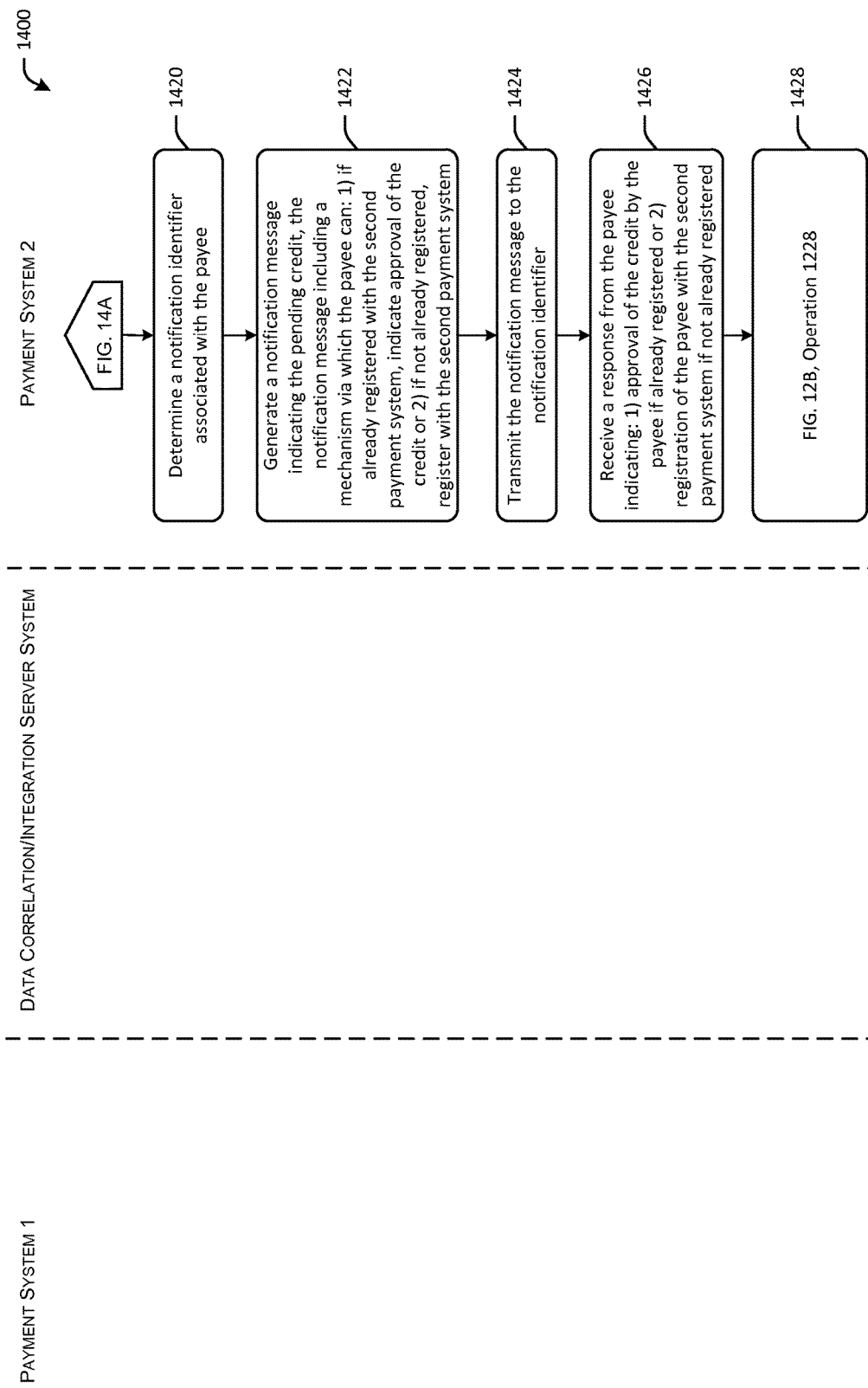

FIGS. 14A-14B are sequence diagrams illustrating the first payment system 1104(1) leveraging information from the data correlation/integration server system 1102 to credit a payee via the second payment system 1104(2) subsequent to required interaction with the payee in accordance with one or more example embodiments of the disclosure. FIGS. 14A-14B assume that the first payment system 1104(1) has received a payment request to pay a payee on behalf of a payor and that the payee has been determined to be a candidate for crediting via the second payment system 1104(2). That is, FIGS. 14A-14B assume that operations similar to those of blocks 1202 and 1204 of FIG. 12A have been performed.

At block 1402, the first payment system 1104(1) may generate and transmit to the data correlation/integration server system 1102 an IDR query that contains one or more identifiers of the payee. For example, the IDR query may include a name of the payee and other identifying information of the payee or notification identifiers associated with the payee such as, for example, a social token, an email address, a phone number, a physical address, and so forth. The data included in the IDR query may be retrieved from the payment request and/or from the payment data repository 1124(1). The coordination layer 1112 of the data correlation/integration server system 1102 may receive the IDR query at block 1404.

At block 1406, the data correlation/integration server system 1102 may determine, using the data contained in the IDR query, that 1) the payee is not registered with the second payment system 1104(2) (e.g., an integrated data record (either pre-existing or dynamically generated based on receipt of the IDR query) corresponding to the payee is not linked to a source data record in the second payment system 1104(2)), or 2) that the payee is registered with the second payment system 1104(2) (e.g., the integrated data record is linked to a source data record in the second payment system 1104(2)), but a registration profile associated with the payee in the second payment system 1104(2) indicates that the payee must provide approval of a payment prior to initiating a credit to a financial account of the payee.

At block 1408, the data correlation/integration server system 1102 may generate a response to the IDR query. The response may include an indication that interaction with the payee is required to credit a financial account of the payee via the second payment system 1104(2). The response may further include an identifier of the second payment system 1104(2), an identifier that identifies the payee with respect to the second payment system 1104(2), and potentially additional information. The identifier that identifies the payee with respect to the second payment system 1104(2) may be, for example, a unique record identifier of a source data record associated with the payee in the second payment system 1104(2) or any data included therein such as, for example, a name of the payee, a social token of the payee, a notification identifier (e.g., an email address) of the payee, and so forth. At block 1410, the data correlation/integration server system 1102 may transmit the response to the IDR query to the first payment system 1104(1), which may be received by the first payment system 1104(1) at block 1412.

While not depicted in FIGS. 14A-14B, the data correlation/integration server system 1102 may return a financial account identifier of a financial account of the payee to the first payment system 1104(1) in response to the IDR query, thereby enabling the first payment system 1104(1) to initiate the credit. However, the second payment system 1104(2) may nonetheless be leveraged to generate and transmit the credit notification message to the payee, and since in the example payment scenario depicted in FIGS. 14A-14B, interaction with the payee is required, the first payment system 1104(1) may initiate the credit only after receiving an indication that the interaction between the second payment system 1104(2) and the payee was successful. Further, in certain example embodiments, the first payment system 1104(1) and/or the second payment system 1104(2) may leverage a notification service to accomplish notification to the payee, as described earlier.

At block 1414, the first payment system 1104(1) may generate a credit instruction. The credit instruction may include information specified by the payment request such as, for example, a payment amount, a payment date, etc. If the payment request is a recurring payment request the credit instruction may include one or more of an indication of a periodicity of the individual payment instances of the recurring payment request, a term for the recurring payment request, and so forth. The credit instruction may further include an identifier of the payee based on which the payee is identifiable to the second payment system 1104(2). This payee identifier may have been obtained from the response to the IDR query. The credit instruction may further include a payor identifier based on which the payor is identifiable to the first payment system 1104(1), a payor identifier based on which the payor is identifiable to the second payment system 1104(2) (e.g., a billing account number of the payor with the payee), and so forth.

At block 1416, the first payment system 1104(1) may transmit the credit instruction to the second payment system 1104(2), which may be received by the second payment system 1104(2) at block 1418. At this point, an asynchronous break may occur whereby processing by the first payment system 1104(1) may end (e.g., an active session may not be maintained to await a response from the second payment system 1104(2)). In particular, the variable amount of time that may pass between when the second payment system 1104(2) notifies the payee of the credit and when the payee indicates acceptance of the credit may result in an asynchronous break in the processing performed by the first payment system 1104(1).

Referring now to FIG. 14B, at block 1420, the second payment system 1104(2) may determine a notification identifier associated with the payee. If the payee is registered with the second payment system 1104(2), the second payment system 1104(2) may locate a payee source data record based on a payee identifier included in the received credit instruction and may determine the preferred notification identifier from the payee source data record. If the payee is not registered with the second payment system 1104(2), the second payment system 1104(2) may utilize a notification identifier provided by the first payment system 1104(1) (which may not have been confirmed). If the first payment system 1104(1) provides multiple notification identifiers, the second payment system 1104(2) may select a particular notification based on a prioritization. For example, the second payment system 1104(2) may utilize historical data indicating which types of notification identifiers are most successful in establishing contact with a payee to determine which of multiple notification identifiers to select.

At block 1422, the second payment system 1104(2) may generate a credit notification message indicating a pending credit to the payee. The content of the credit notification message may depend on whether the payee is registered in the second payment system 1104(2). If the payee is not registered, the credit notification message may include an invitation to register as well as a notification of the pending credit. If the payee is registered, the credit notification message may include an invitation to accept the pending credit. The type of credit notification message generated may depend on the notification identifier determined at block 1420. The credit notification message may be an email message, a Short Message Service (SMS) message, or some other message format associated with the notification identifier. The credit notification message may include a mechanism (e.g., selectable uniform resource locator (URL) link) via which the payee can perform an appropriate response function. For example, if the payee is a registered payee with the second payment system 1104(2), the mechanism may enable the payee to indicate acceptance of the credit. If, on the other hand, the payee is not registered with the second payment system 1104(2), the mechanism may enable the payee to register with the second payment system 1104(2). In certain example embodiments, registration of the unregistered payee with the second payment system 1104(2) via the mechanism enabled by the credit notification message may constitute implicit approval of the credit.

At block 1424, the second payment system 1104(2) may transmit the credit notification message to the notification identifier associated with the payee. As previously noted, in certain other example embodiments, the second payment system 1104(2) (or the first payment system 1104(1)) may leverage a notification service to transmit the credit notification message, and perhaps, generate the credit notification message. At this point, an asynchronous break may occur whereby processing by the second payment system 1104(2) may end (e.g., an active session may not be maintained to await a response from the payee). In particular, the variable amount of time that may pass between when the second payment system 1104(2) transmits the credit notification message to the notification identifier associated with the payee and when the payee indicates acceptance of the credit (via an explicit indication of acceptance by a registered payee or via registration of an unregistered payee) may result in an asynchronous break in the processing performed by the second payment system 1104(1).

At block 1426, the second payment system 1104(2) may receive a response from the payee that indicates either approval of the credit or registration of the payee with the second payment system 1104(2). For example, the payee may utilize the mechanism provided in the credit notification message (e.g., may select a link in the credit notification message) to either indicate approval of the credit if the payee is already registered or register with the second payment system 1104(2) if not already registered. Processing may then continue with the operation at block 1228 of FIG. 12B. In those other example embodiments in which the first payment system 1104(1) initiates the debit and the credit, a credit notification instruction (instead of a credit instruction) may be transmitted to the second payment system 1104(2) at block 1418. Accordingly, after receiving the response from the payee at block 1426, the second payment system 1104(2) may generate a response to the credit notification instruction and transmit the response to the first payment system 1104(1). If payee registration occurred in response to the notification message transmitted to the notification identifier of the payee, the response to the credit notification instruction may include one or more identifiers associated with the newly registered payee, such as an identifier by which the payee is known to the second payment system or a financial account identifier of a financial account of the payee. Receiving a financial account identifier of a financial account of the payee may enable the first payment system 1104(1) to initiate the credit to the financial account of the payee itself. Processing may then continue with block 1336 of FIG. 13B. Further, in certain example embodiments, a new integrated data record corresponding to the newly registered payee may be generated and stored in the integrated data repository 1116.

Figure 15A:
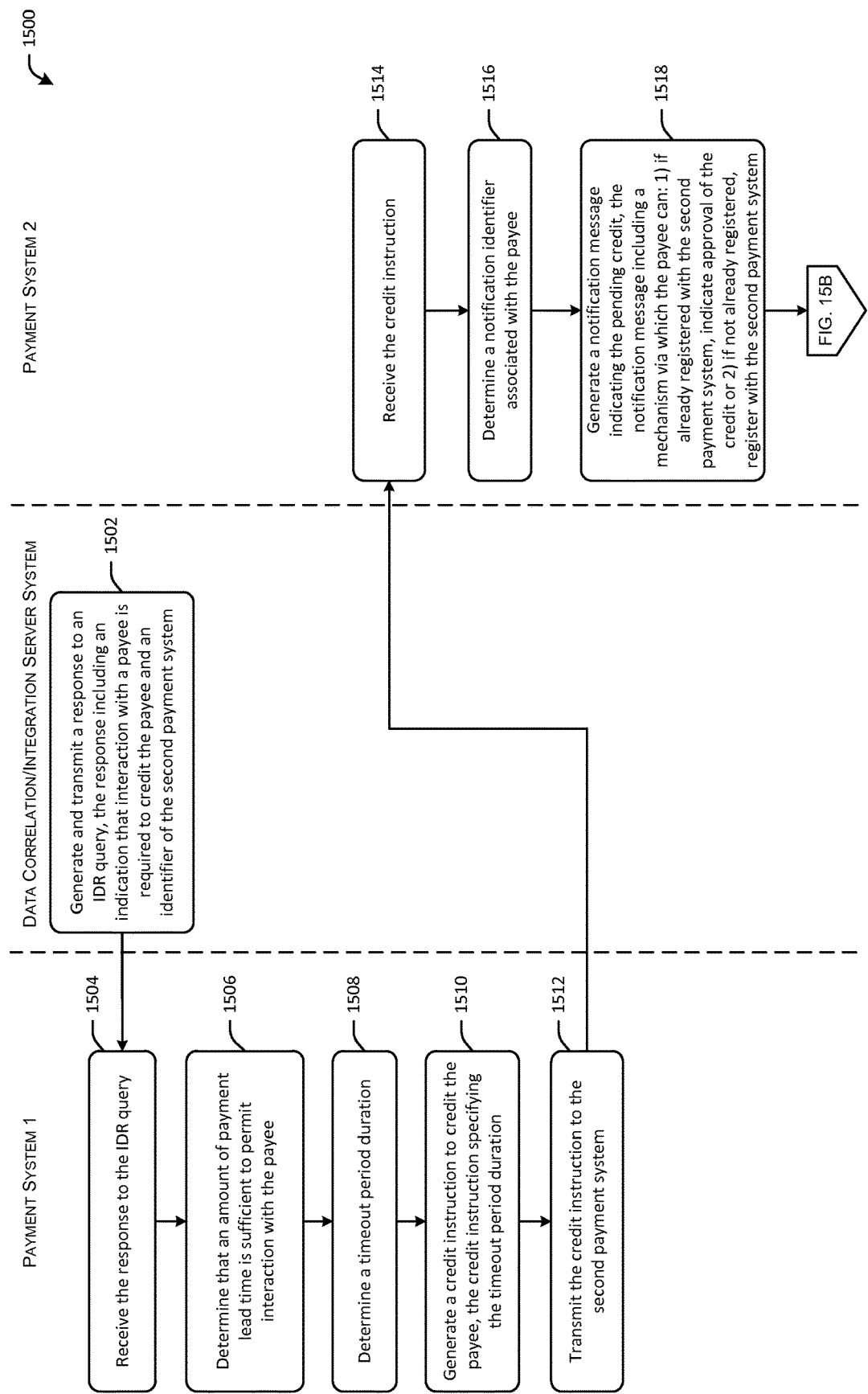
FIGS. 15A-15B are sequence diagrams illustrating a first payment system leveraging information from a data correlation/integration server system to initiate a credit to a payee via a second payment system, establishing a timeout period for interaction with the payee, and subsequently handling the credit itself in response to a cancellation of the credit upon expiration of the timeout period in accordance with one or more example embodiments of the disclosure.
Figure 15B:
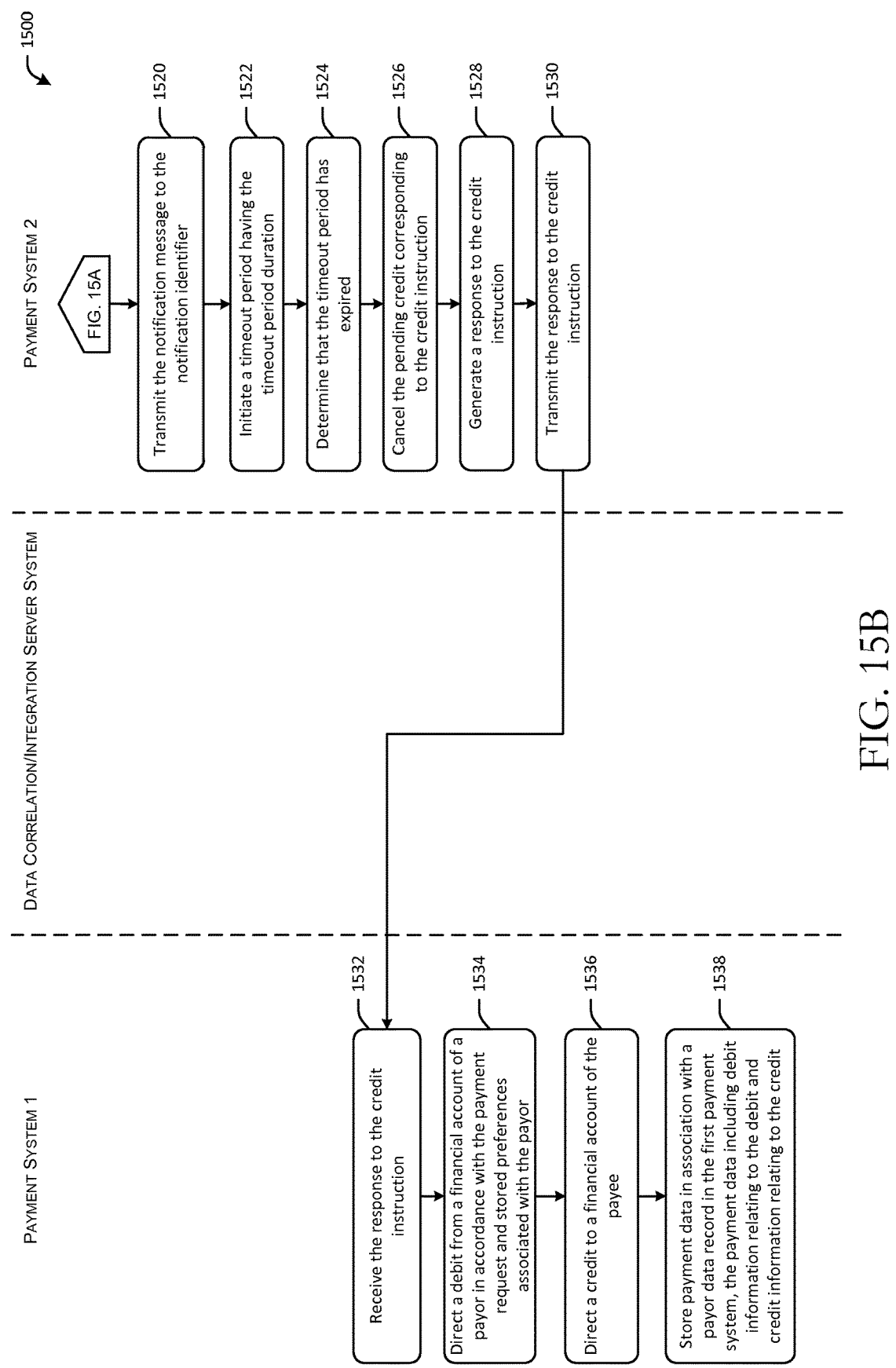

FIGS. 15A-15B are sequence diagrams illustrating the first payment system 1104(1) leveraging information from the data correlation/integration server system 1102 to initiate a credit to a payee via the second payment system 1104(2), establishing a timeout period for interaction with the payee, and subsequently handling the credit itself in response to a cancellation of the credit upon expiration of the timeout period in accordance with one or more example embodiments of the disclosure. The payment scenario depicted in FIGS. 15A-15B assumes that the first payment system 1104(1) has received a payment request to make a payment to a payee on behalf of a payor and has generated and transmitted to the data correlation/integration server system 1102 an IDR query containing one or more identifiers of the payee, as described in relation to earlier payment scenarios. The payment scenario depicted in FIGS. 15A-15B further assumes that the data correlation/integration server system 1102 has determined, using the data contained in the IDR query, that interaction with the payee is required to credit the payee, as described in relation to the payment scenario depicted in FIGS. 14A-14B.

At block 1502, the data correlation/integration server system 1102 may generate and transmit a response to the IDR query. The response may include an indication that interaction with the payee is required to credit the payee via the second payment system 1104(2). The response may further include an identifier of the second payment system 1104(2), an identifier that identifies the payee with respect to the second payment system 1104(2), and potentially additional information. The identifier that identifies the payee with respect to the second payment system 1104(2) may be, for example, a unique record identifier of a source data record associated with the payee in the second payment system 1104(2) or any data included therein such as, for example, a name of the payee, a social token of the payee, a notification identifier (e.g., an email address) of the payee, and so forth.

At block 1504, the first payment system 1104(1) may receive the response to the IDR query from the data correlation/integration server system 1102. At block 1506, the first payment system 1104(1) may determine that an amount of payment lead time is sufficient to permit interaction with the payee. The determination at block 1506 may be based on a comparison of 1) a minimum amount of time (e.g., a minimum number of days) that is deemed reasonable for a timeout period to await a response from the payee to 2) an amount of lead time (e.g., a number of days) from receipt of the payment request until the latest date that a credit can be initiated to the payee while still ensuring completion of the credit by the payment date specified in the payment request. In determining the amount of lead time, the slowest payment mechanism available may be assumed (e.g., paper instrument delivery). In the case of a paper instrument payment, a payee-specific delivery time may be used that takes into account a geographic location of the payee and/or historical paper instrument payments to a physical address associated with the payee, or more generally, historical paper instrument payments to a geographic region that includes the physical address associated with the payee. The first payment system 1104(1) may determine that the amount of payment lead time is sufficient to permit interaction with the payee if, for example, the payment lead time is at least as long as a minimum response timeout period duration that is considered reasonable.

Assuming that the first payment system 1104(1) determines that the amount of payment lead time is sufficient to enable interaction with the payee, the first payment system 1104(1) may determine the timeout period duration, at block 1508. The timeout period duration may be the lesser of 1) a maximum duration (e.g., a maximum number of days) that is considered reasonable for the timeout response period or 2) an amount of lead time (e.g., a number of days) from receipt of the payment request until the latest date that a credit can be initiated to the payee while still ensuring completion of the credit by the payment date specified in the payment request, assuming the slowest payment delivery mechanism. The timeout period duration may be calculated and expressed in days or any other suitable unit of time (e.g., hours).

As will be described in more detail hereinafter, the timeout period may be implemented in the payment system that transmits a credit notification message to the payee and awaits a response from the payee (e.g., in the payment scenario of FIGS. 15A-15B this is the second payment system 1104(2)) in order to ensure that a pending credit is not pending indefinitely. If the timeout period expires and the payee has not responded successfully, the pending credit may be cancelled. The target system (e.g., the second payment system 1104(2)) may notify the source system (e.g., the first payment system 1104(1)) of the cancellation of the pending credit, and the source payment system may initiate the credit to the payee.

At block 1510, the first payment system 1104(1) may generate a credit instruction that includes an indication of the timeout period duration. The credit instruction may further include information specified by the payment request such as, for example, a payment amount, a payment date, etc. If the payment request is a recurring payment request the credit instruction may include one or more of an indication of a periodicity of the individual payment instances of the recurring payment request, a term for the recurring payment request, and so forth. The credit instruction may additionally include an identifier of the payee based on which the payee is identifiable to the second payment system 1104(2). This payee identifier may have been obtained from the response to the IDR query. The credit instruction may further include a payor identifier based on which the payor is identifiable to the first payment system 1104(1), a payor identifier based on which the payor is identifiable to the second payment system 1104(2) (e.g., a billing account number of the payor with the payee), and so forth.

At block 1512, the first payment system 1104(1) may transmit the credit instruction to the second payment system 1104(2), which may be received by the second payment system 1104(2) at block 1514. At this point, an asynchronous break may occur whereby processing by the first payment system 1104(1) may end (e.g., an active session may not be maintained to await a response from the second payment system 1104(2)). In particular, the variable amount of time that may pass between when the second payment system 1104(2) notifies the payee of the credit and when the timeout period expires without receiving a successful response from the payee may result in an asynchronous break in the processing performing by the first payment system 1104(1).

At block 1516, the second payment system 1104(2) may determine a notification identifier associated with the payee. If the payee is registered with the second payment system 1104(2), the second payment system 1104(2) may locate a payee source data record based on a payee identifier included in the received credit instruction and may determine the preferred notification identifier from the payee source data record. If the payee is not registered with the second payment system 1104(2), the second payment system 1104(2) may utilize a notification identifier provided by the first payment system 1104(1) (which may not have been confirmed). If the first payment system 1104(1) provides multiple notification identifiers, the second payment system 1104(2) may select a particular notification based on a prioritization. For example, as described earlier, the second payment system 1104(2) may utilize historical data indicating which types of notification identifiers are most successful in establishing contact with a payee to determine which of multiple notification identifiers to select.

At block 1518, the second payment system 1104(2) may generate a credit notification message indicating a pending credit to the payee. The type of credit notification message generated may depend on the notification identifier determined at block 1516. The content of the credit notification message may depend on whether the payee is registered in the second payment system 1104(2). If the payee is not registered, the credit notification message may include an invitation to register as well as a notification of the pending credit. If the payee is registered, the credit notification message may include an invitation to accept the pending credit. The credit notification message may be an email message, an SMS message, or some other message format associated with the notification identifier. The credit notification message may include a mechanism (e.g., a selectable uniform resource locator (URL) link) via which the payee can perform an appropriate response function. For example, if the payee is a registered payee with the second payment system 1104(2), the mechanism may enable the payee to indicate acceptance of the credit. If, on the other hand, the payee is not registered with the second payment system 1104(2), the mechanism may enable the payee to register with the second payment system 1104(2). In certain example embodiments, registration of the unregistered payee with the second payment system 1104(2) via the mechanism enabled by the credit notification message may constitute implicit approval of the credit.

Referring now to FIG. 15B, at block 1520, the second payment system 1104(2) may transmit the credit notification message to the notification identifier associated with the payee. At block 1522, the second payment system 1104(2) may initiate a timeout period having the duration specified in the credit instruction received from the first payment system 1104(1). At this point, an asynchronous break may occur whereby processing by the second payment system 1104(2) may end (e.g., an active session may not be maintained to await a response from the payee). In particular, the variable amount of time that may pass between when the second payment system 1104(2) transmits the credit notification message to the notification identifier associated with the payee and when the payee may respond may result in an asynchronous break in the processing performing by the second payment system 1104(1).

Initiation of a timeout period may include storing a timeout value (e.g., an expiration date or date/timestamp) in the payment data repository 1124(2) in association with the pending payment (e.g., credit). If transmission of the notification message successfully results in payee registration or acceptance of the payment, an indicator associated with the pending payment (e.g., credit) and the timeout value may be set to indicate that this has occurred. The second payment system 1104(2) may evaluate all pending payments (e.g., credits) having associated timeout values asynchronously on a periodic batch basis. The frequency of evaluation may vary based on a desired period of time for payment processing to be initiated after a successful payee response to the notification message or expiration of the timeout period. The frequency of evaluation may occur on, for example, a daily basis. The evaluation process may be initiated by a scheduling tool/utility/mechanism for triggering asynchronous (e.g., batch) processes on a periodic basis. Such a scheduling tool/utility/mechanism may be provided by the underlying operating system (O/S) or may be obtained from a software vendor.

As part of this evaluation process, the second payment system 1104(2) may evaluate each pending payment (e.g., credit) that has an associated timeout value. If the indicator indicating successful payee response has been set, the timeout value may be cleared and subsequent payment processing can be triggered. If the indicator has not yet been set but the timeout period has not yet expired, the evaluation process may trigger a reminder notification to the payee depending on the point in the timeout interval the batch processing is occurring. For example, reminder notifications may be sent every third day until two days before the timeout period expiration date. If the timeout period has expired, the timeout value may be cleared and timeout expiration processing may be triggered.

At block 1524, the second payment system 1104(2) may determine that the timeout period has expired as described above. The payment scenario depicted in FIGS. 15A-15B assumes that the timeout period expires without having received a successful response from the payee (e.g., either acceptance of the credit by a registered payee or registration of a previously unregistered payee). If, on the other hand, the payee successfully responds, the timeout period may be canceled as described above, and the processing beginning with the operation of block 1228 of FIG. 12B may occur (or the alternate processing described above in relation to the payment scenario depicted in FIGS. 14A-14B in which the first payment system 1104(1) performs the debit and the credit).

At block 1526, the second payment system 1104(2) may cancel the pending credit. In certain example embodiments, the second payment system 1104(2) may not store any data in the payment data repository 1124(2) indicative of the attempted but canceled pending credit. In other example embodiments, if the payee is a registered with the second payment system 1104(2), the second payment system 1104(2) may store an indication that the payee was notified of a pending credit but failed to accept the payment prior to expiration of a timeout period. This indication may be stored as part of a registration profile of the payee with the second payment system 1104(2) (e.g., in association with a source data record associated with the payee and stored in the payment data repository 1124(2)).

At block 1528, the second payment system 1104(2) may generate a response to the credit instruction, which may indicate unsuccessful crediting of the payee. At block 1530, the second payment system 1104(2) may transmit the response to the credit instruction to the first payment system 1104(1), which may be received by the first payment system 1104(1) at block 1532.

At block 1534, the first payment system 1104(1) may direct a debit from a financial account of the payor in accordance with the payment request and stored preferences associated with the payor (e.g., a payor preference indicating a financial account to debit). In certain example embodiments, the amount of the debit may be increased by a transaction cost for the payment or to account for risk associated with the payment.

At block 1536, the first payment system 1104(1) may direct a credit to a financial account of the payee in accordance with the received payment request. In this payment scenario, the first payment system 1104(1) is not able to leverage any information relating to the payee that is available to the second payment system 1104(2) or the payment capabilities of the second payment system 1104(2), and thus, may select the best payment method available to it (e.g., a paper instrument payment) to credit the payee. In certain example embodiments, the first payment system 1104(1) may determine that the debit should be performed via a bank draft based on risk processing. In such example embodiments, in the payment scenario of FIGS. 15A-15B, the draft may be made payable directly to the payee. In this manner, the first payment system 1104(1) may handle both the debit and the credit via the bank draft. In other payment scenarios previously described, if the debit is handled via a bank draft, the draft would be made payable to a service provider associated with the first payment system 1104(1) because the credit would be handled independently by the second payment system 1104(2)) or electronically by the first payment system 1104(1).

At block 1538, the first payment system 1104(1) may store payment data in association with a registration profile of the payor with the first payment system 1104(1). The payment data may be stored in the payment data repository 1124(1) and may be stored in association with a source data record in the payment data repository 1124(1) that corresponds to the payor. The payment data may include payment details such as the payment amount, the payment date, and so forth. The payment data may further include information associated with the crediting (e.g., the payment method used, the date initiated, etc.) and information associated with the debiting.

Figure 16:
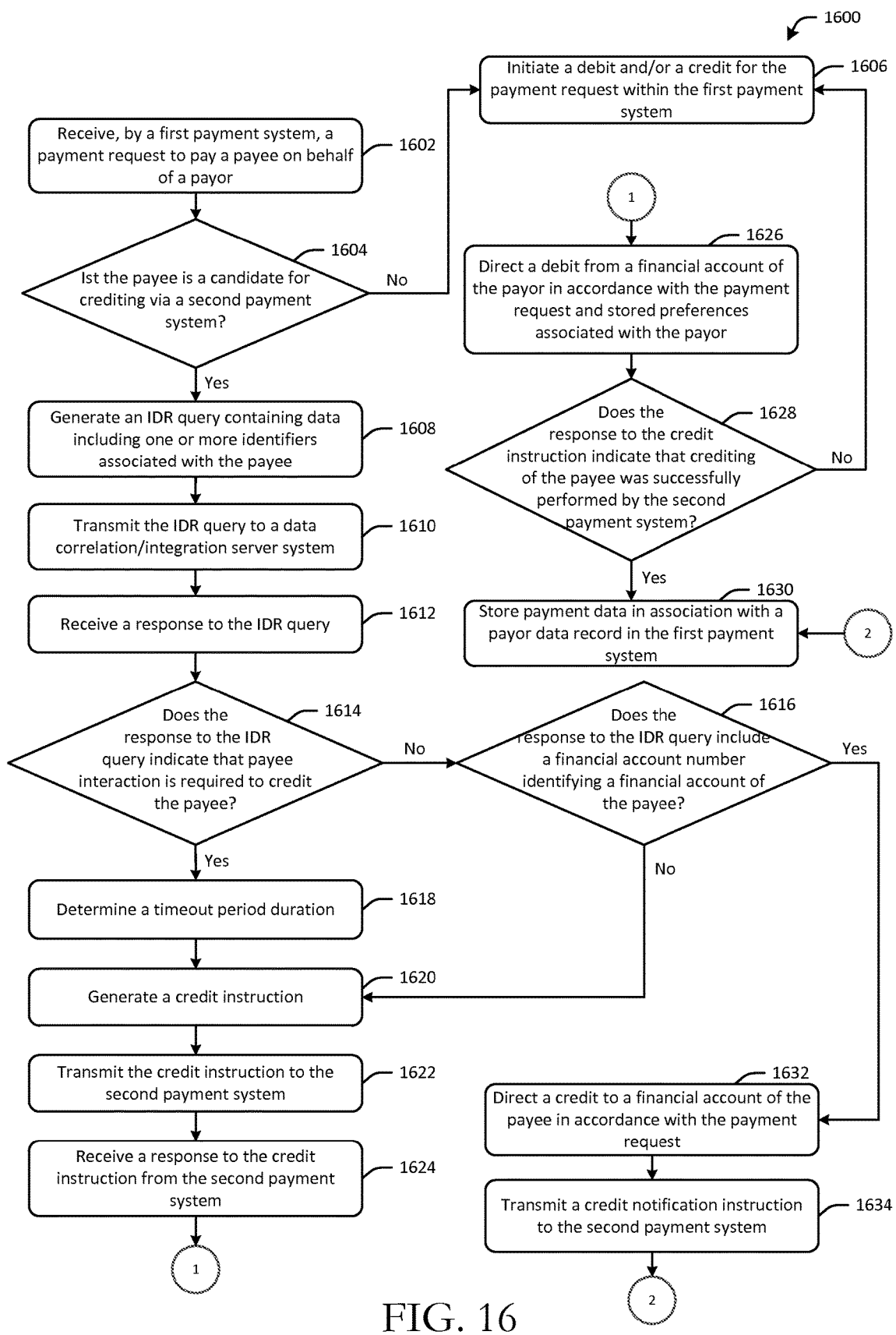
FIG. 16 is a process flow diagram of an illustrative method according to which a first payment system determines whether a payee specified in a received payment request is a candidate for crediting via a second payment system, obtains information from a data correlation/integration server system to enable integration with the second payment system, and performs payment-related processing to enable fulfillment of the payment request in accordance with one or more example embodiments of the disclosure.

FIG. 16 is a process flow diagram of an illustrative method 1600 according to which the first payment system 1104(1) determines whether a payee specified in a received payment request is a candidate for crediting via the second payment system 1104(2), obtains information from the data correlation/integration server system 1102 to enable integration with the second payment system 1104(2), and performs payment-related processing to enable fulfillment of the payment request in accordance with one or more example embodiments of the disclosure.

At block 1602, the first payment system 1104(1) may receive a payment request to pay a payee on behalf of a payor. The payment request may be received either directly from the payor (if, for example, the first payment system 1104(1) hosts the UI application via which the payment request is submitted) or indirectly through another entity (if that other entity hosts the UI application). The payment request may include an identifier of the payee (e.g., a name of the payee, a nickname of the payee, etc.), a payment amount, and a payment date. In certain example embodiments, the payment request may further include additional payee-related information such as one or more social tokens of the payee (e.g., an email address, a social networking identifier, etc.), payee contact information (e.g., an email address, a phone number, a physical address), an indication of a payor's financial account to debit, an account number of the payor at the payee, an invoice number, and a periodicity and possibly term (e.g., number of payments or date of last payment) if the payment request is for a recurring payment. Some of this information may already be known to the first payment system 1104(1). For example, at least some of the payor-related information may be included in a registration profile of the payor with the first payment system 1104(1). Further, at least some of the payee-related information may be available to the first payment system 1104(1) as a result of a prior inclusion of the payee in a payee list for a payor. Accordingly, any information already known to the first payment system 1104(1) may not need to be submitted again with a particular payment request.

At block 1604, the first payment system 1104(1) may determine whether the payment request is a candidate for integration with the second payment system 1104(2). More specifically, the first payment system 1104(1) may determine whether the payee is a candidate for crediting via the second payment system 1104(2) or a candidate for crediting via the first payment system 1104(1) leveraging information known the second payment system 1104(2). One or more of the conditions that are evaluated to at block 1604 may be hardcoded. For example, a condition requiring that the payee is not an electronic payee in the first payment system 1104(1) may be a necessary condition for all payment scenarios, and thus, may be hardcoded. Other condition(s) may be capable of being modified, and thus, may be obtained as parameters, stored rules, or the like. The eligibility conditions may apply universally to the first payment system 1104(1) or may vary based on the financial institution/sponsor or other segment.

In response to a negative determination at block 1604, the method 1600 may proceed to block 1606, where the first payment system 1104(1) may initiate a debit from a financial account of the payor and a credit to a financial account of the payee in accordance with its standard payment processing. On the other hand, in response to a positive determination at block 1604, the method 1600 may proceed to block 1608.

At block 1608, the first payment system 1104(1) may generate an IDR query for determining whether the payee is eligible for crediting or notification through the second payment system 1104(2). The IDR query may include one or more identifiers of the payee. The IDR query may be formatted in a format capable of being interpreted by the data correlation/integration server system 1102. Formatting information for the IDR query may be hardcoded in the first payment system 1104(1) or obtained from some source (e.g., the payment data repository 1124(1) or some external source). At block 1610, the first payment system 1104(1) may transmit the IDR query to the data correlation/integration server system 1102. The first payment system 1104(1) may access network connectivity information that is hardcoded or obtained from some source (e.g., the payment data repository 124(1) or some external source) to establish a connection with the data correlation/integration server system 1102.

At block 1612, the first payment system 1104(1) may receive and parse a response to the IDR query from the data correlation/integration server system 1102. The first payment system 1104(1) may access hardcoded information or information obtained from some source (e.g., the payment data repository 124(1) or some external source) to interpret the response to the IDR query. The response to the IDR query may include various types of indications. For example, the response to the IDR query may include an indication that the payee is registered with the second payment system 1104(2) and is eligible for crediting through the second payment system 1104(2). In this scenario, the response may also include an identifier by which the payee is identifiable to the second payment system 1104(2), and possibly other information.

In an alternate scenario, the response to the IDR query may include an indication that the payee is registered with the second payment system 1104(2) and is eligible for notification through the second payment system 1104(2). In this scenario, the response to the IDR query may further include financial account information for the payee's financial account to be credited such as, for example, a routing number (RTN)/account number that identifies a demand deposit account, a personal account number (PAN) for a card account, or the like. In yet another alternate scenario, the response to the IDR query may include an indication that the payee is not registered with the second payment system 1104(2). In still another scenario, the response to the IDR query may include an indication as to whether interaction with the payee is required (e.g., registration or acceptance of payment) to credit the payee. The response to the IDR query may include one or more of the indications described above.

At block 1614, the first payment system 1104(1) may determine whether the response to IDR query includes an indication that interaction with the payee is required to credit the payee. For example, the first payment system 1104(1) may determine that the response to the IDR query indicates that the payee can be credited without requiring a notification or that the payee must be notified prior to being credited. The payee may need to be notified prior to being credited if the payee is registered with the second payment system 1104(2) and must indicate approval of the credit or if the payee is unknown to the second payment system 1104(2) and must be invited to register with the second payment system 1104(2). Further, in certain example embodiments, based on characteristics of the payment request (e.g., the payment amount) and risk mitigation parameters associated with the second payment system 1104(2), further interaction with the payee (if already registered with the second payment system 1104(2)) may be required to obtain additional information. This may take the form of a challenge/response interaction such as, for example, transmission of a message prompting for a one-time use password sent to a notification identifier associated with the payee (e.g., an email address, a phone number, etc.). This interaction may be controlled by the second payment system 1104(2), and the answers provided to the challenges may be received by the second payment system 1104(2). Crediting of the payee may then be scheduled or cancelled depending on the accuracy of the answers.

In response to a positive determination at block 1614 indicating that interaction with the payee is required to credit the payee, the method 1600 may proceed to block 1618 where the first payment system 1104(1) may determine a timeout period duration. The duration of the timeout period may be determined in accordance with the process described earlier. The first payment system 1104(1) may then generate a credit instruction at block 1620. The instruction format for the credit instruction may be hardcoded within the first payment system 1104(1) or may be obtained from some source (e.g., the payment data repository 1124(1) or some external source such as the data correlation/integration server system 1102). Since a positive determination was made at block 1614, the credit instruction may include an indication of the timeout period duration in addition to any of the other example data described earlier.

On the other hand, in response to a negative determination at block 1614, the first payment system 1104(1) may determine whether the response to the IDR query includes a financial account number identifying a financial account of the payee. In response to a negative determination at block 1616, the method may proceed to block 1620, where the first payment system 1104(1) may generate a credit instruction. Since, in this instance, a negative determination was made at block 1614 indicating that no interaction with the payee is required, a timeout period duration may not be determined, and thus, the credit instruction may not include an indication of a timeout period duration.

On the other hand, in response to a positive determination at block 1616, the first payment system 1104(2) may direct a credit to the financial account identified in the response to the IDR query in accordance with the received payment request at block 1632 and may transmit a credit notification instruction to the second payment system 1104(2) at block 1634 (or leverage a notification service) to instruct the second payment system 1104(2) to notify the payee of the impending credit. The first payment system 1104(1) may then store payment data for the payment in association with a payor data record stored in the payment data repository 1124(1) of the first payment system 1104(1) at block 1630.

Referring again to block 1620, after generation of the credit instruction, the first payment system 1104(1) may transmit the credit instruction to the second payment system 1104(2) at block 1622. Network connectivity information that enables the first payment system 1104(1) to identify a network address of the second payment system 1104(2) and communicate with the second payment system 1104(2) may be hardcoded within the first payment system 1104(1) or may be obtained from some source (e.g., the payment data repository 1124(1) or some external source such as the data correlation/integration server system 1102). If interaction with the payee is required, an asynchronous break may occur after the operation at block 1622.

At block 1624, the first payment system 1104(1) may receive a response to the credit instruction from the second payment system 1104(2). At block 1626, the first payment system 1104(1) may direct a debit of a financial account of the payor in accordance with the payment request and stored preferences associated with the payor. Any of a variety of alternative debiting mechanisms available to the first payment system 1104(1) may be used with the possible exception of a paper draft drawn on an account of the payor and payable directly to the payee due to the decoupling of the debiting and crediting. This may be resolved by either making the draft payable to the service provider of the first payment system 1104(1) or limiting the debit alternatives to electronic mechanisms that already credit the service provider.

At block 1628, the first payment system 1104(1) may determine whether the response to the credit instruction indicates that the payee was successfully credited by the second payment system 1104(2). In response to a positive determination at block 1628, the first payment system 1104(1) may store payment data in association with a payor source data record (e.g., a payor's registration profile) stored in the payment data repository 124(1). As described earlier, the payment data may include payment-related information (e.g., payment amount, payment date, etc.), an identification of the second payment system 1104(2), and identification of the payee, and so forth. On the other hand, in response to a negative determination at block 1630 indicating that the second payment system 1104(2) did not successfully initiate the credit the payee, the first payment system 1104(1) may initiate a credit to the payee in accordance with its standard payment processing at block 1606. This may be, for example, a paper instrument payment to the payee.

As described herein, a payment system (e.g., the first payment system 1104(1) or the second payment system 1104(2)) may perform or direct a debiting of a payor and/or a crediting of a payee. This may correspond to initiation of functionality that results in a financial account of the payor being debited and/or a financial account of the payee being credited. A payment system may perform initial debit processing and/or credit processing itself, but may at some point leverage another system, such as the Federal Reserve ACH system, Electronic Payment Network (EPN), a card processing system, or a bank system, to fully effectuate the debit and/or the credit. In other example embodiments, the payment system may leverage other processing, such as augmented functionality provided by one or more of the engines 1114 of the data correlation/integration server system 1102, to enable use of debit mechanisms and/or credit mechanisms it may not support directly.

In certain example embodiments, settlement may need to occur between the first payment system 1104(1) and the second payment system 1104(2). In particular, funds may need to be transferred from the first payment system 1104(1) to the second payment system 1104(2) to compensate for any crediting performed by the second payment system 1104(2). Further, funds may need to be transferred from the second payment system 1104(2) to the first payment system 1104(1) for any credits that have been returned. Settlement may occur through a net settlement mechanism, according to which settlement of potentially multiple transactions is performed in a consolidated (e.g., batch) manner once per some time period (e.g., a day). Settlement may be accomplished via ACH transactions, for example. In certain example embodiments, settlement may not be necessary if 1) the first payment system 1104(1) and the second payment system 1104(2) are owned/operated by the same entity and/or 2) the first payment system 1104(1) and the second payment system 1104(2) share a common service provider account (sometimes referred to as a "trust account" or "operating account").

Figure 17:
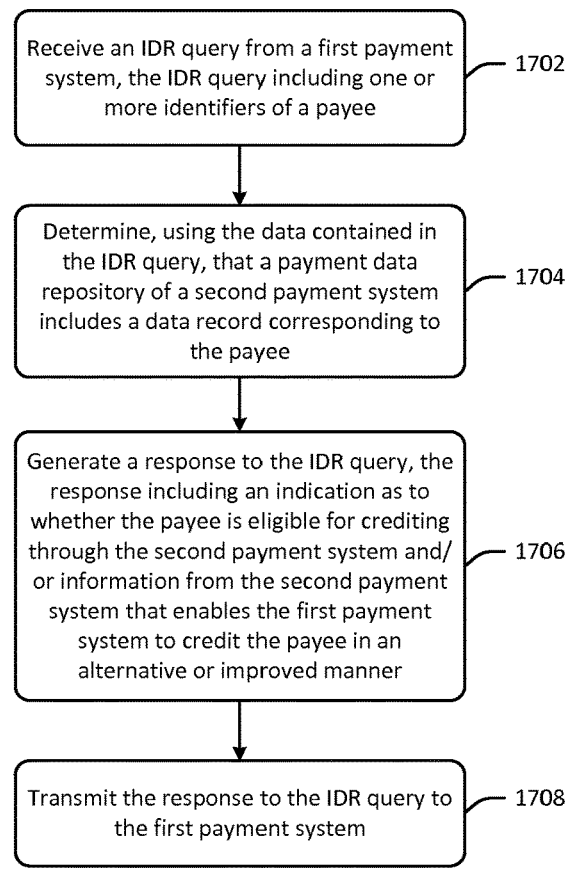
FIG. 17 is a process flow diagram of an illustrative method for receiving and responding to an integrated data record query that includes one or more identifiers of a payee in accordance with one or more example embodiments of the disclosure.

FIG. 17 is a process flow diagram of an illustrative method 1700 for receiving and responding to an IDR query that includes one or more identifiers of a payee in accordance with one or more example embodiments of the disclosure.

At block 1702, the data correlation/integration server system 1102 may receive an IDR query from the first payment system 1104(1). The IDR query may include one or more identifiers of a payee. At block 1704, the data correlation/integration server system 1102 may determine, using the data contained in the IDR query, whether the payment data repository 1124(2) of the second payment system 1104(2) includes a source data record corresponding to the payee.

More specifically, at block 1704, the data correlation/integration server system 1102 may determine that the integrated data repository 1116 stores an integrated data record that is linked to a source data record associated with the payee and stored in a payment data repository 1124(2) of the second payment system 1104(2). The integrated data record may have been generated prior to receipt of the IDR query using one or more of the processes described earlier in reference to FIGS. 1A-10. Alternatively, in response to receipt of the IDR query at block 1702, the data correlation/integration server system 1102 may determine, at block 1704, that the integrated data repository 1116 does not store an integrated data record associated with the payee, which may then trigger one or more of the processes described in reference to FIGS. 1A-10 to generate the integrated data record.

At block 1706, the data correlation/integration server system 1102 may generate a response to the IDR query. The response may include an indication as to whether the payee is eligible for crediting through the second payment system 1104(2) and/or information stored in the payment data repository 1124(2) of the second payment system 1104(2) that enables the first payment system 1104(1) to credit the payee in an alternative or improved manner. At block 1708, the data correlation/integration server system 1102 may transmit the response to the IDR query to the first payment system 1104(1).

Figure 18A:
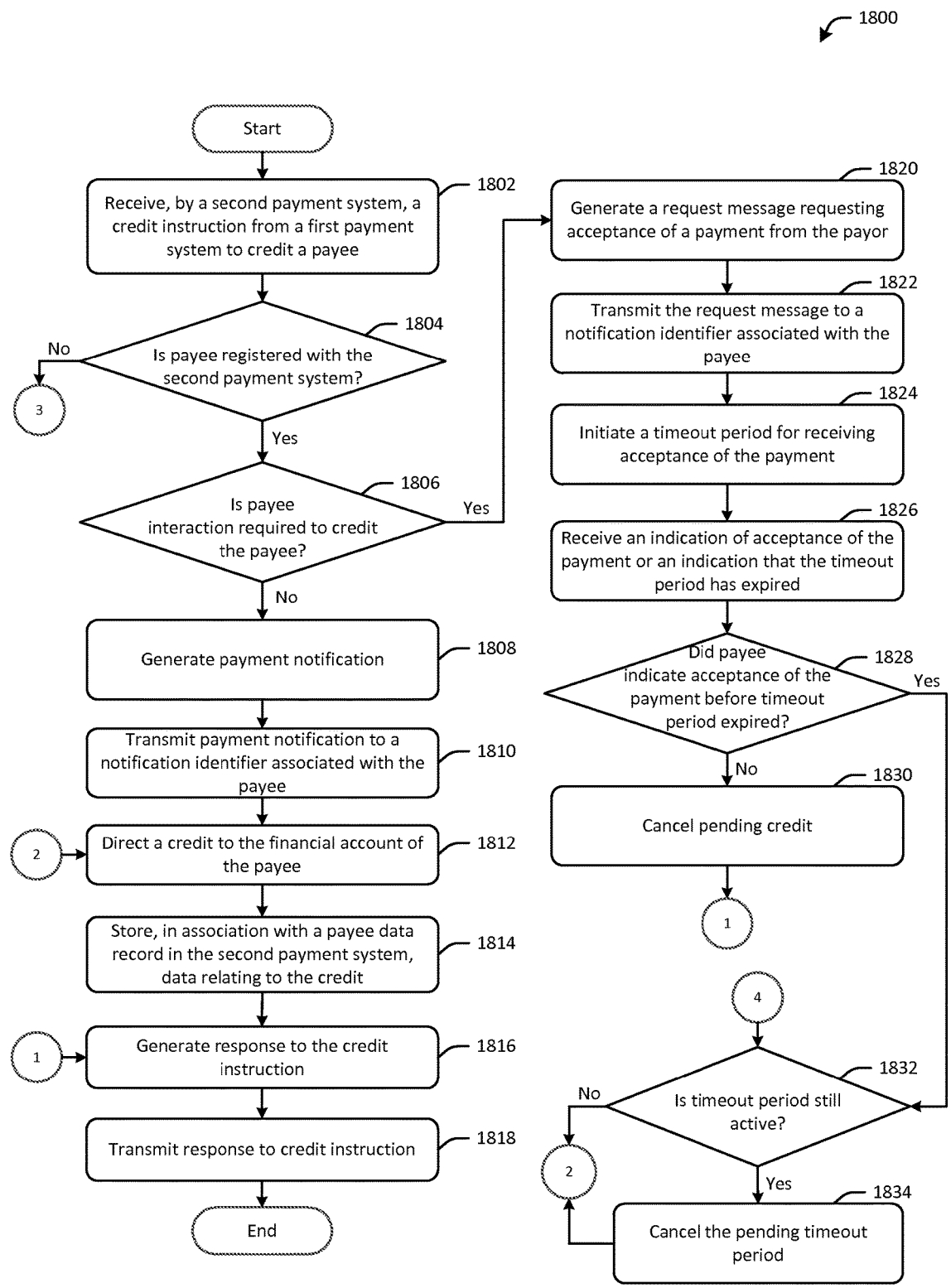
FIGS. 18A-18B are process flow diagrams of an illustrative method for performing, by a second payment system, payment-related processing in response to receipt of a credit instruction from a first payment system in accordance with one or more example embodiments of the disclosure.
Figure 18B:
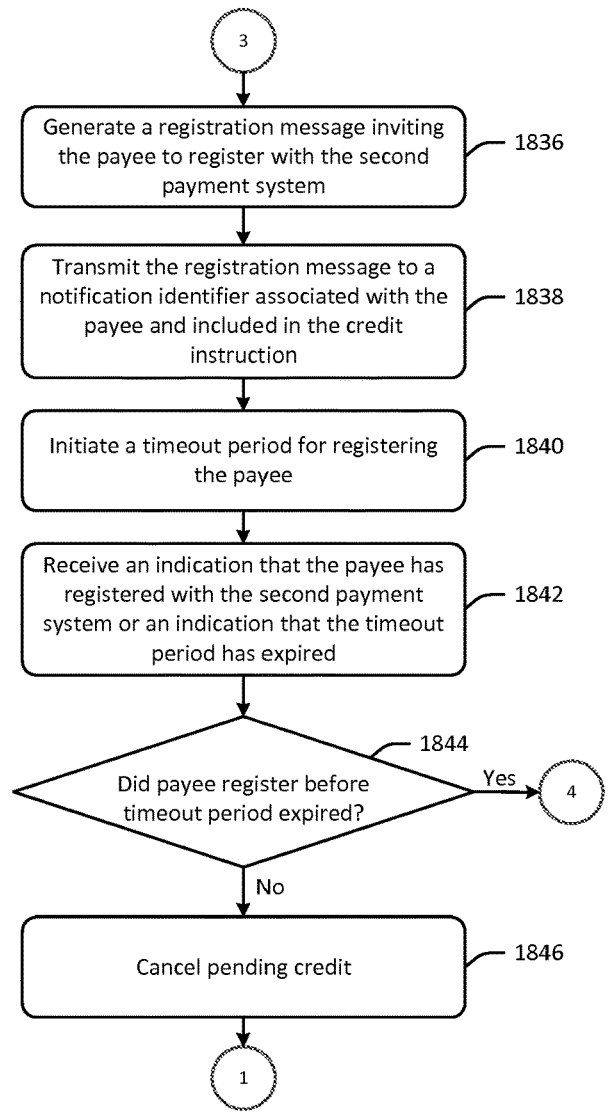

FIGS. 18A-18B are process flow diagrams of an illustrative method 1800 for performing, by the second payment system 1104(2), payment-related processing in response to receipt of a credit instruction from the first payment system 1104(1) in accordance with one or more example embodiments of the disclosure.

At block 1802, the second payment system 1104(2) may receive a credit instruction from a first payment system 1104(1) to credit a payee. The payee may or may not be registered with the second payment system 1104(2) at the time of receipt of the credit instruction. For ease of explanation, it is assumed that the second payment system 1104 (2) receives an instruction to direct crediting of the payee. However, as described earlier, in certain payment scenarios, such as those in which the first payment system 1104(1) directs crediting of the payee, the second payment system 1104(2) may instead receive a credit notification instruction from the first payment system 1104(1) instructing the second payment to simply notify the payee of the impending credit.

The credit instruction received by the second payment system 1104(2) may include information from the payment request, information included in a response to an IDR query transmitted from the first payment system 1104(1) to the data correlation/integration server system 1102, and/or other calculated/determined information (e.g., a timeout period duration). More specifically, the credit instruction may include one or more of the following: an identifier of the payee based on which the payee is identifiable to the second payment system 1104(2); one or more notification identifiers that may be used to contact the payee to present an invitation to register and a notice of pending payment (if the payee is not already registered with the second payment system 1104(2)); an identifier of the payor based on which the payor is identifiable to the first payment system 1104(1); other identifying information for the payor (e.g., identifying information by which the payee may know the payor) such as, for example, a payor name, an account number, one or more social tokens of the payor, one or more notification identifiers/contact information associated with the payor, etc.; a credit amount; a payment date; whether the payment is associated with a recurring payment request, and if so, a periodicity and term (e.g., a number of payments or date of last payment); a timeout period duration; and so forth.

At block 1804, the second payment system 1104(2) may determine whether the payee identified in the credit instruction is already registered within the second payment system 1104(2). In response to a negative determination at block 1804, the method 1800 may proceed to block 1836 of FIG. 18B, which will be described in more detail later in this disclosure. On the other hand, in response to a positive determination at block 1804, the method 1800 may proceed to block 1806, where the second payment system 1104(2) may determine whether payee interaction is required to credit the payee. In response to a negative determination at block 1806, the method 1800 may proceed to block 1808. A negative determination may be made at block 1806 if, for example, the registration profile for the payee indicates that auto-deposit has been activated. More specifically, the second payment system 1104(2) may determine whether an auto-deposit indicator (e.g., a binary flag) stored as part of or otherwise in association with a source data record of the payee has a Boolean value that indicates that the payee can be credited without payee interaction. If so, processing continues with step 1808. Otherwise, processing continues with step 1820.

At block 1808, the second payment system 1104(2) may generate a payment notification, and at block 1810, the second payment system 1104(2) may transmit the payment notification to a notification identifier associated with the payee. In certain example embodiments, the payment notification may be sent to the payee's preferred contact identifier for receiving such notifications (or, if the payee has not established a personal preference, a preference determined by the second payment system 1104(2)). The payment notification may be an email sent to an email address of the payee, an SMS message sent to a mobile phone number of the payee, or the like. The payment notification may include data from the received credit instruction and/or data stored as part of the payee's registration profile including, without limitation, an identification of the payor (e.g., a payor's name, an account number, one or more social tokens of the payor, a notification identifier/contact information for the payor, etc.); an identification of the credit amount; at least partial identification of the financial account to be credited; an identification of the payment date; and so forth. In certain example embodiments, the payment notification may further include a link to additional information relating to the payment if, for example, there are limits on the size of the notification.

At block 1812, the second payment system 1104(2) may direct a crediting of the payee in accordance with information included in the received credit instruction (e.g., the payment amount, the payment date, etc.) and information included in the registered payee's profile (e.g., a preferred financial account to receive deposits or other user preferences such as those discussed later in this disclosure in reference to FIG. 19). At block 1814, the second payment system 1104(2) may store payment data relating to the credit in association with, for example, a payee's source data record stored in the payment data repository 1124(2). At block 1816, the second payment system 1104(2) may generate a response to the credit instruction indicating whether or not the requested credit was successfully initiated. At block 1818, the second payment system 1104(2) may transmit the response to the credit instruction to the first payment system 1104(1).

Referring again to block 1806, in response to a positive determination indicating that payee interaction is required with the registered payee, the method 1800 may proceed to block 1820, where the second payment system 1104(2) may generate a request message requesting acceptance of the payment from the payor. At block 1822, the second payment system 1104(2) may transmit the request message to a notification identifier associated with the payee such as, for example, a payee's preferred contact identifier for receiving such notifications (or, if the payee has not established a personal preference, a preference determined by the second payment system 1104(2)). The request message may be an email sent to an email address of the payee, an SMS text message sent to a mobile phone number of the payee, or the like. The request message may include at least a portion of the information that would be included in the payment notification generated at block 1808. Further, the request message may include a request to accept the payment from the payor. Further, in certain example embodiments, the request message may include an indication of a timeout period duration defining an available response timeframe.

In addition, the request message may further include a mechanism via which the payee can indicate acceptance of the payment. For example, the request message may include a selectable link (e.g., uniform resource locator (URL)) that responsive to selection by the payee may direct a client-side UI application 1116 executing on a user device 1106 of the payee to a network resource that enables the payee to indicate acceptance of the payment. Alternatively, selection of the link itself may constitute an automatic indication of acceptance of the payment.

At block 1824, the second payment system 1104(2) may initiate a timeout period for receiving acceptance of the payment. The timeout period may be of a duration specified in the credit instruction. Alternatively, if no timeout period duration is specified in the credit instruction, the second payment system 1104(2) may determine the timeout period duration using internal rules/heuristics. At block 1826, the second payment system 1104(2) may receive an indication of acceptance of the payment by the payee or an indication that the timeout period has expired. At block 1828, the second payment system 1104(2) may determine whether the payee indicated acceptance of the payment prior to expiration of the timeout period. In response to a negative determination at block 1828, the second payment system 1104(2) may cancel the pending credit at block 1830, and the method 1800 may then proceed to block 1816, where the second payment system 1104(2) may generate a response to the credit instruction. In this instance, the response to the credit instruction may indicate that the credit was not successfully initiated, and the first payment system 1104(2) may initiate the credit to the payee.

On the other hand, in response to a positive determination at block 1828, the method 1800 may proceed to block 1832, where the second payment system 1104(2) may determine whether the timeout period is still active. In response to a positive determination at block 1832, the method 1800 may proceed to block 1834, where the second payment system 1104(2) may cancel the pending timeout period. From block 1834 or in response to a negative determination at block 1832, the method 1800 may proceed to block 1812.

Referring again to block 1804, in response to a negative determination at block 1804 indicating that the payee is not registered with the second payment system 1104(2), the method 1800 may proceed to block 1836. Referring now to FIG. 18B, the second payment system 1104(2) may generate a registration message at block 1836 inviting the payee to register with the second payment system 1104(2). At block 1838, the second payment system 1104(2) may transmit the registration message to a notification identifier (e.g., an email address or a mobile phone number) of the payee included in the credit instruction. The registration message may be an email sent to an email address of the payee, an SMS message sent to a mobile phone number of the payee, or the like. The registration message may include a mechanism via which the payee may complete a registration process. For example, the registration message may include a selectable link for initiating the registration process. The registration message may include at least a portion of the information that would be included in the payment notification generated at block 1808. Further, in certain example embodiments, the registration message may include an indication of a timeout period duration defining an available response timeframe.

At block 1840, the second payment system 1104(2) may initiate a timeout period for registering the payee. The timeout period may be of a duration specified in the credit instruction. Alternatively, if no timeout period duration is specified in the credit instruction, the second payment system 1104(2) may determine the timeout period duration using internal rules/heuristics. At block 1842, the second payment system 1104(2) may receive an indication that the payee has successfully registered with the second payment system 1104(2) or an indication that the timeout period has expired. At block 1844, the second payment system 1104(2) may determine whether the payee registered with the second payment system prior to expiration of the timeout period. In response to a negative determination at block 830, the second payment system 1104(2) may cancel the pending credit at block 1846, and the method 1800 may then proceed to block 1816, where the second payment system 1104(2) may generate a response to the credit instruction. In this instance, the response to the credit instruction may indicate that the credit was not successfully initiated, and the first payment system 1104(1) may initiate the credit to the payee. The response to the credit instruction may include information that would have been populated in an integrated data record and/or in a source data record stored in the payment data repository 1124(2) of the second payment system 1104(2) and linked to such an integrated data record if the payee has already been registered with the second payment system 1104(2). Such information may include, for example, an identifier of the payee based on which the payee is identifiable within the second payment system 1104(2), a financial account number of a financial account of the payee, or the like. On the other hand, in response to a positive determination at block 1844, the method 1800 may proceed to block 1832.

Figure 19:
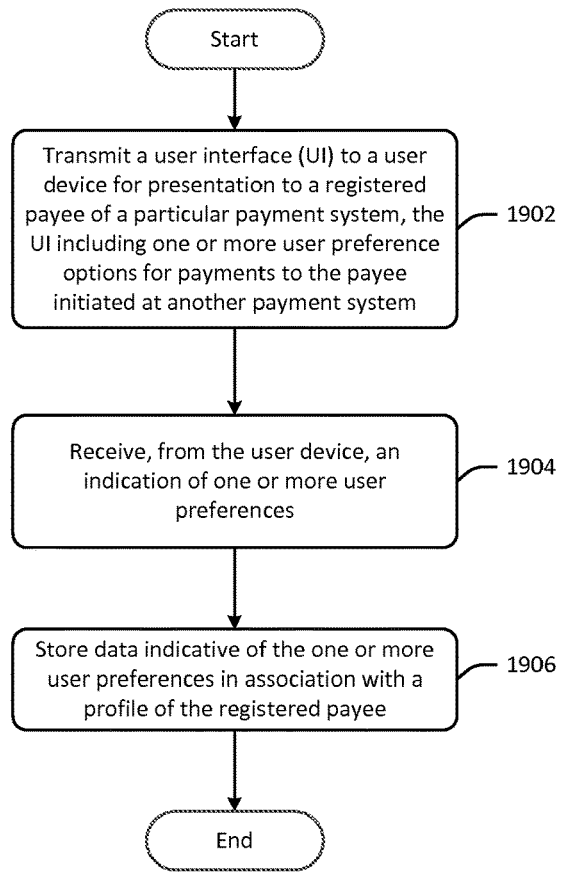
FIG. 19 is a process flow diagram of an illustrative method for receiving and storing user preferences associated with a registered payee of a particular payment system, where the user preferences relate to payments to the payee initiated at one or more other payment systems in accordance with one or more example embodiments of the disclosure.

FIG. 19 is a process flow diagram of an illustrative method 1900 for receiving and storing user preferences associated with a registered payee of a particular payment system where the user preferences relate to payments to the payee initiated at one or more other payment systems in accordance with one or more example embodiments of the disclosure.

At block 1902, the second payment system 1104(2), for example, may generate and transmit a UI to a user device 1106 for presentation to a registered payee of the second payment system 1104(2). More specifically, the server-side UI application 1120(2) may generate the UI and transmit the UI to a client-side UI application 1118 executing on the user device 1106. The UI may include options for selecting one or more user preferences to associate with a registration profile of the payee with the second payment system 1104 (2). The user preference(s) may relate to payments to the payee initiated at other payment systems and may include, for example, a preference indicating that deposits originating from one or more other payment systems are to be rejected; a preference indicating that payments originating from one or more other payment systems are to be deposited into a specific financial account or accounts; a preference that is specific to a particular payor or payor characteristic or a particular payment characteristic (e.g., payment amounts above a threshold); and so forth.

At block 1904, the second payment system 1104(2) may receive an indication of one or more user preferences specified by the payee. At block 1906, data indicative of the selected user preferences may be stored as part of or otherwise in association with the payee's registered profile. The user preference data may be stored in the payment data repository 124(2). The stored preference data may be used to determine payment or payee eligibility for payment integration, for source data record matching processing performed by the data correlation/integration server system 1102, for determining a proper mechanism for crediting the payee within the second payment system 1104(2) or by another payment system 1104, and so forth.

Figure 20:
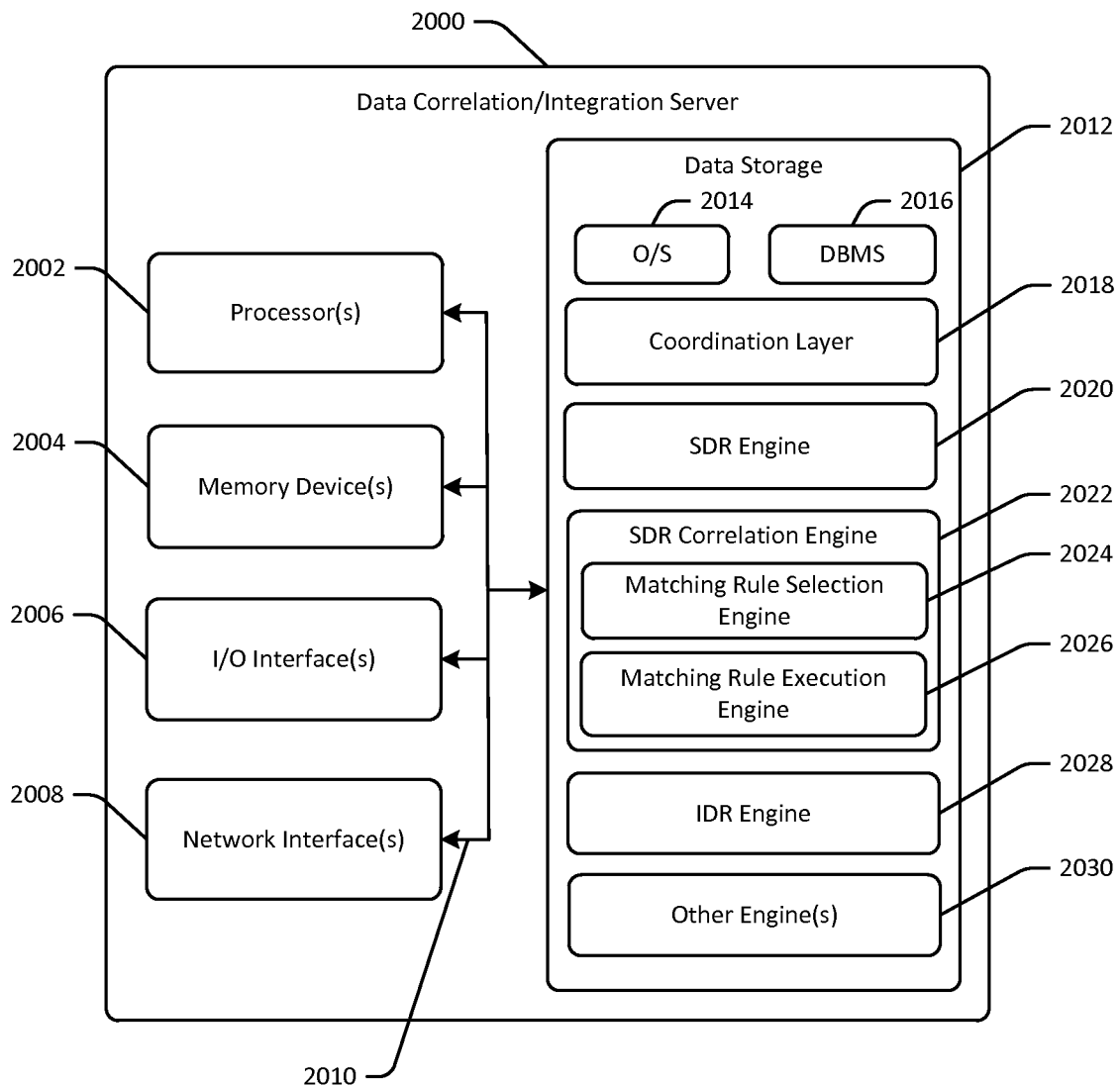
FIG. 20 is a schematic block diagram of an illustrative configuration of a data correlation/integration system server in accordance with one or more example embodiments of the disclosure.

FIG. 20 is a schematic block diagram of an illustrative configuration of a data correlation/integration server 2000 in accordance with one or more example embodiments of the disclosure. The data correlation/integration server 2000 may form part of the data correlation/integration server system 102 and/or the data correlation/integration server system 1102. Any processing described as being performed by a particular component of the data correlation/integration server 2000 may be performed in a distributed manner by multiple such components across multiple data correlation/integration servers 2000.

In an illustrative configuration, the data correlation/integration server 2000 may include one or more processors (processor(s)) 2002, one or more memory devices 2004 (generically referred to herein as memory 2004), one or more input/output ("I/O") interface(s) 2006, one or more network interfaces 2008, and data storage 2012. The data correlation/integration server 2000 may further include one or more buses 2010 that functionally couple various components of the server 2000. These various components of the server 2000 will be described in more detail hereinafter.

The bus(es) 2010 may include at least one of a system bus, a memory bus, an address bus, or a message bus, and may permit exchange of information (e.g., data (including computer-executable code), signaling, etc.) between various components of the server 2000. The bus(es) 2010 may include, without limitation, a memory bus or a memory controller, a peripheral bus, an accelerated graphics port, and so forth. The bus(es) 2010 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 2004 of the server 2000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 2004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 2004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 2012 may include removable storage and/or non-removable storage including, but not limited to, magnetic storage, optical disk storage, and/or tape storage. The data storage 2012 may provide non-volatile storage of computer-executable instructions and other data. The memory 2004 and the data storage 2012, removable and/or non-removable, are examples of computer-readable storage media (CRSM) as that term is used herein.

The data storage 2012 may store computer-executable code, instructions, or the like that may be loadable into the memory 2004 and executable by the processor(s) 2002 to cause the processor(s) 2002 to perform or initiate various operations. The data storage 2012 may additionally store data that may be copied to memory 2004 for use by the processor(s) 2002 during the execution of the computer-executable instructions. Moreover, output data generated as a result of execution of the computer-executable instructions by the processor(s) 2002 may be stored initially in memory 2004, and may ultimately be copied to data storage 2012 for non-volatile storage.

More specifically, the data storage 2012 may store one or more operating systems (O/S) 2014; one or more database management systems (DBMS) 2016; and one or more program modules, applications, engines, or the like such as, for example, a coordination layer 2018, an SDR engine 2020, an SDR correlation engine 2022, an IDR engine 2028, and one or more other engines 2030. Further, any of the program modules, applications, engines, or the like depicted in FIG. 20 may include one or more sub-modules, sub-engines, or the like. For example, the SDR correlation engine 2022 may include a matching rule selection engine 2024 and a matching rule execution engine 2026. The other engine(s) 2030 may include, for example, a money movement engine, a risk engine, or a notification engine. The other engine(s) 2030 may form part of the engine(s) 1114 and may correspond to the other engine(s) 120. Further, any of the modules, engines, applications, or the like depicted in FIG. 20 may include computer-executable code, instructions, or the like that may be loaded into the memory 2004 for execution by one or more of the processor(s) 2002. Each of the modules, applications, engines, or the like depicted as part of the server 2000 may enable similar functionality as described earlier in connection with similarly named modules. In addition, any data stored in one or more external datastores (e.g., the integrated data repository 122, a source data repository 128, etc.) and/or any data stored in the data storage 2012 may be loaded into the memory 2004 for use by the processor(s) 2002 in executing computer-executable code of any of the program modules, applications, engines, or the like of the data correlation/integration server 2000.

The processor(s) 2002 may be configured to access the memory 2004 and execute computer-executable instructions loaded therein. For example, the processor(s) 2002 may be configured to execute computer-executable instructions of the various program modules, engines, applications, or the like of the server 2000 to cause or facilitate various operations to be performed in accordance with one or more embodiments of the disclosure. The processor(s) 2002 may include any suitable processing unit capable of accepting data as input, processing the input data in accordance with stored computer-executable instructions, and generating output data. The processor(s) 2002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 2002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 2002 may be capable of supporting any of a variety of instruction sets.

Referring now to other illustrative components depicted as being stored in the data storage 2012, the O/S 2014 may be loaded from the data storage 2012 into the memory 2004 and may provide an interface between other application software executing on the server 2000 and hardware resources of the server 2000. More specifically, the O/S 2014 may include a set of computer-executable instructions for managing hardware resources of the server 2000 and for providing common services to other application programs (e.g., managing memory allocation among various application programs). The O/S 2014 may include any operating system now known or which may be developed in the future including, but not limited to, any server operating system, any mainframe operating system, or any other proprietary or non-proprietary operating system.

The DBMS 2016 may be loaded into the memory 2004 and may support functionality for accessing, retrieving, storing, and/or manipulating data stored in the memory 2004, data stored in the data storage 2012, and/or data stored in external datastore(s). The DBMS 2016 may use any of a variety of database models (e.g., relational model, object model, etc.) and may support any of a variety of query languages. The DBMS 2016 may access data represented in one or more data schemas and stored in any suitable data repository.

Referring now to other illustrative components of the server 2000, one or more input/output (I/O) interfaces 2006 may be provided that may facilitate the receipt of input information by the server 2000 from one or more I/O devices as well as the output of information from the server 2000 to the one or more I/O devices. The I/O devices may include, for example, one or more user interface devices that facilitate interaction between a user and the server 2000 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The server 2000 may further include one or more network interfaces 2008 via which the server 2000 may communicate with any of a variety of other systems, platforms, networks, devices, and so forth. Such communication may occur via any of one or more of the network(s) 104, for example.

Figure 21:
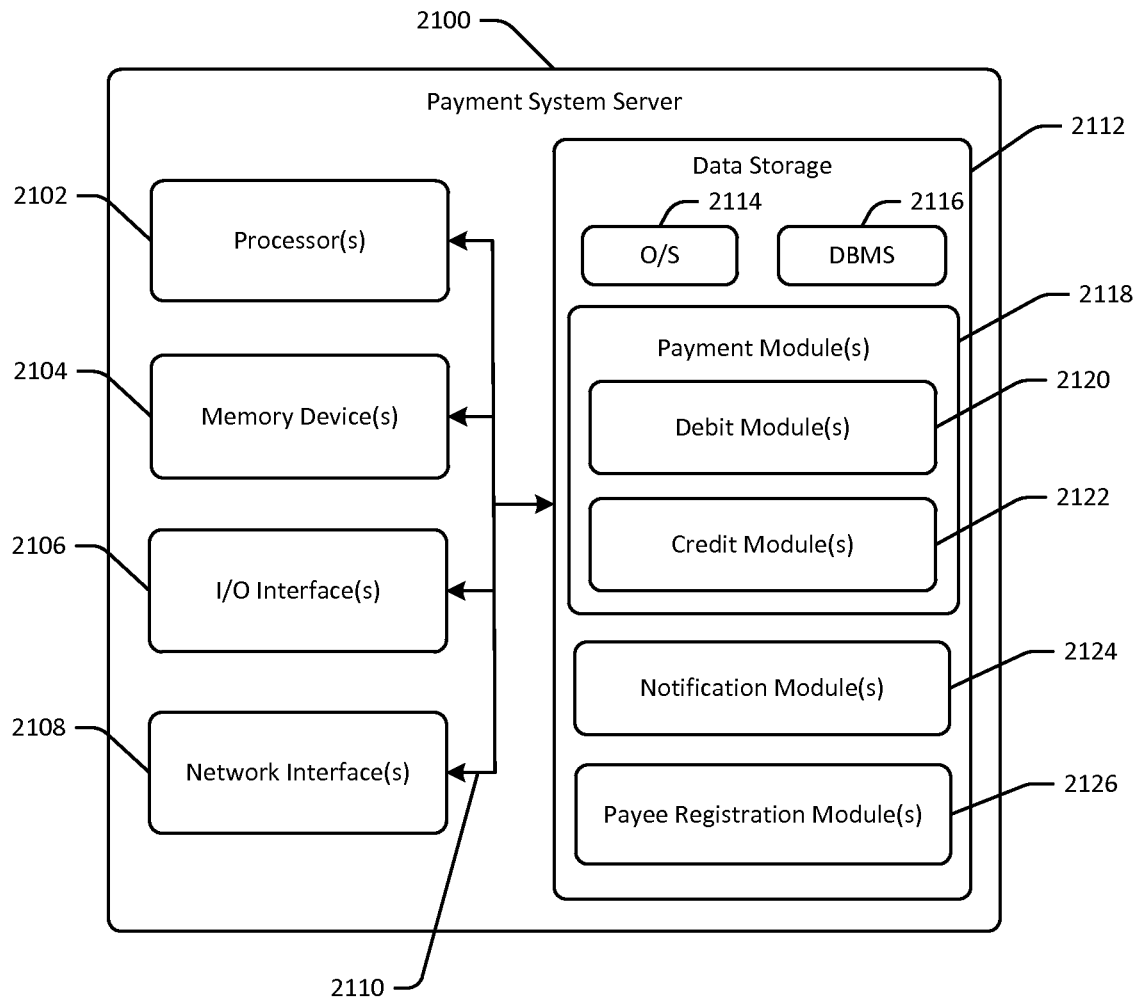
FIG. 21 is a schematic block diagram of an illustrative configuration of a payment system server in accordance with one or more example embodiments of the disclosure.

FIG. 21 is a schematic block diagram of an illustrative configuration of a payment system server 2100 in accordance with one or more example embodiments of the disclosure. The payment system server 2100 may form part of any of the payment systems 1104(1)-1104(N) depicted in FIG. 11. Any processing described as being performed by a particular component of the payment system server 2100 may be performed in a distributed manner by multiple such components across multiple payment system servers 2100.

In an illustrative configuration, the payment system server 2100 may include one or more processors (processor(s)) 2102, one or more memory devices 2104 (generically referred to herein as memory 2104), one or more input/output ("I/O") interface(s) 2106, one or more network interfaces 2108, and data storage 2112. The payment system server 2100 may further include one or more buses 2110 that functionally couple various components of the server 2100. These various components of the server 2100 will be described in more detail hereinafter.

The bus(es) 2110 may include any of the example types of buses described in reference to the bus(es) 2010 of the data correlation/integration server 2000 depicted in FIG. 20. The memory 2104 of the server 2100 may include volatile memory such as RAM and/or non-volatile memory such as ROM, flash memory, FRAM, and so forth. In various implementations, the memory 2104 may include multiple different types of memory such as any of the types of memory described in reference to the memory 2004 of the server 2000 depicted in FIG. 20.

The data storage 2112 may include removable storage and/or non-removable storage including, but not limited to, magnetic storage, optical disk storage, and/or tape storage. The data storage 2112 may provide non-volatile storage of computer-executable instructions and other data. The memory 2104 and the data storage 2112, removable and/or non-removable, are examples of computer-readable storage media (CRSM) as that term is used herein.

The data storage 2112 may store computer-executable code, instructions, or the like that may be loadable into the memory 2104 and executable by the processor(s) 2102 to cause the processor(s) 2102 to perform or initiate various operations. The data storage 2112 may additionally store data that may be copied to memory 2104 for use by the processor(s) 2102 during the execution of the computer-executable instructions. Moreover, output data generated as a result of execution of the computer-executable instructions by the processor(s) 2102 may be stored initially in memory 2104, and may ultimately be copied to data storage 2112 for non-volatile storage.

More specifically, the data storage 2112 may store one or more operating systems (O/S) 2114; one or more DBMS 2116; and one or more program modules, applications, engines, or the like such as, for example, one or more payment modules 2118, one or more notification modules 2124, and one or more payee registration modules 2126. Further, any of the program modules, applications, engines, or the like depicted in FIG. 21 may include one or more sub-modules, sub-engines, or the like. For example, the payment module(s) 2118 may include one or more debit modules 2120 and one or more credit modules 2122. Further, any of the modules, engines, applications, or the like depicted in FIG. 21 may include computer-executable code, instructions, or the like that may be loaded into the memory 2104 for execution by one or more of the processor(s) 2102. In addition, any data stored in one or more external datastores (e.g., a payment data repository 1124) and/or any data stored in the data storage 2112 may be loaded into the memory 2104 for use by the processor(s) 2102 in executing computer-executable code of any of the program modules, applications, engines, or the like of the payment system server 2100.

The payment module(s) 2118 may include computer-executable instructions, code, or the like that when executed by one or more of the processor(s) 2102 may cause the payment system server 2100 to initiate payment-related processing. More specifically, the debit module(s) 2120 may include computer-executable instructions, code, or the like for initiating a debit of a financial account of a payor by, for example, submitting an electronic debit transaction to a payment network, initiating a process for generating a paper instrument payment, or the like. The credit module(s) 2122 may include computer-executable instructions, code, or the like for initiating a credit of a financial account of a payee by, for example, transmitting an electronic credit transaction to a payment network or the like. The payment module(s) 2118 generally may include computer-executable instructions, code, or the like for determining a timeout period duration.

The notification module(s) 2124 may include computer-executable instructions, code, or the like that when executed by one or more of the processor(s) 2102 may cause a notification to be generated and transmitted to an appropriate entity. The notification may include, for example, a credit instruction transmitted from a first payment system 1104(1) to a second payment system 1104(2) instructing the second payment system 1104(2) to initiate a credit to a payee, a credit notification message transmitted from the first payment system 1104(1) to the second payment system 1104(2) instructing the second payment system 1104(2) to notify the payee of an impending credit initiated by the first payment system 1104(1), a notification message transmitted by a payment system 1104 to a notification identifier associated with a payee requesting the payee to accept payment from a payor if already registered with the payment system 1104, or if not already registered, register with the payment system 1104, and so forth.

The payee registration module(s) 2126 may include computer-executable instructions, code, or the like that when executed by one or more of the processor(s) 2102 may cause operations to be performed for initiating and executing a payee registration process. For example, the payee registration module(s) may include computer-executable instructions, code, or the like for determining whether an entity (e.g., a payee) is registered with a payment system 1104, and if not registered, instructing the notification module(s) 2124 to generate a registration message inviting the entity to register. The payee registration module(s) may further include computer-executable instructions, code, or the like for interacting with a user device 1106 of the payee to register the payee with a payment system 1104. In addition, the payee registration module(s) 2126 may further include computer-executable instructions, code, or the like for initiating a timeout period and determining whether a payee registration has successfully occurred prior to expiration of the time period. If a payee registration does not successfully occur prior to expiration of the timeout period, the payment module(s) 2118 may cancel a pending credit to a payee.

Referring now to other illustrative components of the payment system server 2100, the processor(s) 2102 may be configured to access the memory 2104 and execute computer-executable instructions loaded therein. For example, the processor(s) 2102 may be configured to execute computer-executable instructions of the various program modules, engines, applications, or the like of the server 2100 to cause or facilitate various operations to be performed in accordance with one or more embodiments of the disclosure. The processor(s) 2102 may include any suitable processing unit capable of accepting data as input, processing the input data in accordance with stored computer-executable instructions, and generating output data. The processor(s) 2102 may include any type of suitable processing unit including any of those described in reference to the processor(s) 2002 of the server 2000 depicted in FIG. 20. Further, the processor(s) 2102 may have any suitable microarchitecture design that includes any number of constituent components including any of those described in reference to the processor(s) 2002 of the server 2000 depicted in FIG. 20.

Referring now to other illustrative components depicted as being stored in the data storage 2112, the O/S 2114 may be loaded from the data storage 2112 into the memory 2104 and may provide an interface between other application software executing on the server 2100 and hardware resources of the server 2100. More specifically, the O/S 2114 may include a set of computer-executable instructions for managing hardware resources of the server 2100 and for providing common services to other application programs (e.g., managing memory allocation among various application programs). The O/S 2114 may include any of the types of operating systems described in reference to the O/S 2014 of the server 2000 depicted in FIG. 20.

The DBMS 2116 may be loaded into the memory 2104 and may support functionality for accessing, retrieving, storing, and/or manipulating data stored in the memory 2104, data stored in the data storage 2112, and/or data stored in one or more external datastores (e.g., a payment data repository 1124). The DBMS 2116 may use any of a variety of database models (e.g., relational model, object model, etc.) and may support any of a variety of query languages. The DBMS 2116 may access data represented in one or more data schemas and stored in any suitable data repository.

Referring now to other illustrative components of the server 2100, one or more input/output (I/O) interfaces 2106 may be provided that may facilitate the receipt of input information by the server 2100 from one or more I/O devices as well as the output of information from the server 2100 to the one or more I/O devices. The I/O devices may include any of the example types of I/O devices described in reference to the I/O interface(s) 2006 of the server 2000 depicted in FIG. 20.

The server 2100 may further include one or more network interfaces 2108 via which the server 2100 may communicate with any of a variety of other systems, platforms, networks, devices, and so forth. Such communication may occur via any of one or more of the network(s) 104, for example.

Additional types of CRSM beyond those described previously that may be present in association with any of the components described herein (e.g., any of the components of the networked architecture 100) may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, solid-state memory devices, or any other medium. Combinations of any of the above are also included within the scope of CRSM.

Computer-readable communication media may include computer-readable instructions, program modules, or other data transmitted within a data signal, such as a carrier wave, or other transmission. Examples of computer-readable communication media, whether modulated using a carrier or not, include, but are not limited to, signals that a computer system or machine hosting or running a computer program can be configured to access, including signals downloaded through the Internet or other networks. For example, the distribution of software may be an Internet download. It is noted that, as used herein, CRSM does not include computer-readable communication media.

That which is claimed is:

1. A system, comprising:
   at least one memory storing computer-executable instructions; and
   at least one processor operatively coupled to the at least one memory and configured to execute the computer-executable instructions to:
   determine a first source data record populated with first data associated with an entity, wherein the entity is a payor or a payee of a financial transaction, and wherein the first source data record is stored in a first source data repository associated with a first payment system;
   determine a second source data record populated with second data associated with the entity, wherein the second source data record is stored in a second source data repository not associated with the first payment system, and wherein the first source data record does not include the second data;
   select a data record matching rule that is eligible for execution on the first source data record and second source data record;
   determine that the data record matching rule specifies an input property, a matching algorithm corresponding to the input property, and a rule match threshold value;
   execute the data record matching rule on the first source data record and the second source data record, wherein executing the data record matching rule comprises executing the matching algorithm to obtain a result value;
   determine an input property match confidence value associated with the input property based at least in part on the result value;
   determine a final cumulative match confidence value based at least in part on the input property match confidence value;
   determine that the final cumulative match confidence value satisfies the rule match threshold value;
   determine that the first source data record matches the second source data record based at least in part on determining that the final cumulative match confidence value satisfies the rule match threshold value;
   generate an integrated data record, wherein the at least one processor is configured to generate the integrated data record by executing the computer-executable instructions to populate the integrated data record with the first data populated in the first source data record and the second data populated in the second source data record;
   store the integrated data record in an integrated data repository;
   link the integrated data record to the first source data record stored in the first source data repository;
   link the integrated data record to the second source data record stored in the second source data repository;
   receive, from the first payment system, an entity information request associated with the entity, wherein the entity information request comprises at least a portion of the first data; and
   transmit, to the first payment system, a response to the entity information request, the response comprising at least a portion of the second data, wherein the at least a portion of the second data enables initiation of a debit or a credit associated with a financial transaction involving the entity, wherein the at least a portion of the second data is not associated with the entity and the first payment system before the response to the entity information request is transmitted to the first payment system, and wherein the response is generated based at least in part on the integrated data record stored in the integrated data repository.

2. The system of claim 1, wherein the second source data repository is associated with a second payment system.

3. The system of claim 2, wherein the entity is the payee, wherein the at least a portion of the second data included in the response to the entity information request comprises an indication of a financial account associated with the payee, and wherein the at least one processor is further configured to execute the computer-executable instructions to:
   transmit, by one of: i) the first payment system or ii) a money movement engine operating on behalf of the first payment system, to one of iii) the second payment system or iv) a notification engine, a credit notification instruction, the credit notification instruction comprising an identifier of the payee and a payment amount,
   wherein one of i) the first payment system or ii) the money movement engine operating on behalf of the first payment system initiates the credit to the financial account associated with the payee using the indication of the financial account.

4. The system of claim 3, wherein the at least one processor is further configured to execute the computer-executable instructions to:
   determine a notification identifier associated with the payee based at least in part on the identifier of the payee, wherein the notification identifier is associated with a notification mechanism;
   generate a credit notification message indicating the credit and the payment amount; and transmit the credit notification message to the notification identifier using the notification mechanism.

5. The system of claim 2, wherein the first payment system is configured to identify the second payment system for initiating at least one of the debit or the credit associated with the financial transaction based at least in part on the at least a portion of the second data included in the response to the entity information request.

6. The system of claim 2, wherein the entity is a payee, and wherein the at least one processor is further configured to execute the computer-executable instructions to:
   transmit, on behalf of the first payment system to one of: i) the second payment system or ii) a money movement engine, a credit instruction to direct the credit to a financial account associated with the payee, wherein the credit instruction comprises at least a portion of the at least a portion of the second data.

7. The system of claim 6, wherein the at least one processor is further configured to execute the computer-executable instructions to:
   determine a notification identifier associated with the payee, wherein the notification identifier is associated with a notification mechanism;
   generate a notification message indicating availability of the credit, the notification message comprising at least one of i) a selectable mechanism for accepting the credit or ii) a selectable mechanism for registering with the second payment system; and
   transmit the notification message to the notification identifier using the notification mechanism.

8. The system of claim 7, wherein the payee is registered with the second payment system, and wherein the at least one processor is further configured to execute the computer-executable instructions to:
   receive an indication that the credit has been accepted via selection of the selectable mechanism for accepting the credit, wherein the second payment system initiates the credit to the financial account associated with the payee based at least in part on receiving the indication that the credit has been accepted; and
   transmit, on behalf of the second payment system, a response to the credit instruction to the first payment system, the response to the credit instruction indicating successful initiation of the credit to the financial account associated with the payee.

9. The system of claim 7, wherein the payee is not registered with the second payment system, and wherein the at least one processor is further configured to execute the computer-executable instructions to:
   receive an indication that the payee has registered with the second payment system via selection of the selectable mechanism for registering with the second payment system, wherein the second payment system initiates the credit to the financial account associated with the payee based at least in part on receiving the indication that the payee has registered with the second payment system; and
   transmit, on behalf of the second payment system, a response to the credit instruction to the first payment system, the response to the credit instruction indicating successful initiation of the credit to the financial account associated with the payee.

10. The system of claim 7, wherein the financial account associated with the payee is a first financial account, and wherein the at least one processor is further configured to execute the computer-executable instructions to:
   determine, on behalf of the first payment system, a duration of a timeout period, wherein the credit instruction specifies the duration of the timeout period;
   initiate, on behalf of the second payment system, the timeout period;
   determine that the duration of the timeout period has elapsed without having received an indication of an acceptance of the credit or registration of the payee with the second payment system; and
   transmit, on behalf of the second payment system, a response to the credit instruction to the first payment system, the response to the credit instruction indicating absence of receipt of the acceptance of the credit or the registration of the payee with the second payment system,
   wherein the first payment system initiates the credit to the payee responsive to receiving the response to the credit instruction without using the at least a portion of the second data included in the response to the entity information request.

11. The system of claim 10, wherein the at least one processor is further configured to execute the computer-executable instructions to determine, on behalf of the first payment system, that a payment lead time associated with the financial transaction is sufficient to permit interaction with the payee prior to determining the duration of the timeout period.

12. The system of claim 1, wherein at least one processor is further configured to execute the computer-executable instructions to:
   initiate, by one of: i) the first payment system or ii) a money movement engine operating on behalf of the first payment system, the debit to a financial account associated with the payor, wherein at least one of i) the first source data record or ii) the second data comprises an indication of the financial account.

13. The system of claim 1, wherein the at least one processor is further configured to execute the computer-executable instructions to:
   initiate, by one of: i) the first payment system or ii) a money movement engine operating on behalf of the first payment system, the credit to a financial account associated with the payee, wherein at least one of i) the first source data record or ii) the second data comprises an indication of the financial account.

14. The system of claim 1, wherein the at least one processor is further configured to execute the computer-executable instructions to generate a search query comprising a search parameter value that corresponds to an entity identifier of the entity included in the first data and submit the search query against the second source data repository.

15. A method, comprising:
   determining a first source data record populated with first data associated with an entity, wherein the entity is a payor or a payee of a financial transaction, and wherein the first source data record is stored in a first source data repository associated with a first payment system;
   determining a second source data record populated with second data associated with the entity, wherein the second source data record is stored in a second source data repository not associated with the first payment system, and wherein the first source data record does not include the second data;
   selecting a data record matching rule that is eligible for execution on the first source data record and second source data record;

determining that the data record matching rule specifies an input property, a matching algorithm corresponding to the input property, and a rule match threshold value;
executing the data record matching rule on the first source data record and the second source data record, wherein executing the data record matching rule comprises executing the matching algorithm to obtain a result value;
determining an input property match confidence value associated with the input property based at least in part on the result value;
determining a final cumulative match confidence value based at least in part on the input property match confidence value;
determining that the final cumulative match confidence value satisfies the rule match threshold value;
determining that the first source data record matches the second source data record based at least in part on determining that the final cumulative match confidence value satisfies the rule match threshold value;
generating an integrated data record, wherein generating the integrated data record comprises populating the integrated data record with the first data populated in the first source data record and the second data populated in the second source data record;
storing the integrated data record in an integrated data repository;
linking the integrated data record to the first source data record stored in the first source data repository;
linking the integrated data record to the second source data record stored in the second source data repository;
receiving, from the first payment system, an entity information request associated with the entity, wherein the entity information request comprises at least a portion of the first data; and
transmitting, to the first payment system, a response to the entity information request, the response comprising at least a portion of the second data, wherein the at least a portion of the second data enables initiation of a debit or a credit associated with a financial transaction involving the entity, wherein the at least a portion of the second data is not associated with the entity and the first payment system before the response to the entity information request is transmitted to the first payment system, and wherein the response is generated based at least in part on the integrated data record stored in the integrated data repository.

16. The method of claim 15, wherein the second source data repository is associated with a second payment system.

17. The method of claim 16, wherein the entity is the payee, wherein the at least a portion of the second data included in the response to the entity information request comprises an indication of a financial account associated with the payee, the method further comprising:
transmitting, by one of: i) the first payment system or ii) a money movement engine operating on behalf of the first payment system, to one of iii) the second payment system or iv) a notification engine, a credit notification instruction, the credit notification instruction comprising an identifier of the payee and a payment amount, wherein one of i) the first payment system or ii) the money movement engine operating on behalf of the first payment system initiates the credit to the financial account associated with the payee using the indication of the financial account.

18. The method of claim 16, wherein the entity is a payee, the method further comprising:
transmitting, on behalf of the first payment system to one of: i) the second payment system or ii) a money movement engine, a credit instruction to direct the credit to a financial account associated with the payee, wherein the credit instruction comprises at least a portion of the at least a portion of the second data;
determining a notification identifier associated with the payee, wherein the notification identifier is associated with a notification mechanism;
generating a notification message indicating availability of the credit, the notification message comprising at least one of i) a selectable mechanism for accepting the credit or ii) a selectable mechanism for registering with the second payment system; and
transmitting the notification message to the notification identifier using the notification mechanism.

19. The method of claim 18, further comprising:
receiving a first indication that the credit has been accepted via selection of the selectable mechanism for accepting the credit or a second indication that the payee has registered with the second payment system via selection of the selectable mechanism for registering with the second payment system, wherein the second payment system initiates the credit to the financial account associated with the payee based at least in part on receiving the first indication or the second indication; and
transmitting, on behalf of the second payment system, a response to the credit instruction to the first payment system, the response to the credit instruction indicating successful initiation of the credit to the financial account associated with the payee.

20. The method of claim 18, wherein the financial account associated with the payee is a first financial account, the method further comprising:
determining, on behalf of the first payment system, a duration of a timeout period, wherein the credit instruction specifies the duration of the timeout period;
initiating, on behalf of the second payment system, the timeout period;
determining that the duration of the timeout period has elapsed without having received an indication of an acceptance of the credit or registration of the payee with the second payment system; and
transmitting, on behalf of the second payment system, a response to the credit instruction to the first payment system, the response to the credit instruction indicating absence of receipt of the acceptance of the credit or the registration of the payee with the second payment system,
wherein the first payment system initiates the credit to the payee responsive to receiving the response to the credit instruction without using the at least a portion of the second data included in the response to the entity information request.

* * * * *